US006929217B2

(12) United States Patent
Greaves et al.

(10) Patent No.: US 6,929,217 B2
(45) Date of Patent: *Aug. 16, 2005

(54) INTERSTITIAL REGIONAL AIRCRAFT BOARDING PIERS, AND METHODS OF USING SAME

(75) Inventors: John N. Greaves, Holladay, UT (US); Robert L. Peterson, Salt Lake City, UT (US)

(73) Assignee: Gatelink Aircraft Boarding Systems, Inc., Salt Lake CIty, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/661,942

(22) Filed: Sep. 12, 2003

(65) Prior Publication Data

US 2004/0118975 A1 Jun. 24, 2004

Related U.S. Application Data

(63) Continuation-in-part of application No. 09/960,799, filed on Sep. 21, 2001, now Pat. No. 6,732,975, which is a continuation-in-part of application No. 09/575,222, filed on May 22, 2000, now Pat. No. 6,315,243.
(60) Provisional application No. 60/141,038, filed on Jun. 24, 1999.

(51) Int. Cl.$^7$ ................................................. B64F 1/32
(52) U.S. Cl. ........................... 244/114 R; 52/32; 52/33; 14/71.5
(58) Field of Search .................... 244/114 R; 52/32, 52/33; 14/71.5

(56) References Cited

U.S. PATENT DOCUMENTS

| | | | |
|---|---|---|---|
| 3,162,404 A | 12/1964 | Squire | 244/114 |
| 3,571,990 A | 3/1971 | Rossman | 52/30 |
| 3,730,359 A | 5/1973 | Andersson | 214/38 D |
| 3,747,147 A | 7/1973 | Weese | 14/71 |
| 3,793,662 A | 2/1974 | Gacs et al. | 14/71 |
| 3,842,553 A | 10/1974 | Billgren et al. | 52/175 |
| 4,044,516 A | 8/1977 | Billgren | 52/174 |
| 4,110,859 A | 9/1978 | Lichti | 14/71.5 |
| 4,161,049 A | 7/1979 | Saunders | 14/71.5 |
| 4,319,376 A | 3/1982 | Saunders | 14/71.5 |
| 4,457,554 A | 7/1984 | Fuisz et al. | 296/179 |
| 4,572,328 A | 2/1986 | Benko | 182/1 |
| 4,620,339 A | 11/1986 | Shepheard | 14/71.5 |
| 5,040,257 A | 8/1991 | Bentz | 14/70 |
| 5,522,192 A | 6/1996 | Frantl | 52/206 |
| 5,524,318 A | 6/1996 | Thomas | 14/72.5 |
| 5,603,343 A | 2/1997 | Larson | 135/131 |
| 5,761,757 A | 6/1998 | Mitchell et al. | 14/71.5 |
| 5,853,150 A | 12/1998 | Kuchenbrod | 244/137.2 |
| 6,122,789 A | 9/2000 | Stephenson et al. | |
| 6,315,243 B1 * | 11/2001 | Peterson | 244/114 R |
| 6,526,615 B1 | 3/2003 | Hutton et al. | |
| 6,732,975 B2 * | 5/2004 | Peterson | 244/114 R |

* cited by examiner

*Primary Examiner*—J. Woodrow Eldred

(57) ABSTRACT

An interstitial regional aircraft boarding pier can be provided at an airport concourse in place of a conventional large aircraft boarding bridge. The interstitial regional aircraft boarding pier includes a primary passenger bridge between the airport concourse and a hub. A number of secondary passenger bridges extend from the hub to at least one individual regional aircraft.

23 Claims, 25 Drawing Sheets

- 2510 RETROFIT OR DESIGN AN INTERSTITIAL REGIONAL AIRCRAFT BOARDING PIER FOR A CONCOURSE
- 2520 REPLACE AN EXISTING REGIONAL AIRCRAFT CONCOURSE WITH A CONCOURSE THAT INCLUDES AT LEAST ONE INTERSTITIAL REGIONAL AIRCRAFT BOARDING PIER
- 2530 DOCK AN AIRCRAFT AT AN INTERSTITIAL REGIONAL AIRCRAFT BOARDING PIER
- 2540 BOARD OR DEPLANE AT AN INTERSTITIAL REGIONAL AIRCRAFT BOARDING PIER
- 2550 TRANSFER BETWEEN AIRCRAFT, USING AT LEAST ONE INTERSTITIAL REGIONAL AIRCRAFT BOARDING PIER

INTERSTITIAL REGIONAL AIRCRAFT BOARDING PIERS, AND METHODS OF USING SAME

RELATED APPLICATIONS

This is a Continuation-In-Part of U.S. patent application Ser. No. 09/960,799, filed Sep. 1, 2001 now U.S. Pat. No. 6,732,975, which is a Continuation-In-Part of U.S. patent application Ser. No. 09/575,222, now U.S. Pat. No. 6,315,243, filed on May 22, 2000, which is a utility application filing based upon U.S. Provisional Application Ser. No. 60/141,038 filed Jun. 24, 1999. This application also is related to copending U.S. Patent Application PCT/US00/17129, entitled INTEGRATED REGIONAL AIRCRAFT BOARDING PIER, filed on Jun. 22, 2000.

TECHNICAL FIELD

An embodiment relates to the field of airline travel. More particularly, an embodiment relates to the field of aircraft boarding piers, specifically to aircraft boarding piers servicing regional aircraft. An embodiment provides among other things the interstitial integration of a regional aircraft boarding pier in an airport concourse with existing bridges for larger jet passenger aircraft.

TECHNICAL BACKGROUND

Air travel has becoming increasing popular over the past decade and has evolved to handle an ever growing passenger volume. An important aspect of this evolution is the structure of flight routes through a "hub" airport. Today, hub routing has become an essential part of the efficient operation of an airline.

This trend has been aided by the advent of regional aircraft. As used herein, the term "regional aircraft" refers to jet or propeller aircraft that are smaller than typical large commercial airline passenger jets. Regional aircraft will typically be identified as having about 110 seats or less. Aircraft with more than 110 seats and which are used to travel traditional airline routes between major airports are considered "large aircraft" or "large jets" herein. The advent of regional aircraft has created a new market for air travel in which air passengers can span relatively large distances quickly on a regional aircraft.

Manufacturers of regional aircraft, particularly craft with 70 or fewer seats, include Brazilian aircraft maker Embraer SA, Canada's Bombardier and Fairchild Aerospace of the United States. The popularity of regional aircraft produced by these manufacturers has exceeded expectations. For example, Bombardier forecast initial sales of 400 aircraft when it launched its regional jet model in the early 1990s. Bombardier instead received orders and options for 1,066 of its CRJ-200 50-seater and larger CRJ-700 derivative. Similarly, Embraer booked dozens more orders than expected for its ERJ-135 and ERJ-145 aircraft at a recent Paris airshow.

Capitalizing on this strong commercial interest, Bombardier has launched the CRJ-700, a 70-seat aircraft, and plans an even larger BRJ-X model with 90 or 110 seats. Fairchild has recently launched the 70-seat 728JET and also offers a longer version with around 100 seats. Embraer has also booked orders for its new ERJ-170 and ERJ-190, with about 70 and 100 seats, respectively.

One problem with regional aircraft travel is that the regional aircraft terminal is often located at a site remote from the main terminal. Consequently, a passenger on a regional aircraft, whether transferring to or from a large aircraft, needs to traverse the length of the airport and/or travel between terminals to make the transfer. As air travel becomes increasingly popular and important to the economy, the frequent regional aircraft passenger represents an increasing share of the air travel market. Consequently, a significant problem is presented by the remote location of the regional aircraft terminal that prevents quick and seamless plane transfers for the regional aircraft passenger. Additionally, the remote location of the regional aircraft terminal also affects airline scheduling for large aircraft because passengers must be allowed time to traverse the often large distances between a regional aircraft boarding gate and the boarding gate for the large aircraft.

Another problem with regional aircraft travel is that the passenger is frequently required to walk outside on the tarmac and climb stairs to board the regional aircraft. If the weather is inclement, boarding and deplaning from a regional aircraft is made more difficult than boarding and deplaning from large aircraft entirely within the closed and conditioned space of conventional airports that have been developed for large aircraft.

Where a passenger is unable to walk, boarding a regional aircraft from the tarmac in a wheelchair can present additional problems. In the past, these problems have been addressed by building some kind of wheelchair lift. However, such boarding is often time consuming and can be a source of embarrassment or self-consciousness for the wheelchair passenger. The combination of a wheelchair lift and inclement weather may make the prospect of regional aircraft travel even less acceptable for disabled passengers.

Consequently, there is a need in the art to make regional aircraft travel more convenient and efficient.

BRIEF DESCRIPTION OF THE DRAWINGS

The accompanying drawings illustrate the present invention and are a part of the specification. Together with the following description, the drawings demonstrate and explain the principles of the several embodiments, in which:

FIG. 25 is a method flow diagram according to various embodiments.

DETAILED DESCRIPTION

Figure 1:
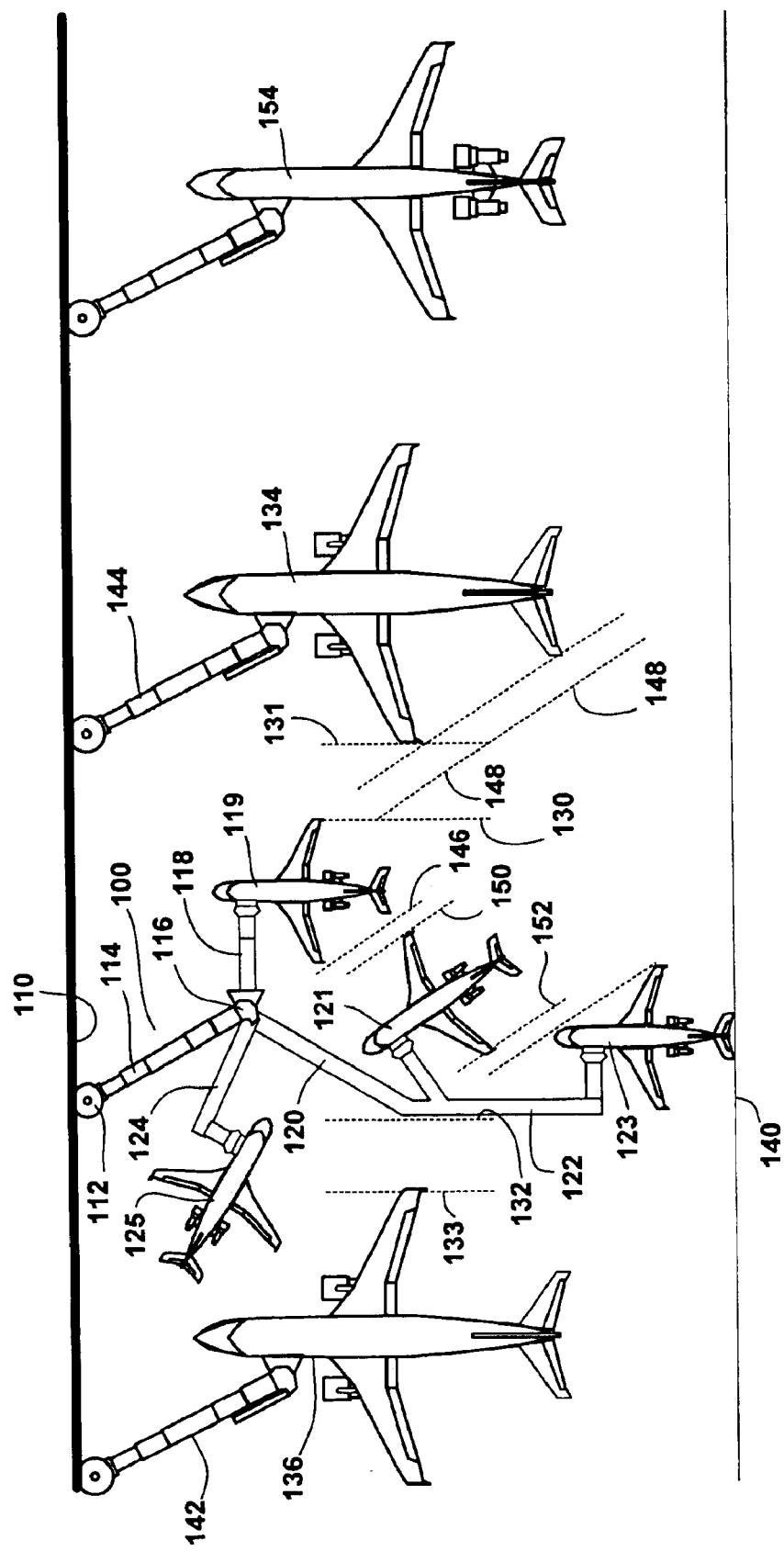
FIG. 1 is a plan of an interstitial regional aircraft boarding pier for docking about four regional aircraft or less according to an embodiment.

In the following detailed description, reference is made to the accompanying drawings which form a part hereof, and in which is shown, by way of illustration, specific ways which embodiments may be practiced. In the drawings, like numerals describe substantially similar components throughout the several views. These embodiments are described in sufficient detail to enable those skilled in the art to practice various embodiments. Other embodiments may be utilized and structural, logical, and layout changes may be made without departing from the scope of the various embodiments.

The term "large aircraft" is an aircraft with more than 110 passenger seats. Large aircraft can be either jet or propeller driven. Examples of large aircraft include the DC-9 or Boeing 717 at the smaller end of the scale, up to the Boeing 747 or 767 at the larger end of the scale. The term "regional aircraft" is an aircraft with a passenger capacity from about 6 to about 110 passengers. Examples of regional aircraft include aircraft made by LM Bombardier, Embraer, Fairchild Aerospace, Gulf Stream, Cessna, Learjet, and others. The term "jumbo" aircraft relates to an aircraft of the class such as a Boeing® 747.

The term "interstitial" can mean between two large aircraft. Similarly, interstitial can mean taking up a given space that is less than the docking bay area required for a single large aircraft in a docking bay. Similarly, interstitial can mean taking up a given space that is less than twice the docking bay area required for a single large aircraft in a docking bay. Similarly, interstitial can mean taking up a given space part of the docking bay area required for two contiguous large aircraft in contiguous docking bays, which is not physically occupied by either of the large aircraft. Other meanings for interstitial are set forth in this disclosure.

In an embodiment, many of the problems of the prior art can be overcome with an interstitial regional aircraft boarding pier, described in detail below, which is integrated into a common concourse with boarding facilities for large aircraft. As used herein, a "concourse" is a single structure or wing of an airport with sequentially numbered boarding gates for passenger aircraft. The term airport "terminal" is synonymous with concourse or denotes a group of interconnected concourses.

FIG. 1 is a plan of an interstitial regional aircraft boarding pier 100 for docking about four regional aircraft according to an embodiment. A concourse 110 is depicted by its external boundary. The concourse provides an anchor location for the interstitial regional aircraft boarding pier 100. In an embodiment, the concourse 110 is a ground-level structure that allows passengers to walk up a ramp until the sill of a given aircraft is reached. In an embodiment, the concourse 110 is a conventional elevated structure that allows passengers to walk down a ramp until the sill of a given aircraft is reached.

In an embodiment, the interstitial regional aircraft boarding pier 100 anchors at a rotunda 112, into which passengers first embark upon leaving the concourse 110. In an embodiment, the rotunda 112 includes a swiveling functionality that allows for positioning other portions of the boarding pier 100. In an embodiment, the rotunda 112 includes a fixed structure.

A primary aircraft passenger bridge 114 is coupled to the rotunda 112. The primary aircraft passenger bridge 114 leads to a cab 116. In an embodiment, the cab 116 acts as a pier hub 116 for at least one secondary aircraft passenger bridge. In an embodiment, the cab 116 acts as a pier hub 116 for a secondary aircraft passenger bridge 118. In an embodiment, the cab 116 acts as a pier hub 116 for a secondary aircraft passenger bridge 120. In an embodiment, the cab 116 acts as a pier hub 116 for a secondary aircraft passenger bridge 122. The secondary aircraft passenger bridge 122 is also referred to as a tertiary aircraft passenger bridge 122 because it originates from a secondary aircraft passenger bridge 120. In an embodiment, the cab 116 acts as a pier hub 116 for a secondary aircraft passenger bridge 124.

In an embodiment, the secondary aircraft passenger bridge 118 is configured to accommodate a regional aircraft (RA) 119. Similarly, the secondary aircraft passenger bridge 120 is configured to accommodate an RA 121. Similarly, the secondary aircraft passenger bridge 122 is configured to accommodate an RA 123. And similarly, the secondary aircraft passenger bridge 124 is configured to accommodate an RA 125.

In an embodiment, the interstitial regional aircraft boarding pier 100 is configured to allow at least one RA to dock within a docking bay area sufficient for about only a single large aircraft. In FIG. 1, the docking bay area sufficient for about only a single large aircraft is approximately delineated by the concourse 110, a starboard wingtip-clearance boundary 130, a port wingtip-clearance boundary 132, and an object-free line (OFL) 140 that is the boundary of the taxiway.

Quantification of the docking bay area sufficient for about only a single large aircraft can be done in various ways. In an embodiment, the wingtip-clearance boundaries 130 and 132 are essentially the equivalent reach of the largest contemplated large aircraft for a given docking bay. For example, the wingspan for the Boeing® 737-900 series aircraft has a wingspan of about 35.8 meter. The length of this aircraft is about 42.1 meter. Consequently, "the docking bay area sufficient for about only a single large aircraft" in this example, is about 1,507.2 m$^2$, with an aspect ratio (depth divided by width) of about 1.18.

In an embodiment, the docking bay area sufficient for about only a single large aircraft is determined by a major characteristic dimension. Where a given large aircraft has a given wingspan, the wingspan is the major characteristic dimension that relates to the docking bay area sufficient for about only a single large aircraft. The area is reached by adding the depth dimension from the exterior of the concourse to the OFL. In any event, the minimum of such an area is the wingspan length, multiplied by the fuselage length.

In an embodiment the docking bay area sufficient for about only a single large aircraft is a given length times wingspan, multiplied by a buffer factor that is used in conventional aircraft bay design. In an embodiment, the buffer factor is 1.05. In an embodiment, the buffer factor is 1.1. In an embodiment, the buffer factor is 1.15. In an embodiment, the buffer factor is 1.2. In an embodiment, the buffer factor is greater than 1.2.

In an embodiment any of the buffer factors, applies only to the width of the docking bay. In an embodiment, the location of the OFL 140 is highly variable, based upon the specific airport design. For example, the OFL 140 can be within a meter of the tail assembly of a given aircraft. In another example, the OFL 140 can be within several meters of the tail assembly, such as 5 meters, 10 meters, 15 meters, 20 meters, or more. Consequently, to ascertain the docking bay area sufficient for about only a single large aircraft, a calculation of the area includes a calculation of the boundaries delineated by the concourse 110, the wingtip-clearance boundaries 130 and 132, and the farthest-extending extremity of the aircraft in the direction of the OFL 140. In another embodiment, the docking bay area sufficient for about only a single large aircraft includes the OFL 140 as dictated by the presence of an adjacent large aircraft.

Because the exact docking bay area sufficient for about only a single large aircraft, varies among airports, and indeed within a single airport, another definition of "the docking bay area sufficient for about only a single large aircraft" includes the area between two docking bays, which previously supported a large aircraft. In this embodiment, the interstitial regional aircraft boarding pier is constructed without moving any of the passenger bridge structures of the adjacent docking bays for large aircraft. In an embodiment, the interstitial regional aircraft boarding pier is constructed without moving one of the passenger bridge structures of the adjacent docking bays for large aircraft.

The starboard and port wingtip-clearance boundaries 130 and 132, respectively are coupled with respective port 131 and starboard 133 wingtip-clearance boundaries for respective neighboring large aircraft 134 and 136. In an embodiment, the respective large neighboring aircraft 134 and 136 are two-engine-on-wing aircraft such as a version of the Boeing® 737 or a version of the Airbus® A320 or A319. Other large aircraft, however, can be docked according to an embodiment. Accordingly, in an embodiment, the RA 123 is next to but not over the OFL 140.

In another embodiment, the docking bay area sufficient for about only a single large aircraft that is used as the docking bay area for an interstitial regional aircraft boarding pier includes at least some of the clearance space between the docking bays. In FIG. 1, the clearance space between the starboard wingtip-clearance boundary 130 and the port wingtip-clearance boundary 131 is included in the docking bay area sufficient for about only a single large aircraft.

In an embodiment, the docking bay area that sufficient for about only a single large aircraft, includes about 1.0 times the existing docking bay area for a single large aircraft. In an embodiment, the docking bay area that sufficient for about only a single large aircraft, includes about 1.9 times the existing area for a single large aircraft. In an embodiment, the docking bay area that sufficient for about only a single large aircraft, includes about 1.8 times the existing area for a single large aircraft. In an embodiment, the docking bay area that sufficient for about only a single large aircraft, includes about 1.7 times the existing area for a single large aircraft. In an embodiment, the docking bay area that sufficient for about only a single large aircraft, includes about 1.6 times the existing area for a single large aircraft. In an embodiment, the docking bay area that sufficient for about only a single large aircraft, includes about 1.5 times the existing area for a single large aircraft. In an embodiment, the docking bay area that sufficient for about only a single large aircraft, includes about 1.4 times the existing area for a single large aircraft. In an embodiment, the docking bay area that sufficient for about only a single large aircraft, includes about 1.3 times the existing area for a single large aircraft. In an embodiment, the docking bay area that sufficient for about only a single large aircraft, includes about 1.2 times the existing area for a single large aircraft. In an embodiment, the docking bay area that sufficient for about only a single large aircraft, includes about 1.1 times the existing area for a single large aircraft. In an embodiment, the docking bay area that sufficient for about only a single large aircraft, includes less than 1.0 times the existing docking bay area for only a single large aircraft.

In FIG. 1, the presence of the RA 125, although it is docked beyond the boundary of the port wingtip-clearance boundary 132, it is by definition docked in an existing docking bay area for only a single large aircraft. In this instance for it to taxi and dock, it is using some of the docking bay of the large aircraft 136. For the RAs 119, 121, and 123, for taxiing and docking however, they likewise are using an existing docking bay area for a single large aircraft that fits between the starboard wingtip-clearance boundary 130 and the port wingtip-clearance boundary 132.

In an embodiment, operation of the interstitial regional aircraft boarding pier 100 includes only the secondary aircraft passenger bridge 118 and the secondary aircraft passenger bridge 120. Accordingly, the secondary aircraft passenger bridges 122 and 124 are optionally present, either together or each alone with the 118 and 120.

In an embodiment, the position of the RA 125 causes it to be a "first in last out" (FILO) aircraft. The FILO designation is because between the port wingtip-clearance boundary 132 and the starboard wingtip-clearance boundary 133, there is not enough clearance between them for the RA 125 to pass next to the wing of the large aircraft 136. Accordingly, the FILO designation for the RA 125 is first in and docks at the secondary aircraft passenger bridge 124. The RA 125 is last out because it must wait for the large aircraft 136 to dock at its own large aircraft passenger bridge 142 and to be turned around for another flight or to be turned around to be moved for maintenance. In an embodiment, however, the starboard wing of the RA 125 is sufficiently below the wing of the large aircraft 136, and clearance between any significant obstruction of the large aircraft 136 and the secondary aircraft passenger bridge 122, is sufficient for the RA 125 to be a first in and first out (FIFO) aircraft, with respect to the large aircraft 136. In an embodiment, the secondary aircraft passenger bridge 124 can do at least one of retract toward the pier hub 116 and articulate toward the primary aircraft passenger bridge 114 in preparation for the RA 125 to taxi away from the interstitial regional aircraft boarding pier 100.

When an RA at the interstitial regional aircraft boarding pier 100 is ready to push back, it must trace a path that clears the wingtips of adjacent aircraft. In an embodiment, the RA 119 waits for the secondary aircraft passenger bridge 118 to retract and/or pivot to clear the RA 119. Next, the RA 119 itself is pivoted and it is pushed back in a lane that clears the port wingtip of the large aircraft 134 and the starboard wingtip of the RA 121. The pushback lane is designated in arbitrary dimension and angle with respect to the concourse 110, by the dashed lines 146 and 148. Where the starboard wingtip of the RA 119 is sufficiently below the port wingtip of the large aircraft 134, an actual clearance can be measured by a diagonal distance or a vertical distance between wingtips.

In an embodiment, the RA 121 waits for the secondary passenger bridge 120 to retract and/or pivot to clear the RA 121. Next, the RA 121 is pushed back in a lane that clears the port structures of the RA 119 and the starboard structures of the RA 123. The pushback lane is designated in arbitrary dimension and angle with respect to the concourse 110, by the dashed lines 150 and 152.

In an embodiment, the RA 123 waits for the secondary aircraft passenger bridge 122 to retract and/or pivot to clear the RA 123. Next, the RA 123 is pushed back across the OFL 140. In an embodiment, the secondary aircraft passenger bridge 122 retracts sufficient for the RA 123 to pivot without any portion thereof to cross the OFL 140, and thereafter it taxis under its own locomotion.

In an embodiment, a conventional and/or existing aircraft passenger bridge 114 and/or a conventional aircraft passenger bridge design is rebuilt and/or redesigned such that the original cab 116 that was configured to accommodate a single aircraft, is either replaced or reconfigured to act as a pier hub 116. In an embodiment, the cab 116 is configurable to have the secondary aircraft passenger bridge 118 removed and an aircraft, whether an RA or a large aircraft, is able to dock directly at the cab 116 in a position similar to the RA 119, but with the port passenger door directly docked to the cab 116. In an embodiment, the aircraft that docks with the cab 116 is an RA, the length of the primary aircraft passenger bridge 114 is extended until the total vertical slope of the primary aircraft passenger bridge 114 reaches the sill height of the RA, according to the ramp-pitch guidelines for an airline in a given jurisdiction.

In an embodiment, any two of the RAs 119, 121, 123, and 125 and their respective secondary aircraft passenger bridges are present as a duo in a configuration. In an embodiment, any three of the RAs 119, 121, 123, and 125 and their respective secondary aircraft passenger bridges are present as a trio in a configuration. In an embodiment, any configuration of secondary aircraft passenger bridges is provided to accommodate a given combination for the above-given RAs.

FIG. 1 also illustrates the presence of a third large aircraft 154. In an embodiment, the third large aircraft 154 is an engine-on-fuselage-rear configuration such as an MD 80 or the like.

Figure 2:
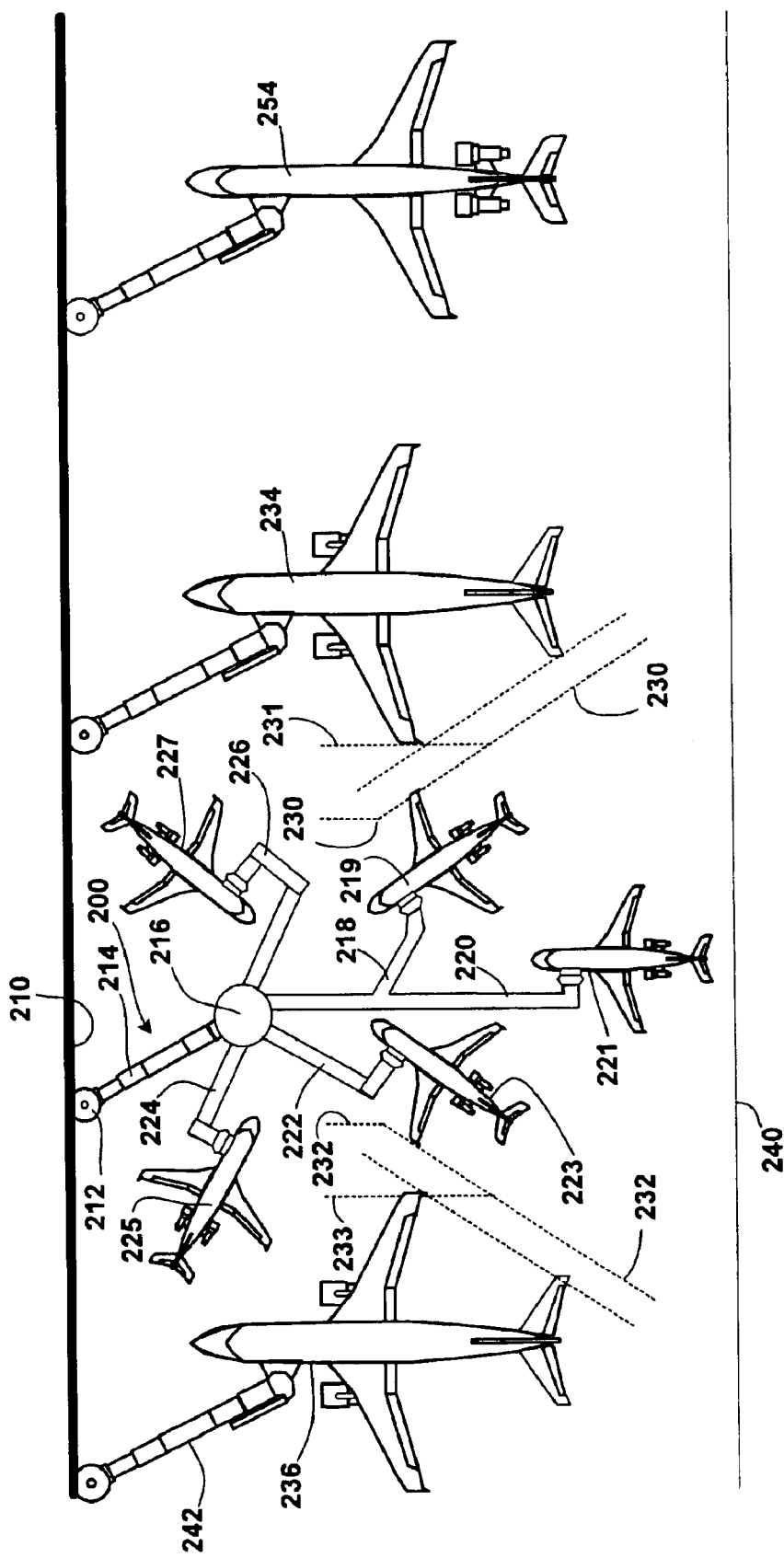
FIG. 2 is a plan of an interstitial regional aircraft boarding pier for docking about five regional aircraft or less according to an embodiment.

FIG. 2 is a plan of an interstitial regional aircraft boarding pier 200 for docking about five regional aircraft or less according to an embodiment. A concourse 210 is depicted by its external boundary. The concourse provides an anchor location for the interstitial regional aircraft boarding pier 200. In an embodiment, the concourse 210 is a ground-level structure that allows passengers to walk up a ramp until the sill of a given aircraft is reached. In an embodiment, the concourse 210 is a conventional elevated structure that allows passengers to walk down a ramp until the sill of a given aircraft is reached.

In an embodiment, the interstitial regional aircraft boarding pier 200 anchors at a rotunda 212. In an embodiment, the rotunda 212 includes a swiveling functionality that allows for positioning other portions of the boarding pier 200. In an embodiment, the rotunda 212 includes a fixed structure.

A primary aircraft passenger bridge 214 is coupled to the rotunda 212. The primary aircraft passenger bridge 214 leads to a cab 216. In an embodiment, the cab 216 acts as a pier hub 216 for at least one secondary aircraft passenger bridge. In an embodiment, the cab 216 is large enough to allow for more passenger grouping during boarding and deplaning. In an embodiment, the cab 216 is large enough to allow passengers to be seated and wait for boarding a given RA. In an embodiment, the cab 216 acts as a pier hub 216 for a secondary aircraft passenger bridge 218. In an embodiment, the cab 216 acts as a pier hub 216 for a secondary aircraft passenger bridge 220. In an embodiment, the cab 216 acts as a pier hub 216 for a secondary aircraft passenger bridge 222. In an embodiment, the cab 216 acts as a pier hub 216 for a secondary aircraft passenger bridge 224. In an embodiment, the cab 216 acts as a pier hub 216 for a secondary aircraft passenger bridge 226.

In an embodiment the secondary aircraft passenger bridge 218 is configured to accommodate an RA 219. Similarly, the secondary aircraft passenger bridge 220 is configured to accommodate an RA 221. Similarly, the secondary aircraft passenger bridge 222 is configured to accommodate an RA 223. Similarly, the secondary aircraft passenger bridge 224 is configured to accommodate an RA 225. And similarly, the secondary aircraft passenger bridge 226 is configured to accommodate an RA 227.

In an embodiment, the interstitial regional aircraft boarding pier 100 is configured to allow at least one RA to dock within a docking bay area sufficient for about only a single large aircraft. In FIG. 2, the docking bay area sufficient for about only a single large aircraft is approximately delineated by the concourse 210, a starboard wingtip-clearance boundary 230, a port wingtip-clearance boundary 232, and an OFL 240 that is the boundary of the taxiway. The starboard and port wingtip-clearance boundaries 230 and 232, respectively are coupled with respective port 231 and starboard 233 wingtip-clearance boundaries for respective neighboring large aircraft 234 and 236. In an embodiment, the respective large neighboring aircraft 234 and 236 are two-engine-onwing aircraft such as a version of the Boeing® 737 or a version of the Airbus® A320 or A319. Other large aircraft, however, can be docked according to an embodiment.

Accordingly, in an embodiment, the RA 223 is next to but not significantly over the port wingtip-clearance boundary 232 because of its angled nature. In an embodiment, the docking bay area that sufficient for about only a single large aircraft, includes any of the tarmac surface areas set forth in this disclosure including those larger, substantially about 1.0 times the existing docking bay area for a single large aircraft, and those smaller.

In FIG. 2, the presence of the RA 225, although it is docked beyond the portion of the boundary of the port wingtip-clearance boundary 232 that is orthogonal to the concourse 210, it is by definition docked in an existing docking bay area for only the single large aircraft 236. In this instance for it to taxi and dock, it is using either some of the space for the large aircraft 236, and/or some of the space for the RA 223. Similarly, the presence of the RA 227, although it is docked beyond the portion of the boundary of the 230 that is orthogonal to the concourse 210, it is by definition docked in an existing docking bay area for only a single large aircraft. In this instance for it to taxi and dock, it is using either some of the space of the large aircraft 234, and/or some of the space for the RA 219. For the RAs 219, 221, and 223, for taxiing and docking however, they likewise are using an existing docking bay area for a single large aircraft that fits between the starboard wingtip-clearance boundary 230 and the port wingtip-clearance boundary 232.

In an embodiment, operation of the interstitial regional aircraft boarding pier 200 includes only the secondary aircraft passenger bridge 218 and the secondary aircraft passenger bridge 220. Accordingly, the secondary aircraft passenger bridge 222 and the secondary aircraft passenger bridge 224 are optionally present, either together or each alone with the secondary aircraft passenger bridges 218 and 220.

In an embodiment, the position of the RA 225 causes it to be a FILO aircraft. The FILO designation is because between the port wingtip-clearance boundary 232 and the starboard wingtip-clearance boundary 233 there is not enough clearance between them for the RA 225 to pass next to the wing of the large aircraft 236. Accordingly, the FILO designation for the RA 225 is first in and docks at the secondary aircraft passenger bridge 224. The RA 225 is last out because it must wait for the large aircraft 236 to dock at its own large aircraft passenger bridge 242 and to be turned around for another flight or to be turned around to be moved for maintenance. In an embodiment, however, the starboard wing of the RA 225 is sufficiently below the wing of the large aircraft 236, and clearance between any significant obstruction of the large aircraft 236 and the secondary aircraft passenger bridge 222 is sufficient for the RA 225 to be a FIFO aircraft, with respect to the large aircraft 236 and/or with respect to the RA 223. In an embodiment, the RA 225 is a FIFO aircraft with respect to the large aircraft 236, because no RA is present at the secondary aircraft passenger bridge 222. In an embodiment, the secondary aircraft passenger bridge 224 can do at least one of retract toward the pier hub 216 and articulate toward the primary aircraft passenger bridge 214 in preparation for the RA 225 to taxi away from the interstitial regional aircraft boarding pier 200. According to an embodiment, the RA 227 can be a FILO aircraft or a FIFO aircraft with respect to the large aircraft 234 and the RA 219, similar to how the RA 225 can be a FILO aircraft or a FIFO aircraft with respect to the large aircraft 236 and the RA 223 as set forth in this disclosure.

When an RA at the interstitial regional aircraft boarding pier 200 is ready to push back, it must trace a path that clears the wingtips of adjacent aircraft. In an embodiment, the RA 219 waits for the secondary aircraft passenger bridge 218 to retract and/or pivot to clear the RA 219. Next, the RA 219 itself is pivoted and/or it is pushed back in a lane that clears the port wingtip of the large aircraft 234 and the starboard wingtip of the RA 221. The pushback lane is designated in arbitrary dimension and angle with respect to the 210, by at least the dashed line 230 for the starboard wingtip. Where the starboard wingtip of the RA 219 is sufficiently below the port wingtip of the large aircraft 234, an actual clearance can be measured by a diagonal distance or a vertical distance between wingtips. Where useful, the RA 219 can be pivoted clockwise to avoid the port rear stabilizer of the large aircraft 234, once the RA 219 has cleared the starboard wingtip of the RA 221, if present.

In an embodiment, the RA 221 waits for the secondary passenger bridge 220 to retract and/or pivot to clear the RA 221. Next, the RA 221 is pushed back in a lane that clears the port structures of the RA 219 and the starboard structures of the RA 223 if any or both of them are present. The pushback lane is either directly orthogonal to the concourse 210, or the RA 221 can be pivoted before it crosses the OFL 240, and it can taxi away from the boarding pier 200.

In an embodiment, the RA 223 waits for the secondary aircraft passenger bridge 222 to retract and/or pivot to clear the RA 223. Next, the RA 223 itself is pivoted and/or it is pushed back in a lane that clears the starboard wingtip of the large aircraft 236 and the port wingtip of the RA 221. The pushback lane is designated in arbitrary dimension and angle with respect to the concourse 210, by at least the dashed line 232 for the port wingtip. Where the port wingtip of the RA 223 is sufficiently below the starboard wingtip of the large aircraft 236, an actual clearance can be measured by a diagonal distance or a vertical distance between wingtips. Where useful, the RA 223 can be pivoted counter-clockwise to avoid the starboard rear stabilizer of the large aircraft 236, once the RA 223 has cleared the port wingtip of the RA 221, if present.

In an embodiment, a conventional and/or existing aircraft passenger bridge 214 and/or a conventional aircraft passenger bridge design is rebuilt and/or redesigned such that the original cab 216 that was configured to accommodate a single aircraft, is either replaced or reconfigured to act as a pier hub 216.

In an embodiment, any two of the RAs 219, 221, 223, 225, and 227 and their respective secondary aircraft passenger bridges are present as a duo in a configuration. In an embodiment, any three of the RAs 219, 221, 223, 225, and 227 and their respective secondary aircraft passenger bridges are present as a trio in a configuration. In an embodiment, any four of the RAs 219, 221, 223, 225, and 227 and their respective secondary aircraft passenger bridges are present as a quartet in a configuration. In an embodiment, any configuration of secondary aircraft passenger bridges is provided to accommodate a given combination for the above-given RAs.

FIG. 2 also illustrates the presence of a third large aircraft 254. In an embodiment, the third large aircraft 254 is an engine-on-fuselage-rear configuration such as an MD 80 or the like. Other large aircraft, however, can be positioned as the large aircraft, if present.

Figure 3:
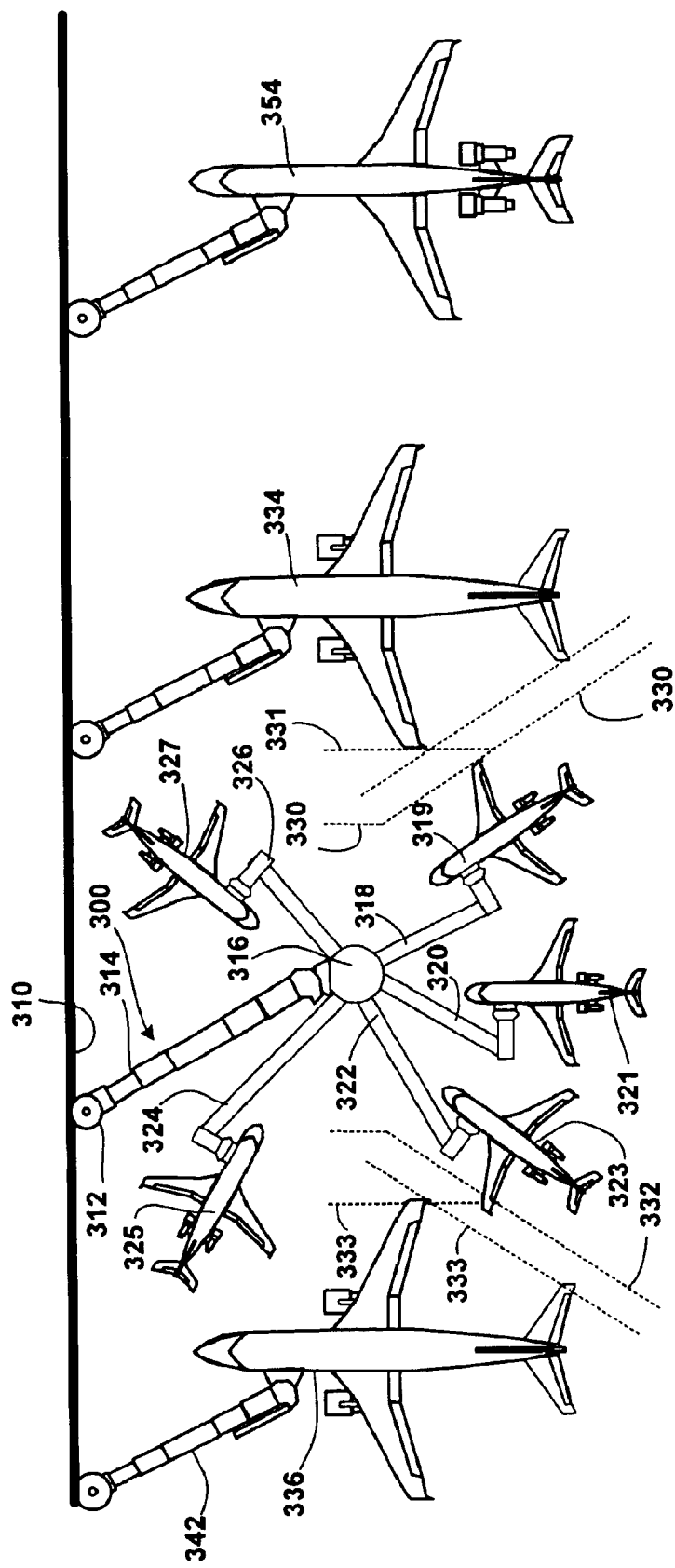
FIG. 3 is a plan of an interstitial regional aircraft boarding pier for docking about five regional aircraft or less according to an embodiment.

FIG. 3 is a plan of an interstitial regional aircraft boarding pier 300 for docking about five regional aircraft or less according to an embodiment. A concourse 310 is depicted by its external boundary. The concourse 310 provides an anchor location for the interstitial regional aircraft boarding pier 300. In an embodiment, the concourse 310 is a ground-level structure that allows passengers to walk up a ramp until the sill of a given aircraft is reached. In an embodiment, the concourse 310 is a conventional elevated structure that allows passengers to walk down a ramp until the sill of a given aircraft is reached.

In an embodiment, the interstitial regional aircraft boarding pier 300 anchors at a rotunda 312. In an embodiment, the rotunda 312 includes a swiveling functionality that allows for positioning other portions of the boarding pier 300. In an embodiment, the rotunda 312 includes a fixed structure.

A primary aircraft passenger bridge 314 is coupled to the rotunda 312. The primary aircraft passenger bridge 314 leads to a cab 316. In an embodiment, the cab 316 acts as a pier hub 316 for at least one secondary aircraft passenger bridge. In an embodiment, the cab 316 is at a level that allows for the sill height of any given RA depicted in FIG. 3. In an embodiment, the cab 316 is large enough to allow for more passenger grouping during boarding and deplaning. In an embodiment, the cab 316 is large enough to allow passengers to be seated and wait for boarding a given RA. In an embodiment, the cab 316 acts as a pier hub 316 for a secondary aircraft passenger bridge 318. In an embodiment, the cab 316 acts as a pier hub 316 for a secondary aircraft passenger bridge 320. In an embodiment, the cab 316 acts as a pier hub 316 for a secondary aircraft passenger bridge 322. In an embodiment, the cab 316 acts as a pier hub 316 for a secondary aircraft passenger bridge 324. In an embodiment, the cab 316 acts as a pier hub 316 for a secondary aircraft passenger bridge 326. In an embodiment, the cab 316 is not present, and the various secondary aircraft passenger bridges branch from the primary aircraft passenger bridge 314 at any given location that allows the various secondary aircraft passenger bridges to reach the sill height of a given RA.

In an embodiment the secondary aircraft passenger bridge 318 is configured to accommodate an RA 319. Similarly, the secondary aircraft passenger bridge 320 is configured to accommodate an RA 321. Similarly, the secondary aircraft passenger bridge 322 is configured to accommodate an RA 323. Similarly, the secondary aircraft passenger bridge 324 is configured to accommodate an RA 325. And similarly, the secondary aircraft passenger bridge 326 is configured to accommodate an RA 327.

In an embodiment, the interstitial regional aircraft boarding pier 300 is configured to allow at least one RA to dock within a docking bay area sufficient for about only a single large aircraft. In FIG. 3, the docking bay area sufficient for about only a single large aircraft is approximately delineated by the concourse 310, a starboard wingtip-clearance boundary 330, a port wingtip-clearance boundary 332, and an OFL 340 that is the boundary of the taxiway. The starboard and port wingtip-clearance boundaries 330 and 332, respectively are coupled with respective port 331 and starboard 333 wingtip-clearance boundaries for respective neighboring large aircraft 334 and 336. Accordingly, in an embodiment, the RA 323 is next to but not over the port wingtip-clearance boundary 332 because of its angled nature. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 3, the presence of the RA 325, although it is docked beyond the portion of the port wingtip-clearance boundary 332 that is orthogonal to the concourse 310, it is by definition docked in an existing docking bay area for only the single large aircraft 336. In this instance for it to taxi and dock, it is using either some of the space of the large aircraft 336 and/or some of the space of the RA 323. Additionally, the secondary aircraft boarding pier 322 can significantly retract to allow the RA 325 to pass. Similarly, the presence of the RA 327, although it is docked beyond the portion of the boundary of the 330 that is orthogonal to the concourse 310, it is by definition docked in an existing docking bay area for only a single large aircraft. In this instance for it to taxi and dock, it is using either some of the space of the large aircraft 334, and/or some of the space of the RA 319. For the RAs 319, 321, and 323, for taxiing and docking however, they likewise are using an existing docking bay area for a single large aircraft that fits between the starboard- and port wingtip clearance boundaries 330 and the 332.

In an embodiment, operation of the interstitial regional aircraft boarding pier 300 includes only the secondary aircraft passenger bridge 318 and the secondary aircraft passenger bridge 320. Accordingly, the secondary aircraft passenger bridge 322 and the secondary aircraft passenger bridge 324 are optionally present, either together or each alone with the secondary aircraft passenger bridges 318 and 320.

In an embodiment, the position of the RA 325 causes it to be a FILO aircraft. The FILO designation is because between the port- and starboard wingtip-clearance boundaries 332 and 333 there is not enough clearance between them for the RA 325 to pass next to the wing of the large aircraft 336. Accordingly, the FILO designation for the RA 325 is first in and docks at the secondary aircraft passenger bridge 324. The RA 325 is last out because it must wait for the large aircraft 336 to dock at its own large aircraft passenger bridge 342 and to be turned around for another flight or to be turned around to be moved for maintenance. In an embodiment, however, the starboard wing of the RA 325 is sufficiently below the wing of the large aircraft 336, and clearance between any significant obstruction of the large aircraft 336 and the secondary aircraft passenger bridge 322 is sufficient for the RA 325 to be a FIFO aircraft, with respect to the large aircraft 336 and/or with respect to the RA 323. In an embodiment, the RA 325 is a FIFO aircraft with respect to the large aircraft 336, because no RA is present at the secondary aircraft passenger bridge 322. In an embodiment, the secondary aircraft passenger bridge 324 can do at least one of retract toward the pier hub 316, and articulate toward the primary aircraft passenger bridge 314 in preparation for the RA 325 to taxi away from the interstitial regional aircraft boarding pier 300. According to an embodiment, the RA 327 can be a FILO aircraft or a FIFO aircraft with respect to the large aircraft 334 and the RA 319, similar to how the RA 325 can be a FILO aircraft or a FIFO aircraft with respect to the large aircraft 336 and the RA 323 as set forth in this disclosure.

When an RA at the interstitial regional aircraft boarding pier 300 is ready to push back, it must trace a path that clears the wingtips of adjacent aircraft. In an embodiment, the RA 319 waits for the secondary aircraft passenger bridge 318 to retract and/or pivot to clear the RA 319. Next, the RA 319 itself is pivoted and/or it is pushed back in a lane that clears the port wingtip of the large aircraft 334 and the starboard wingtip of the RA 321. The pushback lane is designated in arbitrary dimension and angle with respect to the concourse 310, by at least the dashed line 330 for the starboard wingtip. Where the starboard wingtip of the RA 319 is sufficiently below the port wingtip of the large aircraft 334, an actual clearance can be measured by a diagonal distance or a vertical distance between wingtips. Where useful, the RA 319 can be pivoted clockwise to avoid the port rear stabilizer of the large aircraft 334, once the RA 319 has cleared the starboard wingtip of the RA 321, if present.

In an embodiment, the RA 321 waits for the secondary passenger bridge 320 to retract and/or pivot to clear the RA 321. Next, the RA 321 is pushed back in a lane that clears the port structures of the RA 319 and the starboard structures of the RA 323 if any or both of them are present. The pushback lane is either directly orthogonal to the concourse 310, or the RA 321 can be pivoted before it crosses the OFL 340, and it can taxi away from the 300.

In an embodiment, the RA 323 waits for the secondary aircraft passenger bridge 322 to retract and/or pivot to clear the RA 323. Next, the RA 323 itself is pivoted and/or it is pushed back in a lane that clears the starboard wingtip of the large aircraft 336 and the port wingtip of the RA 321. The pushback lane is designated in arbitrary dimension and angle with respect to the concourse 310, by at least the dashed line 332 for the port wingtip. Where the port wingtip of the RA 323 is sufficiently below the starboard wingtip of the large aircraft 336, an actual clearance can be measured by a diagonal distance or a vertical distance between wingtips. Where useful, the RA 323 can be pivoted counter-clockwise to avoid the starboard rear stabilizer of the large aircraft 336, once the RA 323 has cleared the port wingtip of the RA 321, if present.

In an embodiment, a conventional and/or existing aircraft passenger bridge 314 and/or a conventional aircraft passenger bridge design is rebuilt and/or redesigned such that the original cab 316 that was configured to accommodate a single aircraft, is either replaced or reconfigured to act as a pier hub 316. In an embodiment, the cab 316 is not present, the primary aircraft passenger bridge 314 and the secondary aircraft passenger bridge 318 represent an original extended primary aircraft passenger boarding bridge, and the various secondary aircraft passenger boarding bridges attach in a "daisy chain" fashion along the passenger bridge 314/318 structure according to accommodation needs of at least one RA besides the RA 319.

In an embodiment, any two of the RAs 319, 321, 323, 325, and 327 and their respective secondary aircraft passenger bridges are present as a duo in a configuration. In an embodiment, any three of the RAs 319, 321, 323, 325, and 327 and their respective secondary aircraft passenger bridges are present as a trio in a configuration. In an embodiment, any four of the RAs 319, 321, 323, 325, and 327 and their respective secondary aircraft passenger bridges are present as a quartet in a configuration. In an embodiment, any configuration of secondary aircraft passenger bridges is provided to accommodate a given combination for the above-given RAs.

FIG. 3 also illustrates the presence of a third large aircraft 354. In an embodiment, the third large aircraft 354 is an engine-on-fuselage-rear configuration such as an MD 80 or the like. Other large aircraft, however, can be positioned as the large aircraft, if present.

Figure 4:
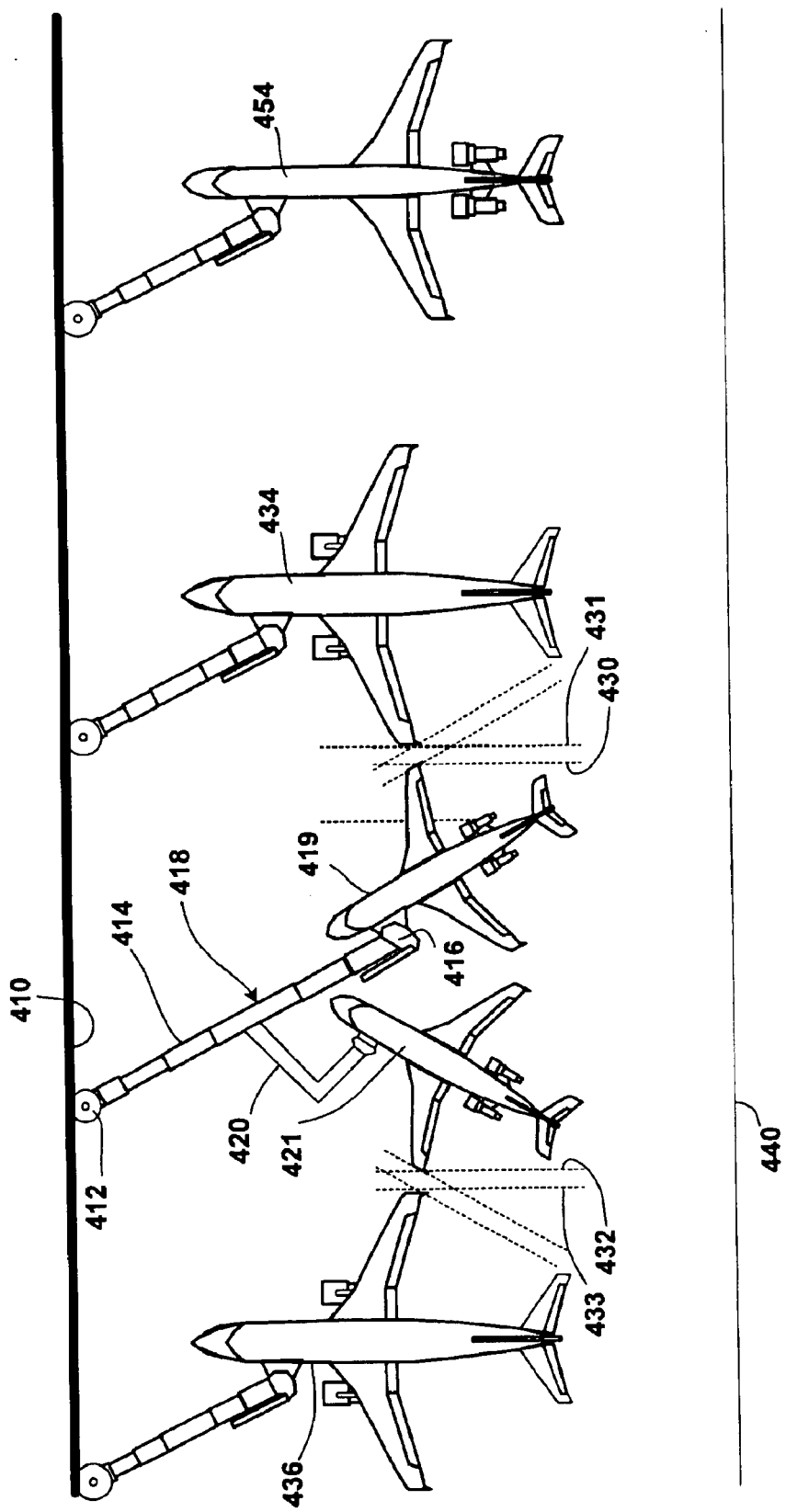
FIG. 4 is a plan of an interstitial regional aircraft boarding pier for docking about two regional aircraft or less according to an embodiment.

FIG. 4 is a plan of an interstitial regional aircraft boarding pier 400 for docking about four regional aircraft or less according to an embodiment. A concourse 410 is depicted by its external boundary. The concourse 410 provides an anchor location for the interstitial regional aircraft boarding pier 400. In an embodiment, the concourse 410 is a ground-level structure that allows passengers to walk up a ramp until the sill of a given aircraft is reached. In an embodiment, the concourse 410 is a conventional elevated structure that allows passengers to walk down a ramp until the sill of a given aircraft is reached.

In an embodiment, the interstitial regional aircraft boarding pier 400 anchors at a rotunda 412. In an embodiment, the rotunda 412 includes a swiveling functionality that allows for positioning other portions of the boarding pier 400. In an embodiment, the rotunda 412 includes a fixed structure.

A primary aircraft passenger bridge 414 is coupled to the rotunda 412. The primary aircraft passenger bridge 414 leads to a cab 416. In an embodiment, the cab 416 acts as a single docking port for a RA 419. In an embodiment, the cab 416 is at a level that allows for the sill height of any given RA depicted in FIG. 4.

In an embodiment, a cab (not pictured) is disposed at the junction 418 of the primary aircraft passenger bridge 414 and a secondary aircraft passenger bridge 420. Similar to the embodiment depicted in FIGS. 2 and 3, such a cab acts as a pier hub, and is large enough to allow passengers to be seated and wait for boarding a given RA. In an embodiment, a pier hub is not present, and the various secondary aircraft passenger bridges branch from the primary aircraft passenger bridge 414 at any given location that allows the various secondary aircraft passenger bridges to reach the sill height of a given RA.

In an embodiment the secondary aircraft passenger bridge is integral with the primary aircraft passenger bridge 414, and a virtual pier hub exists at the junction 418 of the primary aircraft passenger bridge 414 and the secondary passenger bridge 420. Similarly, the secondary aircraft passenger bridge 420 is configured to accommodate an RA 421. In an embodiment, an RA configuration includes a larger RA duo that is configured in the docking bay area sufficient for about only a single large aircraft. FIG. 4 depicts, therefore a duo of RAs that qualitatively, appear to approach the size of the large aircraft 434 and 436. In FIG. 4, the docking bay area sufficient for about only a single large aircraft is approximately delineated by the concourse 410, a starboard wingtip-clearance boundary 430, a port wingtip-clearance boundary 432, and an OFL 440 that is the boundary of the taxiway. The starboard and port wingtip-clearance boundaries 430 and 432, respectively are coupled with respective port 431 and starboard 433 wingtip-clearance boundaries for the respective neighboring large aircraft 434 and 436. Accordingly, in an embodiment, the RA 421 is next to but not over the port wingtip-clearance boundary 432 because of its angled nature. In an embodiment, the docking bay area that is sufficient for about only a single large aircraft, includes any of the areas set forth in this disclosure including those larger, substantially about 1.0 times the existing docking bay area for a single large aircraft, and those smaller.

In an embodiment, a FILO or FIFO aircraft, similar to the RA 325 and/or the RA 327 depicted in FIG. 3, that require(s) the absence of one of the large aircraft 436 and the RA 421 on one half of the docking bay, or the absence of one of the large aircraft 434 and the RA 419 on the other half of the docking bay, is/are present. For the RAs 419 and 421, for taxiing and docking however, they likewise are using an existing docking bay area for a single large aircraft that fits between the starboard and port wingtip-clearance boundaries 430 and 432.

When an RA at the interstitial regional aircraft boarding pier 400 is ready to push back, it must trace a path that clears the wingtips of adjacent aircraft. In an embodiment, the RA 419 waits for the secondary aircraft passenger bridge 418 to retract to clear the RA 419. Next, the RA 419 itself is pivoted and/or it is pushed back in a lane that clears the port wingtip of the large aircraft 434 and the starboard wingtip of the RA 421. The pushback lane is designated in arbitrary dimension and angle with respect to the concourse 410, by at least the dashed line 430 for the starboard wingtip. Where the starboard wingtip of the RA 419 is sufficiently below the port wingtip of the large aircraft 434, an actual clearance can be measured by a diagonal distance or a vertical distance between wingtips. Where useful, the RA 419 can be pivoted clockwise to avoid the port rear stabilizer of the large aircraft 434, once the RA 419 has cleared the starboard wingtip of the RA 421, if present.

In an embodiment, the RA 421 waits for the secondary passenger bridge 420 to retract and/or pivot to clear the RA 421. Next, the RA 421 is pushed back in a lane that clears the starboard structures of the large aircraft 436, if it is present.

In an embodiment, a conventional and/or existing aircraft passenger bridge 414 and/or a conventional aircraft passenger bridge design is rebuilt and/or redesigned such that the original cab 416 that was configured to accommodate a single aircraft, accommodates the RA 419. Accordingly, the secondary passenger bridge 420 attaches daisy chain fashion along the secondary aircraft passenger bridge 414 structure according to accommodation needs of at least one RA besides the RA 419.

FIG. 4 also illustrates the presence of a third large aircraft 454. In an embodiment, the third large aircraft 454 is an engine-on-fuselage-rear configuration such as an MD 80 or the like. Other large aircraft, however, can be positioned as the large aircraft, if present.

Figure 5:
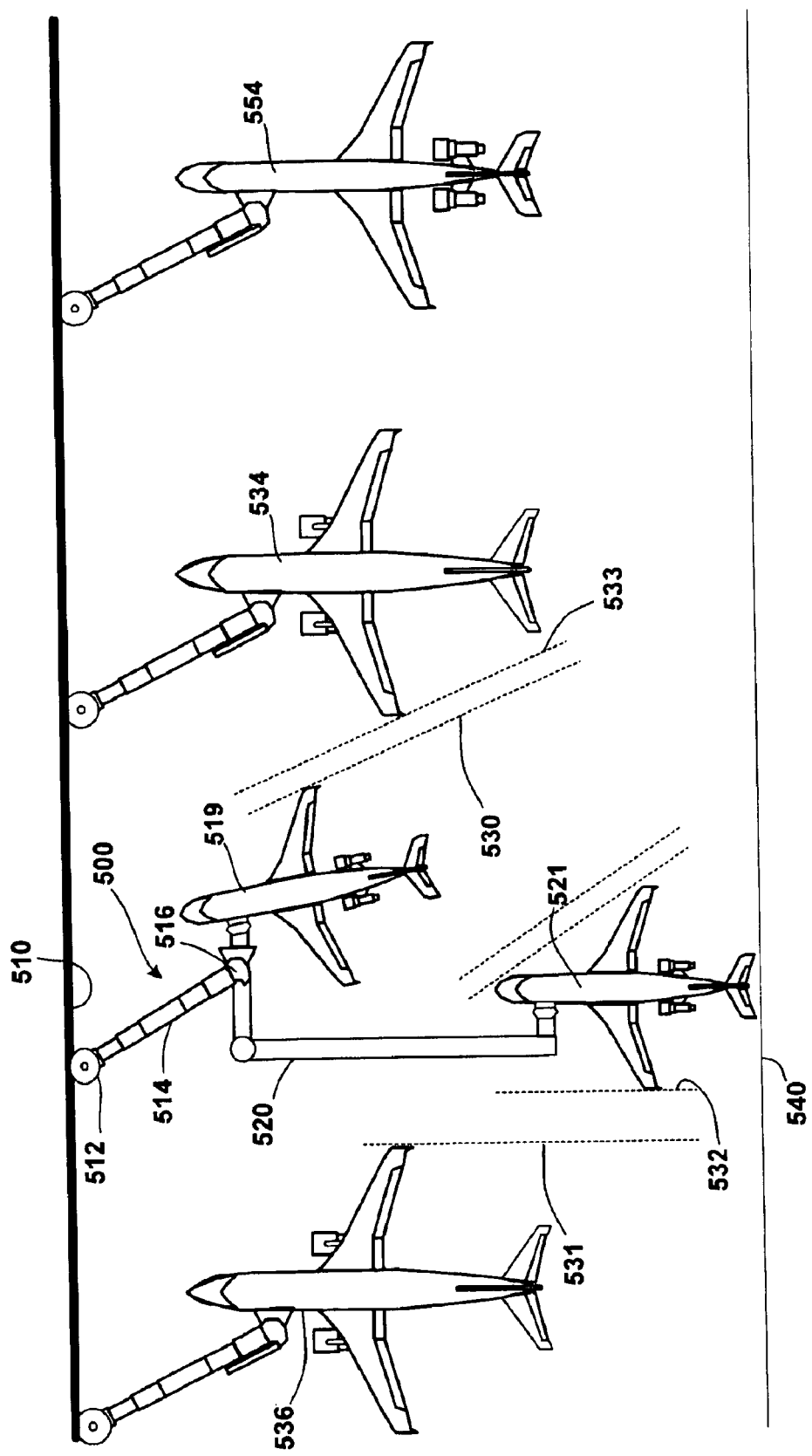
FIG. 5 is a plan of an interstitial regional aircraft boarding pier for docking about two regional aircraft or less according to an embodiment.

FIG. 5 is a plan of an interstitial regional aircraft boarding pier for docking about four regional aircraft or less according to an embodiment. A concourse 510 is depicted by its external boundary. The concourse 510 provides an anchor location for the interstitial regional aircraft boarding pier 500. In an embodiment, the concourse 510 is a ground-level structure that allows passengers to walk up a ramp until the sill of a given aircraft is reached. In an embodiment, the concourse 510 is a conventional elevated structure that allows passengers to walk down a ramp until the sill of a given aircraft is reached.

In an embodiment, the interstitial regional aircraft boarding pier 500 anchors at a rotunda 512. In an embodiment, the rotunda 512 includes a swiveling functionality that allows for positioning other portions of the boarding pier 500. In an embodiment, the rotunda 512 includes a fixed structure.

A primary aircraft passenger bridge 514 is coupled to the rotunda 512. The primary aircraft passenger bridge 514 leads to a cab 5. In an embodiment, the cab 516 acts as a single docking port for a RA 519. In an embodiment, the cab 516 is at a level that allows for the sill height of any given RA depicted in FIG. 5.

In an embodiment depicted in FIG. 5, a pier hub is not present, and the various secondary aircraft passenger bridges branch from the primary aircraft passenger bridge 514 at any given location that allows the various secondary aircraft passenger bridges to reach the sill height of a given RA. In FIG. 5, a secondary passenger bridge 520 branches from the cab 516.

In an embodiment the secondary aircraft passenger bridge is integral with the primary aircraft passenger bridge 514, and a virtual pier hub exists at the junction of the cab 516 and the primary aircraft passenger bridge 514. Similarly, the secondary aircraft passenger bridge 520 is configured to accommodate an RA 521. In an embodiment, a larger-size RA duo is configured in the docking bay area sufficient for about only a single large aircraft. FIG. 5 depicts, therefore a duo of RAs that qualitatively, appear to approach the size of the large aircraft 534 and 536. In FIG. 5, the docking bay area sufficient for about only a single large aircraft is approximately delineated by the concourse 510, a starboard wingtip-clearance boundary 530, a port wingtip-clearance boundary 532, and an OFL 540 that is the boundary of the taxiway. The starboard and port wingtip-clearance boundaries 530 and 532, respectively are coupled with respective starboard 531 and port 533 wingtip-clearance boundaries for the respective neighboring large aircraft 534 and 536. Accordingly, in an embodiment, the RA 521 is next to but not over the port wingtip-clearance boundary 532 because of its staggered configuration with respect to its position with the concourse 510 and the RA 519. In an embodiment, the area that is sufficient for about only a single large aircraft, includes any of the areas set forth in this disclosure including those larger, substantially about 1.0 times the existing area for a single large aircraft, and those smaller.

In an embodiment, a FILO or FIFO aircraft, similar to the RA 325 and/or the RA 327 depicted in FIG. 3, that require(s) the absence of one of the large aircraft 536 and the RA 521 on one half of the docking bay, or the absence of one of the large aircraft 534 and the RA 519 on the other half of the docking bay, is/are present. For the RAs 519 and 521, for taxiing and docking however, they likewise are using an existing docking bay area for only a single large aircraft that fits between the starboard wingtip-clearance boundary 530 and the port wingtip-clearance boundary 532.

When an RA at the interstitial regional aircraft boarding pier 500 is ready to push back, it must trace a path that clears the wingtips of adjacent aircraft. In an embodiment, the RA 519 waits for the cab 516 to retract to clear the RA 519. Next, the RA 519 itself is pivoted and/or it is pushed back in a lane that clears the port wingtip of the large aircraft 534 and the starboard wingtip of the RA 521. The pushback lane is designated in arbitrary dimension and angle with respect to the concourse 510, by at least the dashed line 530 for the starboard wingtip. Where the starboard wingtip of the RA 519 is sufficiently below the port wingtip of the large aircraft 534, an actual clearance can be measured by a diagonal distance or a vertical distance between wingtips. Where useful, the RA 519 can be pivoted counter-clockwise to avoid the port rear stabilizer of the large aircraft 534, once the RA 519 has cleared the starboard wingtip of the RA 521, if present.

In an embodiment, the RA 521 waits for the secondary passenger bridge 520 to retract and/or pivot to clear the RA 521. In an embodiment, the secondary passenger bridge 520 is not a "dogleg" configuration, rather, it is a linear corridor that originates at the cab 516, and therefore terminates at its own cab (not labeled) in preparation for docking with the RA 521. Next, the RA 521 is pushed back and/or rotated in preparation for taxiing.

In an embodiment, a conventional and/or existing aircraft passenger bridge 514 and/or a conventional aircraft passenger bridge design is rebuilt and/or redesigned such that the original cab 516 that was configured to accommodate a single aircraft, accommodates the RA 519. Accordingly, the secondary passenger bridge 520 attaches daisy chain fashion along the primary aircraft passenger bridge 514 structure according to accommodation needs of at least one RA besides the RA 519. In other words, the secondary passenger bridge 520 attaches at a non-hub location along the primary aircraft passenger bridge 514 that makes the attachment junction a virtual hub. An example is given in FIG. 4 at the junction 418.

FIG. 5 also illustrates the presence of a third large aircraft 554. In an embodiment, the third large aircraft 5 is an engine-on-fuselage-rear configuration such as an MD 80 or the like. Other large aircraft, however, can be positioned as the large aircraft, if present.

Figure 6:
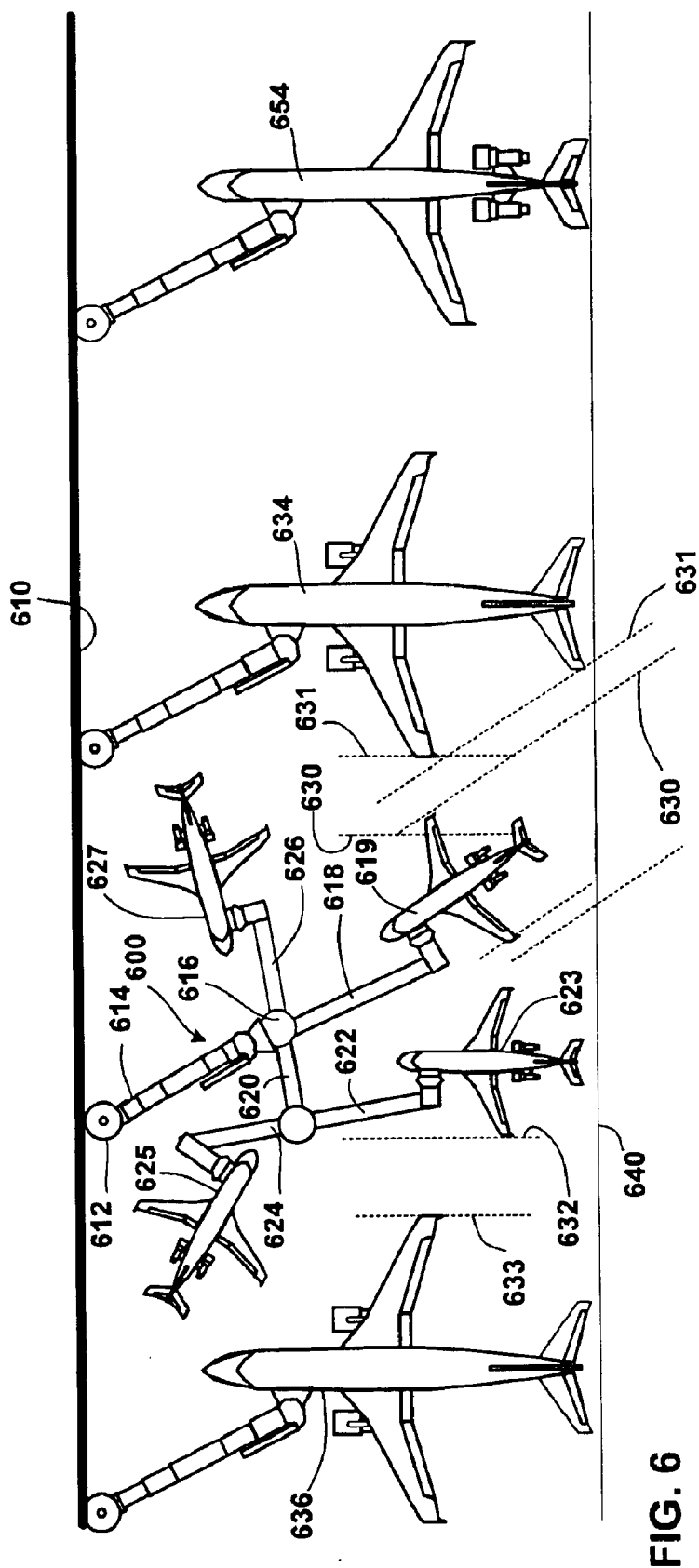
FIG. 6 is a plan of an interstitial regional aircraft boarding pier for docking about four regional aircraft or less according to an embodiment.

FIG. 6 is a plan of an interstitial regional aircraft boarding pier 600 for docking about four regional aircraft or less according to an embodiment. A concourse 610 is depicted by its external boundary. The concourse 610 provides an anchor location for the interstitial regional aircraft boarding pier 600. In an embodiment, the concourse 610 is a ground-level structure that allows passengers to walk up a ramp until the sill of a given aircraft is reached. In an embodiment, the concourse 610 is a conventional elevated structure that allows passengers to walk down a ramp until the sill of a given aircraft is reached.

In an embodiment, the interstitial regional aircraft boarding pier 600 anchors at a rotunda 612. In an embodiment, the rotunda 612 includes a swiveling functionality that allows for positioning other portions of the boarding pier 600. In an embodiment, the rotunda 612 includes a fixed structure.

A primary aircraft passenger bridge 614 is coupled to the rotunda 612. The primary aircraft passenger bridge 614 leads to a cab 616. In an embodiment, the cab 616 acts as a pier hub 616 for at least one secondary aircraft passenger bridge. In an embodiment, the cab 616 is at a level that allows for coupling at the sill height of any given RA depicted in FIG. 6. In an embodiment, the cab 616 is large enough to allow for more passenger grouping during boarding and deplaning. In an embodiment, the cab 616 is large enough to allow passengers to be seated and wait for boarding a given RA. In an embodiment, the cab 616 acts as a pier hub 616 for a secondary aircraft passenger bridge 618. In an embodiment, the cab 616 acts as a pier hub 616 for a secondary aircraft passenger bridge 620. The secondary aircraft passenger bridge 620 terminates at a "T" that is accommodated by a second pier hub 621. In an embodiment, the second pier hub 621 is coupled to a secondary aircraft passenger bridge 622. In an embodiment, the second pier hub 621 is coupled to a secondary aircraft passenger bridge 624. In an embodiment, the cab 616 acts as a pier hub 616 for a secondary aircraft passenger bridge 626. In an embodiment, the cab 616 is not present, and the various secondary aircraft passenger bridges branch from the primary aircraft passenger bridge 614 at any given location that allows the various secondary aircraft passenger bridges to reach the sill height of a given RA. In an embodiment, the second pier hub 621 is not present, but a virtual pier hub exists at the location where the second pier hub 621 appears, and the various secondary aircraft passenger bridges that branch from the secondary passenger bridge 620, allows the various secondary aircraft passenger bridges to reach the sill height of a given RA.

In an embodiment the secondary aircraft passenger bridge 618 is configured to accommodate an RA 619. Similarly, the secondary aircraft passenger bridge 620 is configured to the second pier hub 621 or a virtual pier hub at the location of the second pier hub 621. Similarly, the secondary aircraft passenger bridge 622 is configured to accommodate an RA 623. Similarly, the secondary aircraft passenger bridge 624 is configured to accommodate an RA 625. And similarly, the secondary aircraft passenger bridge 626 is configured to accommodate an RA 627.

In an embodiment, the interstitial regional aircraft boarding pier 600 is configured to allow at least one RA to dock within a docking bay area sufficient for about only a single large aircraft. In FIG. 6, the docking bay area sufficient for about only a single large aircraft is approximately delineated by the concourse 610, a starboard wingtip-clearance boundary 630, a port wingtip-clearance boundary 632, and an OFL 640 that is the boundary of the taxiway. The starboard and port wingtip-clearance boundaries 630 and 632, respectively are coupled with respective port 631 and starboard 633 wingtip-clearance boundaries for respective neighboring large aircraft 634 and 636. Accordingly, in an embodiment, the RA 623 is next to but not over the port wingtip-clearance boundary 632. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 6, the presence of the RA 625, although it is docked beyond the portion of the boundary of the 632 that is orthogonal to the concourse 610, it is by definition docked in an existing docking bay area for only the single large aircraft 636. In this instance for it to taxi and dock, it is using either some of the space of the large aircraft 636 and/or some of the space of the RA 623. Similarly, the presence of the RA 627, although it is docked beyond the portion of the boundary of the starboard wingtip-clearance boundary 630 that is orthogonal to the concourse 610, it is by definition docked in an existing docking bay area for only a single large aircraft. In this instance for it to taxi and dock, it is using either some of the space of the large aircraft 634, and/or some of the space of the RA 619. For the RAs 619 and 623, for taxiing and docking however, they likewise are using an existing docking bay area for a single large aircraft that fits between the starboard and port wingtip-clearance boundaries 630 and 632.

In an embodiment, operation of the interstitial regional aircraft boarding pier 600 includes only the secondary aircraft passenger bridge 618 and the secondary aircraft passenger bridge 622. Accordingly, the secondary aircraft passenger bridge 624 and the secondary aircraft passenger bridge 626 are optionally present, either together or each alone with the secondary aircraft passenger bridges 618 and 622. Where the secondary aircraft passenger bridge 622 is alone with the secondary aircraft passenger bridge 618, it can be angled as a linear corridor, out of the pier hub 616, according to an embodiment.

In an embodiment, the secondary aircraft passenger bridge 624 causes the RA 625 to be a FILO aircraft. The FILO designation is because between the port wingtip-clearance boundary 632 and the starboard and port wingtip-clearance boundary 633 there is not enough clearance between them for the RA 625 to pass next to the wing of the large aircraft 636. Accordingly, the FILO designation for the RA 625 is first in and docks at the secondary aircraft passenger bridge 624. The RA 625 is last out because it must wait for the large aircraft 636 to dock at its own large aircraft passenger bridge 642 and to be turned around for another flight or to be turned around to be moved for maintenance. In an embodiment, however, the starboard wing of the RA 625 is sufficiently below the wing of the large aircraft 636, and clearance between any significant obstruction of the large aircraft 636 and the secondary aircraft passenger bridge 622 is sufficient for the RA 625 to be a FIFO aircraft, with respect to the large aircraft 636 and/or with respect to the RA 623. In an embodiment, the RA 625 is a FIFO aircraft with respect to the large aircraft 636, because no RA is present at the secondary aircraft passenger bridge 622. In an embodiment, the secondary aircraft passenger bridge 624 can do at least one of retract toward the second pier hub 621, and articulate toward the primary aircraft passenger bridge 614 in preparation for the RA 625 to taxi away from the interstitial regional aircraft boarding pier 600. According to an embodiment, the RA 627 can be a FILO aircraft or a FIFO aircraft with respect to the large aircraft 634 and the RA 619, similar to how the RA 325 can be a FILO aircraft or a FIFO aircraft with respect to the large aircraft 336 and the RA 323 (FIG. 3) as set forth in this disclosure.

When an RA at the interstitial regional aircraft boarding pier 600 is ready to push back, it must trace a path that clears the wingtips of adjacent aircraft. In an embodiment, the RA 619 waits for the secondary aircraft passenger bridge 618 to retract and/or pivot to clear the RA 619. Next, the RA 619 itself is pivoted and/or it is pushed back in a lane that clears the port wingtip of the large aircraft 634 and the starboard wingtip of the RA 623. The pushback lane is designated in arbitrary dimension and angle with respect to the concourse 610, by at least the dashed line 630 for the starboard wingtip. Where the starboard wingtip of the RA 619 is sufficiently below the port wingtip of the large aircraft 634, an actual clearance can be measured by a diagonal distance or a vertical distance between wingtips. Where useful, the RA 619 can be pivoted clockwise to avoid the port rear stabilizer of the large aircraft 634, once the RA 623 has cleared the starboard wingtip of the RA 623, if present.

In an embodiment, the RA 623 waits for the secondary aircraft passenger bridge 622 to retract and/or pivot to clear the RA 623. Next, the RA 623 is pushed back in a lane that clears the port structures of the RA 619 and the starboard structures of the large aircraft 636 if any or both of them are present. The pushback lane is either directly orthogonal to the concourse 610, or the RA 623 can be pivoted before it crosses the OFL 640, and it can taxi away from the interstitial regional aircraft boarding pier 600.

In an embodiment, a conventional and/or existing aircraft passenger bridge 614 and/or a conventional aircraft passenger bridge design is rebuilt and/or redesigned such that the original cab that was configured to accommodate a single aircraft, is either replaced or reconfigured to act as a pier hub. In an embodiment, the cab is not present, the primary aircraft passenger bridge 614 and the secondary aircraft passenger bridge 618 represent an original extended primary aircraft passenger boarding bridge, and the various secondary aircraft passenger boarding bridges attach in a "daisy chain" fashion along the passenger bridge 614/618 structure according to accommodation needs of at least one RA besides the RA 619.

In an embodiment, any two of the RAs 619, 623, 625, and 627 and their respective secondary aircraft passenger bridges are present as a duo in a configuration. In an embodiment, any three of the RAs 619, 623, 625, and 627 and their respective secondary aircraft passenger bridges are present as a trio in a configuration. In an embodiment, any configuration of secondary aircraft passenger bridges is provided to accommodate a given combination for the above-given RAs.

FIG. 6 also illustrates the presence of a third large aircraft 654. In an embodiment, the third large aircraft 654 is an engine-on-fuselage-rear configuration such as an MD 80 or the like. Other large aircraft, however, can be positioned as the large aircraft, if present.

Figure 7:
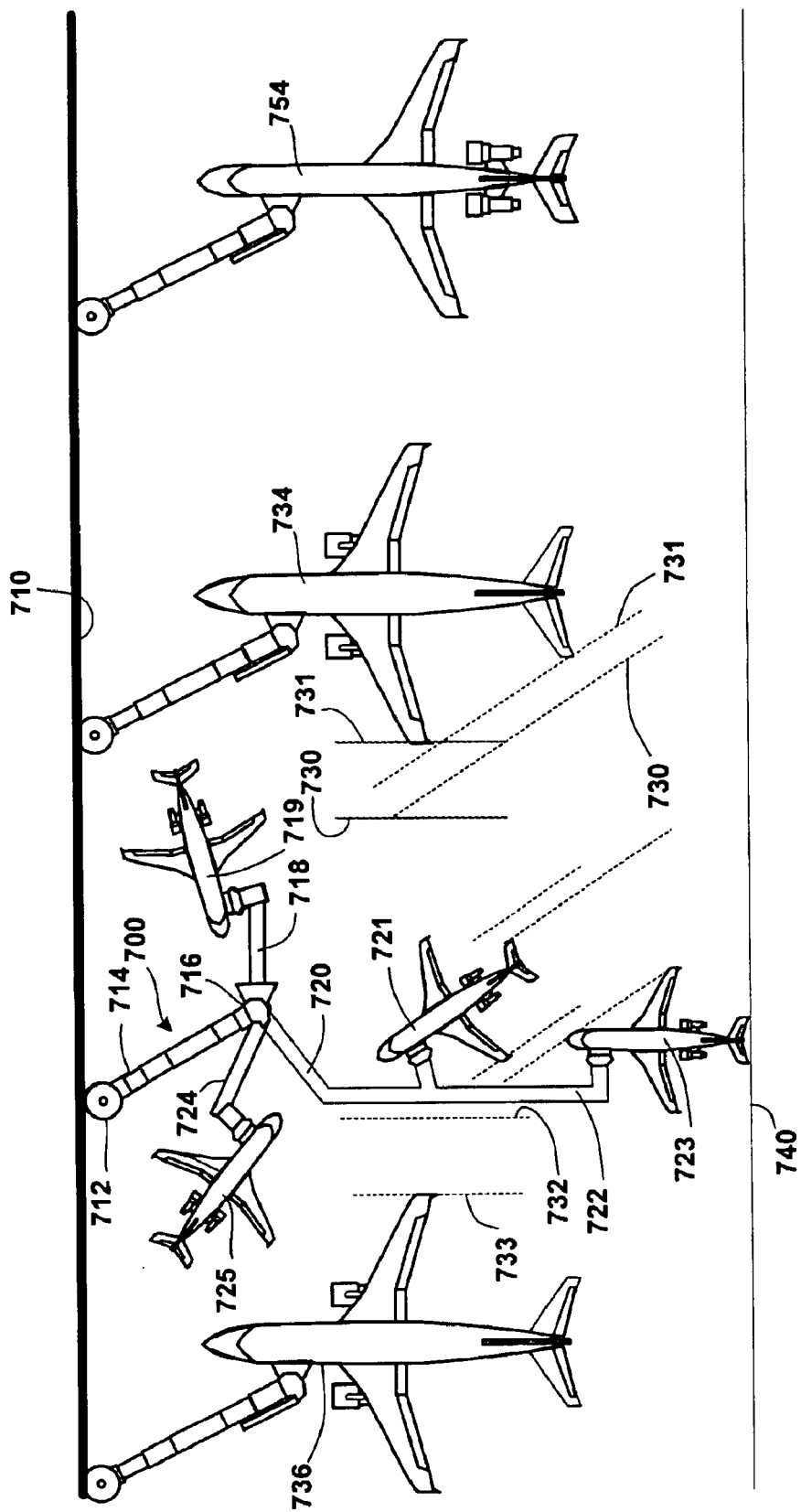
FIG. 7 is a plan of an interstitial regional aircraft boarding pier for docking about four regional aircraft or less according to an embodiment.

FIG. 7 is a plan of an interstitial regional aircraft boarding pier 700 for docking about four regional aircraft or less according to an embodiment. A concourse 710 is depicted by its external boundary. The concourse 710 provides an anchor location for the interstitial regional aircraft boarding pier 700. In an embodiment, the concourse 710 is a ground-level structure that allows passengers to walk up a ramp until the sill of a given aircraft is reached. In an embodiment, the concourse 710 is a conventional elevated structure that allows passengers to walk down a ramp until the sill of a given aircraft is reached.

In an embodiment, the interstitial regional aircraft boarding pier 700 anchors at a rotunda 712, into which passengers first embark upon leaving the concourse 710. In an embodiment, the rotunda 712 includes a swiveling functionality that allows for positioning other portions of the boarding pier 700. In an embodiment, the rotunda 712 includes a fixed structure.

A primary aircraft passenger bridge 714 is coupled to the rotunda 712. The primary aircraft passenger bridge 714 leads to a cab 716. In an embodiment, the cab 716 acts as a pier hub 716 for at least one secondary aircraft passenger bridge. In an embodiment, the cab 716 acts as a pier hub 716 for a secondary aircraft passenger bridge 718. In an embodiment, the cab 716 acts as the final link (see the cab 1816, FIG. 18) to an RA. In an embodiment, the cab 716 acts as a pier hub 716 for a secondary aircraft passenger bridge 720. In an embodiment, the cab 716 acts as a pier hub 716 for a secondary aircraft passenger bridge 722. The secondary aircraft passenger bridge 722 is also referred to as a tertiary aircraft passenger bridge 722 because it originates from a secondary aircraft passenger bridge 720. In an embodiment, the cab 716 acts as a pier hub 716 for a secondary aircraft passenger bridge 724.

In an embodiment the secondary aircraft passenger bridge 718 is configured to accommodate an RA 719. In an embodiment, the secondary aircraft passenger bridge 718 is not present, and the RA 719 is docked with the cab 716 (see FIG. 18), which is the final link to the RA 719. In this embodiment, the RA 719 is angled similarly to the RA 721. Similarly, the secondary aircraft passenger bridge 720 is configured to accommodate the RA 721. Similarly, the secondary aircraft passenger bridge 722 is configured to accommodate an RA 723. And similarly, the secondary aircraft passenger bridge 724 is configured to accommodate an RA 725.

In an embodiment, the interstitial regional aircraft boarding pier 700 is configured to allow at least one RA to dock within a docking bay area sufficient for about only a single large aircraft. In FIG. 7, the docking bay area sufficient for about only a single large aircraft is approximately delineated by the concourse 710, a starboard wingtip-clearance boundary 730, a port wingtip-clearance boundary 732, and an OFL 740 that is the boundary of the taxiway. The starboard and port wingtip-clearance boundaries 730 and 732, respectively are coupled with respective port 731 and starboard 733 wingtip-clearance boundaries for respective neighboring large aircraft 734 and 736. In an embodiment, the respective large neighboring aircraft 734 and 736 are two-engine-on-wing aircraft such as a version of the Boeing® 737 or a version of the Airbus® A320 or A319. Other large aircraft, however, can be docked according to an embodiment. Accordingly, in an embodiment, the RA 723 is next to but not over the OFL 740. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 7, the presence of the RA 725 is either a FILO or a FIFO aircraft as set forth in disclosure. In an embodiment, operation of the interstitial regional aircraft boarding pier 700 includes only the secondary aircraft passenger bridge 718 and the secondary aircraft passenger bridge 720. Accordingly, the 722 and the 724 are optionally present, either together or each alone with the secondary aircraft passenger bridges 718 and 720.

When an RA at the interstitial regional aircraft boarding pier 700 is ready to push back, it must trace a path that clears the wingtips of adjacent aircraft, according to the various embodiments set forth in this disclosure. In an embodiment, the RA 719 waits for the secondary aircraft passenger bridge 718 to retract and/or pivot to clear the RA 719.

In an embodiment, a conventional and/or existing aircraft passenger bridge 714 and/or a conventional aircraft passenger bridge design is rebuilt and/or redesigned according to the various embodiments set forth in this disclosure.

In an embodiment, any two of the RAs 719, 721, 723, and 725 and their respective secondary aircraft passenger bridges are present as a duo in a configuration. In an embodiment, any three of the RAs 719, 721, 723, and 725 and their respective secondary aircraft passenger bridges are present as a trio in a configuration. In an embodiment, any configuration of secondary aircraft passenger bridges is provided to accommodate a given combination for the above-given RAs.

FIG. 7 also illustrates the presence of a third large aircraft 754. In an embodiment, the third large aircraft 754 is an engine-on-fuselage-rear configuration such as an MD 80 or the like. Other large aircraft, however, can be positioned as the large aircraft, if present.

Figure 8:
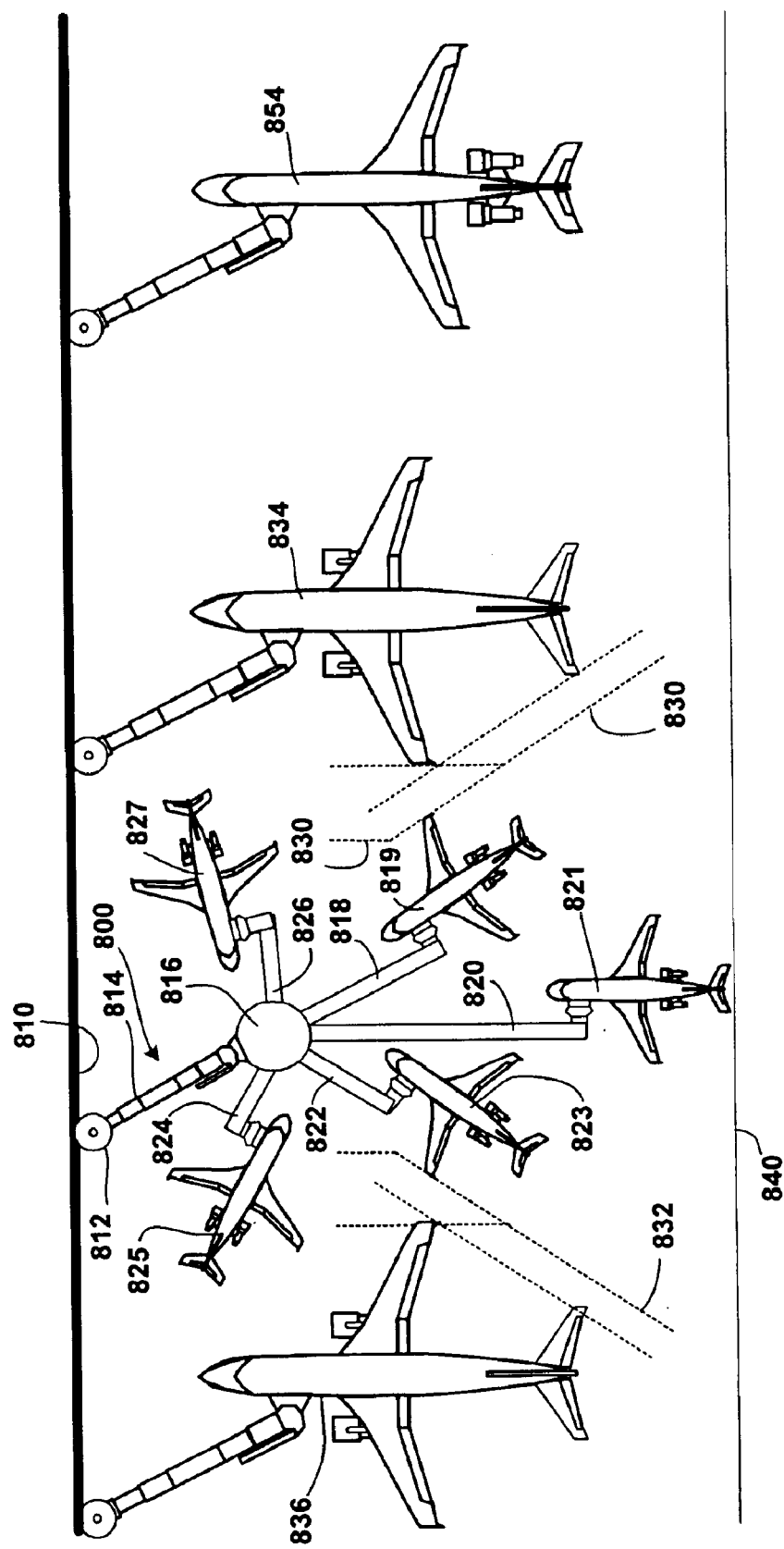
FIG. 8 is a plan of an interstitial regional aircraft boarding pier for docking about five regional aircraft or less according to an embodiment.

FIG. 8 is a plan of an interstitial regional aircraft boarding pier 800 for docking about five regional aircraft or less according to an embodiment. In FIG. 8, the various structures and embodiments from FIG. 3 can be mapped to analogous reference numbers. In FIG. 8, the distance from the concourse 810 to the OFL 840 is significantly larger. This larger distance allows the RAs 819, 821, and 823 to be staggered with a narrower lateral footprint. Accordingly, the RAs 819 and 823 are significantly closer together than the RAs 319 and 323 in FIG. 3. Therefore, the RAs 825 and 827 have more clearance to pass between docked aircraft.

Figure 9:
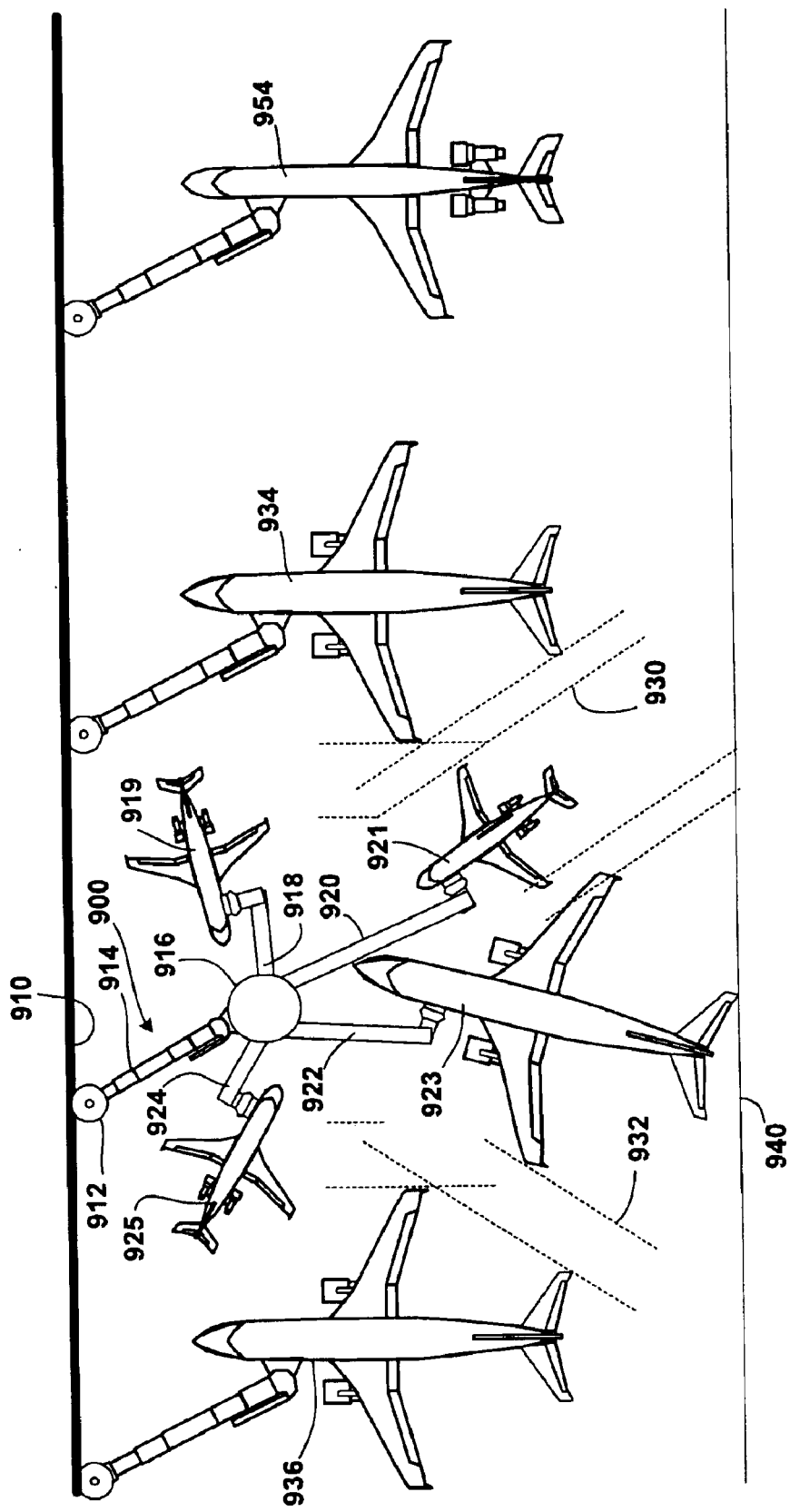
FIG. 9 is a plan of an interstitial regional aircraft boarding pier for docking about three regional aircraft or less and one large aircraft according to an embodiment.

FIG. 9 is a plan of an interstitial regional aircraft boarding pier 900 for docking about three regional aircraft or less, and one large aircraft according to an embodiment. A concourse 910 is depicted by its external boundary. The concourse 910 provides an anchor location for the interstitial regional aircraft boarding pier 900. In an embodiment, the concourse 910 is a ground-level structure that allows passengers to walk up a ramp until the sill of a given aircraft is reached. In an embodiment, the concourse 910 is a conventional elevated structure that allows passengers to walk down a ramp until the sill of a given aircraft is reached.

In an embodiment, the interstitial regional aircraft boarding pier 900 anchors at a rotunda 912, into which passengers first embark upon leaving the concourse 910. In an embodiment, the rotunda 912 includes a swiveling functionality that allows for positioning other portions of the boarding pier 900. In an embodiment, the rotunda 912 includes a fixed structure.

A primary aircraft passenger bridge 914 is coupled to the rotunda 912. The primary aircraft passenger bridge 914 leads to a cab 916. In an embodiment, the cab 916 acts as a pier hub 916 for at least one secondary aircraft passenger bridge. In an embodiment depicted in FIG. 9, the cab 916 acts as a pier hub 916 for a secondary aircraft passenger bridge 918. In an embodiment, the cab 916 acts as the final link to an RA 919 (see FIG. 18). In an embodiment, depicted in FIG. 9, the cab 916 acts as a pier hub 916 for a secondary aircraft passenger bridge 920. In an embodiment, depicted in FIG. 9, the cab 916 acts as a pier hub 916 for a secondary aircraft passenger bridge 922. In an embodiment, depicted in FIG. 9, the cab 916 acts as a pier hub 916 for a secondary aircraft passenger bridge 924.

In an embodiment the secondary aircraft passenger bridge 918 is configured to accommodate an RA 919. In an embodiment, the secondary aircraft passenger bridge 918 is not present, and the RA 919 is docked with the cab 916, which is the final link to the RA 919. In this embodiment, the RA 919 is angled similarly to the RA 921. Similarly, the secondary aircraft passenger bridge 920 is configured to accommodate the RA 921. Similarly, the secondary aircraft passenger bridge 922 is configured to accommodate a large aircraft 923. In this embodiment, the large aircraft 923 is a two-engine-on-wing aircraft such as a version of the Boeing® 737 or a version of the Airbus® A320 or A319. Other large aircraft, however, can be docked according to an embodiment. And similarly, the secondary aircraft passenger bridge 924 is configured to accommodate an RA 925.

In an embodiment, the interstitial regional aircraft boarding pier 900 is configured to allow at least one RA to dock within a docking bay area sufficient for about only a single large aircraft. In FIG. 9, the docking bay area sufficient for about only a single large aircraft is approximately delineated by the concourse 910, a starboard wingtip-clearance boundary 930, a port wingtip-clearance boundary 932, and an OFL 940 that is the boundary of the taxiway. The starboard and port wingtip-clearance boundaries 930 and 932, respectively are coupled with respective port 931 and starboard 933 wingtip-clearance boundaries for respective neighboring large aircraft 934 and 936. In an embodiment, the respective large neighboring aircraft 934 and 936 are two-engine-on-wing aircraft such as a version of the Boeing® 737 or a version of the Airbus® A320 or A319. Other large aircraft, however, can be docked according to an embodiment. Accordingly, in an embodiment, the large 923 is next to but not over the OFL 940. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 9, the presence of the RA 925 is either a FILO or a FIFO aircraft as set forth in disclosure. In an embodiment, operation of the interstitial regional aircraft boarding pier 900 includes only the secondary aircraft passenger bridge 918 and the secondary aircraft passenger bridge 922. Accordingly, the secondary aircraft passenger bridge 920 and the secondary aircraft passenger bridge 924 are optionally present, either together or each alone with the secondary aircraft passenger bridges 918 and 922.

When an RA at the interstitial regional aircraft boarding pier 900 is ready to push back, it must trace a path that clears the wingtips of adjacent aircraft, according to the various embodiments set forth in this disclosure. In an embodiment, the RA 919 waits for the secondary aircraft passenger bridge 918 to retract and/or pivot to clear the RA 919.

In an embodiment, a conventional and/or existing aircraft passenger bridge 914 and/or a conventional aircraft passenger bridge design is rebuilt and/or redesigned according to the various embodiments set forth in this disclosure.

In an embodiment, any one of the RAs 919, 921, and 925 and its respective secondary aircraft passenger bridge is present with the large aircraft 923 as a duo in a configuration. In one embodiment, the secondary aircraft passenger bridge 920 is integral with the primary aircraft passenger bridge 914 to provide docking with the RA 921, and the secondary aircraft passenger bridge 922 attaches along the primary aircraft passenger bridge 914/920. In an embodiment, any two of the RAs 919, 921, and 925 and their respective secondary aircraft passenger bridges are present with the large aircraft 923 as a trio in a configuration. In an embodiment, any configuration of secondary aircraft passenger bridges is provided to accommodate a given combination for the above-given RAs.

FIG. 9 also illustrates the presence of a fourth large aircraft 954. In an embodiment, the third large aircraft 754 is an engine-on-fuselage-rear configuration such as an MD 80 or the like. Other large aircraft, however, can be positioned as the large aircraft, if present.

Figure 10:
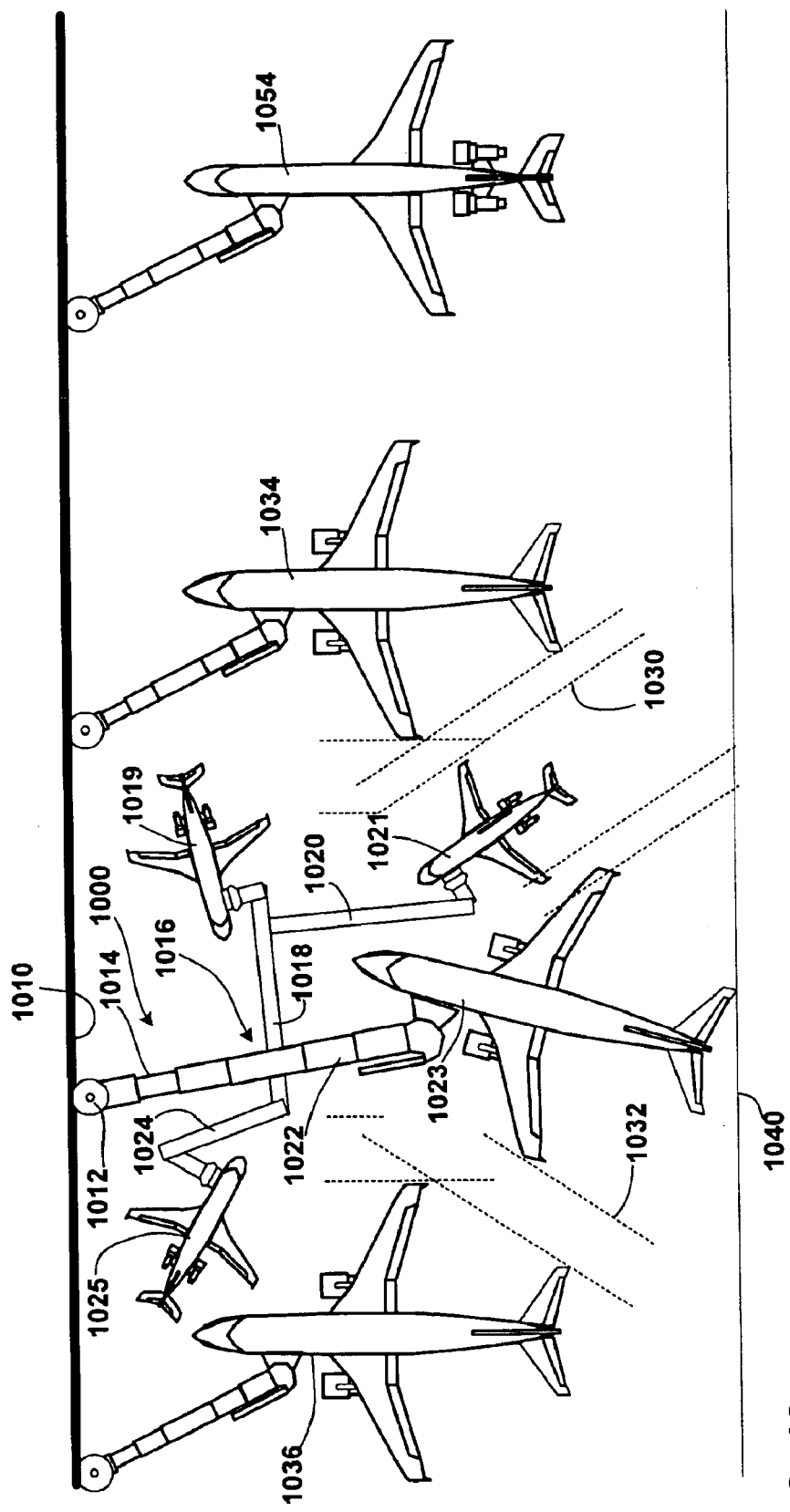
FIG. 10 is a plan of an interstitial regional aircraft boarding pier for docking about three regional aircraft or less and one large aircraft according to an embodiment.

FIG. 10 is a plan of an interstitial regional aircraft boarding pier for docking about three regional aircraft and one large aircraft according to an embodiment. The various structures and embodiments from FIG. 9 can be mapped to analogous reference numbers in FIG. 10. In FIG. 10, the pier hub 1016 is depicted as a virtual pier hub. Accordingly, the primary aircraft passenger bridge 1014 and 1022 are part of an integral aircraft passenger bridge, which has the aircraft passenger bridges 1018 and 1024 daisy chain attached, and the tertiary aircraft passenger bridge 1020 coupled to the secondary aircraft passenger bridge 1018. In an embodiment, the virtual pier hub 1016 is located at a height that allows each of the subsequent aircraft passenger bridges to reach a given sill height for a given docked aircraft.

Figure 11:
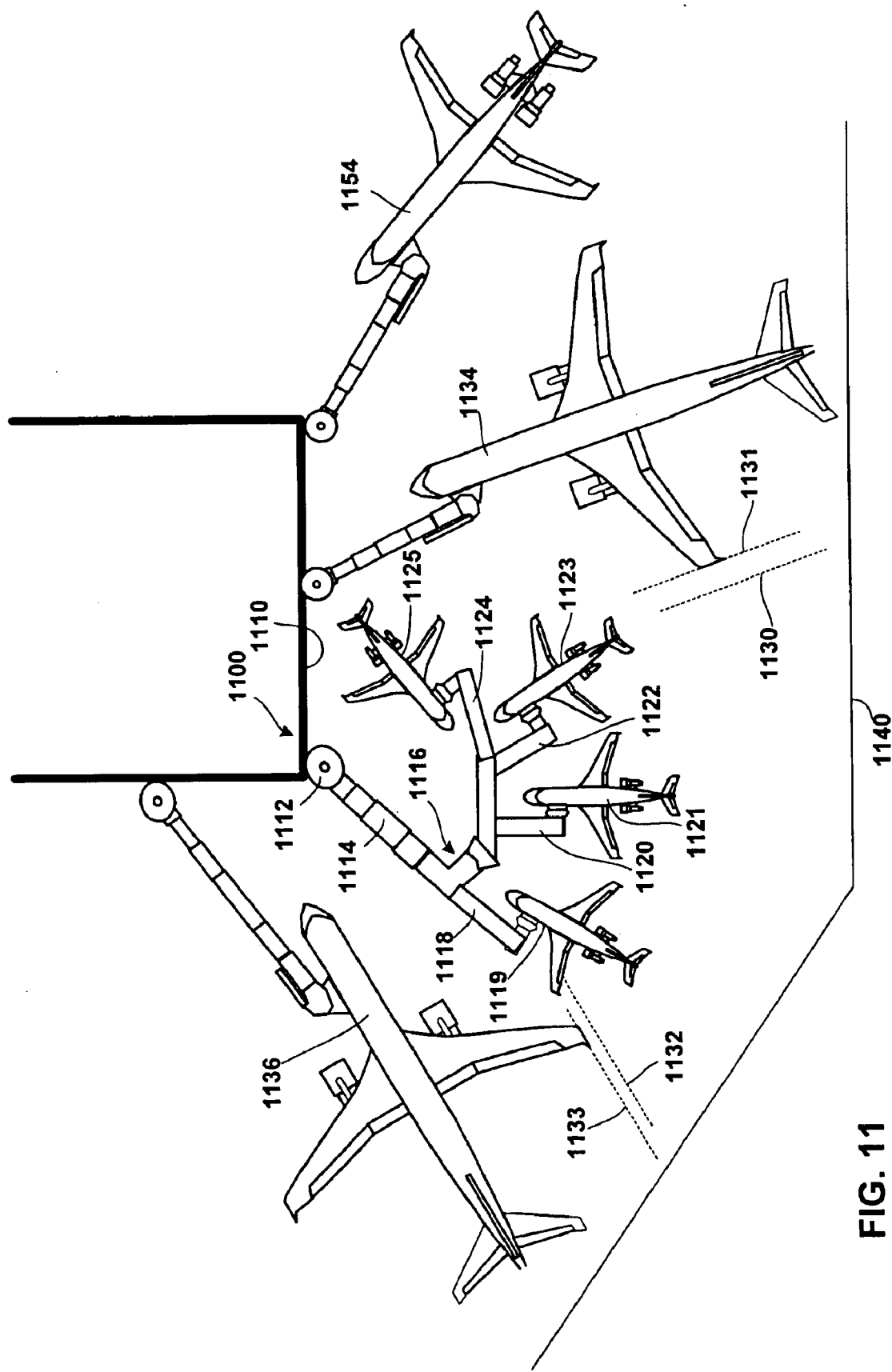
FIG. 11 is a plan of an interstitial regional aircraft boarding pier for docking about four regional aircraft or less according to an embodiment.

FIG. 11 is a plan of an interstitial regional aircraft boarding pier 1100 for docking about four regional aircraft or less at a concourse terminus according to an embodiment. The terminus of a concourse 1110 is depicted by its external boundary. The concourse 1110 provides an anchor location for the interstitial regional aircraft boarding pier 1100. In an embodiment, the concourse 1110 is a ground-level structure that allows passengers to walk up a ramp until the sill of a given aircraft is reached. In an embodiment, the concourse 1110 is a conventional elevated structure that allows passengers to walk down a ramp until the sill of a given aircraft is reached.

In an embodiment, the interstitial regional aircraft boarding pier 1100 anchors at a rotunda 1112, into which passengers first embark upon leaving the concourse 1110. In an embodiment, the rotunda 1112 includes a swiveling functionality that allows for positioning other portions of the boarding pier 1100. In an embodiment, the rotunda 1112 includes a fixed structure.

A primary aircraft passenger bridge 1114 is coupled to the rotunda 1112. The primary aircraft passenger bridge 1114 leads to a cab 1116 or a virtual cab 1116. In an embodiment, the cab 1116 acts as a pier hub 1116 for at least one secondary aircraft passenger bridge. In an embodiment, the cab 1116 is at a level that allows for the sill height of any given RA depicted in FIG. 11. In an embodiment, the cab 1116 is large enough to allow for more passenger grouping during boarding and deplaning. In an embodiment, the cab 1116 is large enough to allow passengers to be seated and wait for boarding a given RA. In an embodiment depicted in FIG. 11, the cab 1116 acts as a pier hub 1116 for a secondary aircraft passenger bridge 1118. In an embodiment, the cab 1116 acts as a pier hub 1116 for a secondary aircraft passenger bridge 1120. In an embodiment, the cab 1116 acts as a pier hub 1116 for a secondary aircraft passenger bridge 1122. In an embodiment, the cab 1116 acts as a pier hub 1116 for a secondary aircraft passenger bridge 1124. In an embodiment, the cab 1116 acts as a pier hub 1116 for a secondary aircraft passenger bridge 1126. In an embodiment, the cab 1116 is not present, and the various secondary aircraft passenger bridges, branch from the primary aircraft passenger bridge 1114 at any given location that allows the various secondary aircraft passenger bridges to reach the sill height of a given RA.

In an embodiment the secondary aircraft passenger bridge 1118 is configured to accommodate an RA 1119. Similarly, the secondary aircraft passenger bridge 1120 is configured to accommodate an RA 1121. Similarly, the secondary aircraft passenger bridge 1122 is configured to accommodate an RA 1123. Similarly, the secondary aircraft passenger bridge 1124 is configured to accommodate an RA 1125.

In an embodiment, the interstitial regional aircraft boarding pier 1100 is configured to allow at least one RA to dock within a docking bay area sufficient for about only a single large aircraft. In FIG. 11, the docking bay area sufficient for about only a single large aircraft is approximately delineated by the concourse 1110, a starboard wingtip-clearance boundary 1130, a port wingtip-clearance boundary 1132, and an OFL 1140 that is the boundary of the taxiway. The starboard and port wingtip-clearance boundaries 1130 and 1132, respectively are coupled with respective port 1131 and starboard 1133 wingtip-clearance boundaries for respective neighboring large aircraft 1134 and 1136. In an embodiment, the respective large neighboring aircraft 1134 and 1136 are two-engine-on-wing aircraft such as a version of the Boeing® 737, 757, 767, or a version of the Airbus A340. Accordingly, in an embodiment, the RA 1119 is next to but not over the port wingtip-clearance boundary 1132 because of its angled nature. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 11, the presence of the RA 1125, although it is docked beyond the portion of the port wingtip-clearance boundary 1132 that is orthogonal to the concourse 1110, it is by definition docked in an existing docking bay area for only the single large aircraft 1134. Accordingly, it is a FILO aircraft as set forth in the disclosure according to various embodiments. In an embodiment, the RA 1125 is a FIFO aircraft with respect to the large aircraft 1134, because no RA is present at the secondary aircraft passenger bridge 1122, and the secondary aircraft passenger bridge 1122 and the secondary aircraft passenger bridge 1124 articulate and/ or retract sufficient to allow the RA 1125 to taxi with sufficient wingtip clearance between the large aircraft 1134 and the RA 1121 if either or both are present.

In an embodiment, any two of the RAs 1119, 1121, 1123, and 1125 and their respective secondary aircraft passenger bridges are present as a duo in a configuration. In an embodiment, any three of the RAs 1119, 1121, 1123, and 1125 and their respective secondary aircraft passenger bridges are present as a trio in a configuration. In an embodiment, any configuration of secondary aircraft passenger bridges is provided to accommodate a given combination for the above-given RAs.

FIG. 11 also illustrates the presence of a third large aircraft 1154. In an embodiment, the third large aircraft 1154 is an engine-on-fuselage-rear configuration such as an MD 80 or the like. Other large aircraft, however, can be positioned as the large aircraft, if present.

Figure 12B:
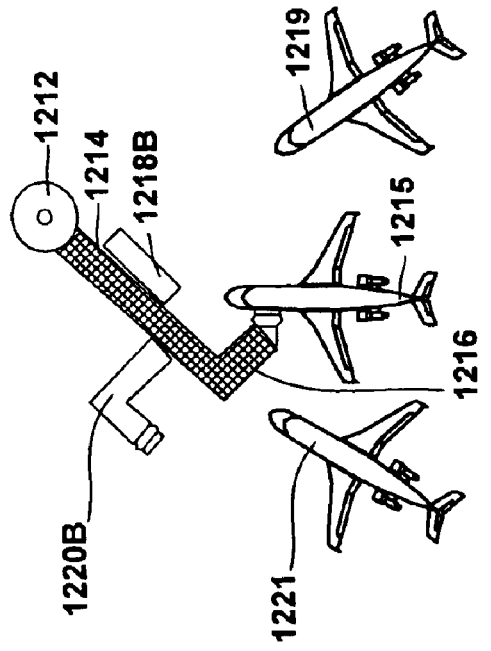
FIGS. 12A through 12C are plans of articulating and otherwise repositionable secondary passenger bridges according to various embodiments.
Figure 12A:
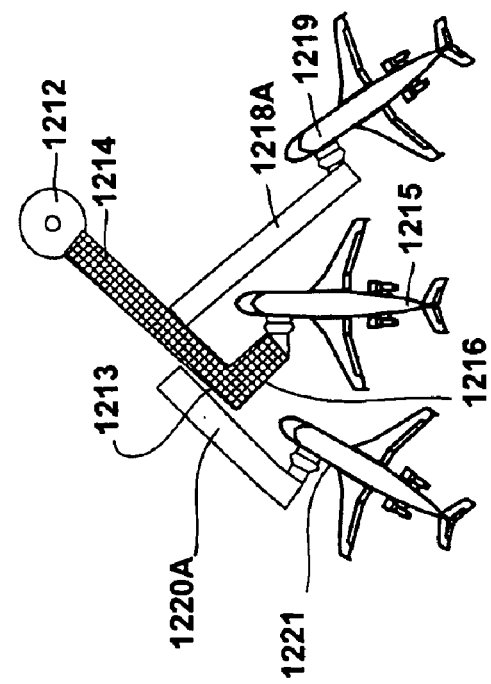
Figure 12C:
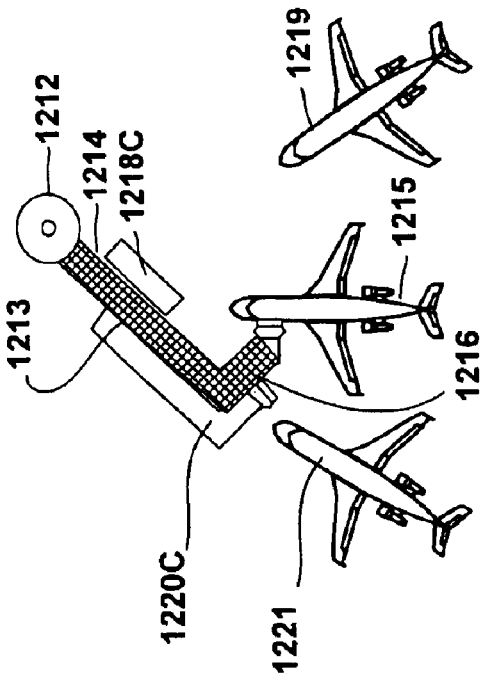

FIGS. 12A through 12C are plans of articulating and otherwise repositionable secondary passenger bridges according to various embodiments. In FIG. 12A, a rotunda 1212 is coupled to a primary aircraft passenger bridge 1214. A Cab 1216 is coupled to the primary aircraft passenger bridge 1214. A secondary aircraft passenger bridge 1218A is coupled to the primary aircraft passenger bridge 1214 along the gangway thereof, but in an embodiment, it can be coupled to the rotunda 1212. A secondary aircraft passenger bridge 1220A is coupled to the primary aircraft passenger bridge 1214 along the gangway thereof, but in an embodiment, it can be coupled to the rotunda 1212. An RA 1215 is docked at the cab 1216. An RA is docked at the secondary aircraft passenger bridge 1218A. Similarly, an RA is docked at the secondary passenger bridge 1220A.

FIG. 12B illustrates the secondary aircraft passenger bridges after they have retracted and/or articulated away from the respective RAs. The secondary aircraft passenger bridge 1220B has articulated to clear the RA 1221. The secondary aircraft passenger bridge 1218B has articulated to clear the RA 1219.

FIG. 12C illustrates the secondary aircraft passenger bridges after they have retracted and/or articulated away from the respective RAs. The secondary aircraft passenger bridge 1220C has been slidingly repositioned, such that the doorway 1213 that communicates to the primary aircraft passenger bridge 1214, has repositioned closer to the rotunda 1212, and thereby, has eliminated passenger access to allow the RA 1221 to either taxi for passenger deplaning, or to taxi for takeoff. The secondary aircraft passenger bridge 1218B has articulated to clear the RA 1219.

Figure 13:
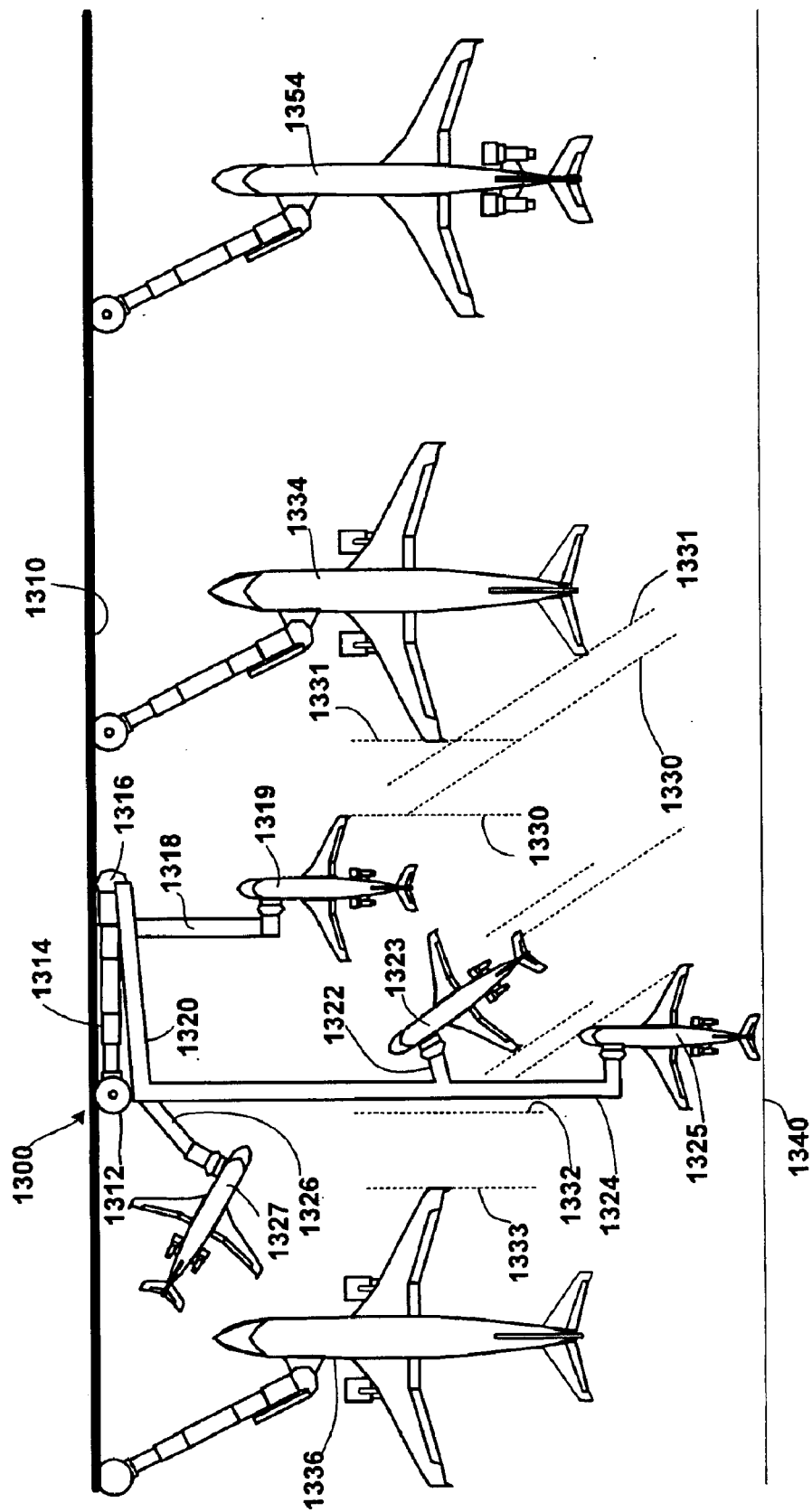
FIG. 13 is a plan of an interstitial regional aircraft boarding pier for docking about four regional aircraft or less according to an embodiment.

FIG. 13 is a plan of an interstitial regional aircraft boarding pier 1300 for docking about four regional aircraft or less according to an embodiment. A concourse 1310 is depicted by its external boundary. The concourse 1310 provides an anchor location for the interstitial regional aircraft boarding pier 1300. In an embodiment, the concourse 1310 is a ground-level structure that allows passengers to walk up a ramp until the sill of a given aircraft is reached. In an embodiment, the concourse 1310 is a conventional elevated structure that allows passengers to walk down a ramp until the sill of a given aircraft is reached.

In an embodiment, the interstitial regional aircraft boarding pier 1300 anchors at a rotunda 1312, into which passengers first embark upon leaving the concourse 1310. In an embodiment, the rotunda 1312 includes a swiveling functionality that allows for positioning other portions of the boarding pier 1300. In an embodiment, the rotunda 1312 includes a fixed structure.

A primary aircraft passenger bridge 1314 is coupled to the rotunda 1312. The primary aircraft passenger bridge 1314 leads to a cab 1316. In an embodiment, the cab 1316 is located with the primary aircraft passenger bridge 1314 extended substantially parallel to the concourse boundary 1310, sufficient for the cab 1316 to be at the sill height for an RA.

In an embodiment, the cab 1316 acts as a pier hub 1316 for at least one secondary aircraft passenger bridge. In an embodiment depicted in FIG. 13, the cab 1316 acts as a pier hub 1316 for a secondary aircraft passenger bridge 1318. In an embodiment, the cab 1316 acts as the final link to an RA, such that the secondary aircraft passenger bridge 1318 is not present, and the cab 1316 is capable of directly docking with an RA. In this embodiment, the cab 1316 is repositioned away from the concourse 1310, sufficient for the bow of the RA 1319 to avoid contact therewith. In an embodiment, the cab 1316 acts as a pier hub 1316 for a secondary aircraft passenger bridge 1320. In an embodiment, the secondary aircraft passenger bridge 1320 acts as a coupling for a secondary aircraft passenger bridge 1322. In an embodiment, the secondary aircraft passenger bridge 1322 acts as a coupling for a secondary aircraft passenger bridge 1324. The secondary aircraft passenger bridge 1324 is also referred to as a tertiary aircraft passenger bridge 1324 because it originates from a secondary aircraft passenger bridge 1322. In an embodiment, the secondary aircraft passenger bridge 1320 acts as a coupling for a secondary aircraft passenger bridge 1326.

In an embodiment the secondary aircraft passenger bridge 1318 is configured to accommodate an RA 1319. In an embodiment, the secondary aircraft passenger bridge 1318 is not present, and the RA 1319 is docked with the cab 1316, which is the final link to the RA 1319. In this embodiment, the cab 1316 can be spaced apart from the concourse 1310 sufficient for clearance between the RA 1319 and the 1310. Similarly, the secondary aircraft passenger bridge 1320 is configured to link with the 1322 and the 1326. The secondary aircraft passenger bridge 1322 is configured to accommodate an RA 1323. The secondary aircraft passenger bridge 1324 is configured to accommodate an RA 1325. And similarly, the secondary aircraft passenger bridge 1326 is configured to accommodate an RA 1327.

In an embodiment, the interstitial regional aircraft boarding pier 1300 is configured to allow at least one RA to dock within a docking bay area sufficient for about only a single large aircraft. In FIG. 13, the docking bay area sufficient for about only a single large aircraft is approximately delineated by the concourse 1310, a starboard wingtip-clearance boundary 1330, a port wingtip-clearance boundary 1332, and an OFL 1340 that is the boundary of the taxiway. The starboard and port wingtip-clearance boundaries 1330 and 1332, respectively are coupled with respective port 1331 and starboard 1333 wingtip-clearance boundaries for respective neighboring large aircraft 1334 and 1336. In an embodiment, the respective large neighboring aircraft 1334 and 1336 are two-engine-on-wing aircraft such as a version of the Boeing® 737 or a version of the Airbus® A320 or A319. Other large aircraft, however, can be docked according to an embodiment. Accordingly, in an embodiment, the RA 1325 is next to but not over the OFL 1340. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 13, the presence of the RA 1327 is either a FILO or a FIFO aircraft as set forth in disclosure. In an embodiment, operation of the interstitial regional aircraft boarding pier 1300 includes only the secondary aircraft passenger bridge 1318 and a structure that is coupled to the secondary aircraft passenger bridge 1322. Accordingly, the secondary aircraft passenger bridge 1324 and the secondary aircraft passenger bridge 1326 are optionally present, either together or each alone with the secondary aircraft passenger bridges 1318 and 1320.

When an RA at the interstitial regional aircraft boarding pier 1300 is ready to push back, it must trace a path that clears the wingtips of adjacent aircraft, according to the various embodiments set forth in this disclosure. In an embodiment, the RA 1319 waits for the secondary aircraft passenger bridge 1318 to retract and/or pivot to clear the RA 1319 before it is pushed back.

In an embodiment, a conventional and/or existing aircraft passenger bridge 1314 and/or a conventional aircraft passenger bridge design is rebuilt and/or redesigned according to the various embodiments set forth in this disclosure.

In an embodiment, any two of the RAs 1319, 1323, 1325, and 1327 and their respective secondary aircraft passenger bridges are present as a duo in a configuration. In an embodiment, any three of the RAs 1319, 1323, 1325, and 1327 and their respective secondary aircraft passenger bridges are present as a trio in a configuration. In an embodiment, any configuration of secondary aircraft passenger bridges is provided to accommodate a given combination for the above-given RAs.

FIG. 13 also illustrates the presence of a third large aircraft 1354. In an embodiment, the third large aircraft 1354 is an engine-on-fuselage-rear configuration such as an MD 80 or the like. Other large aircraft, however, can be positioned as the large aircraft, if present.

Figure 14:
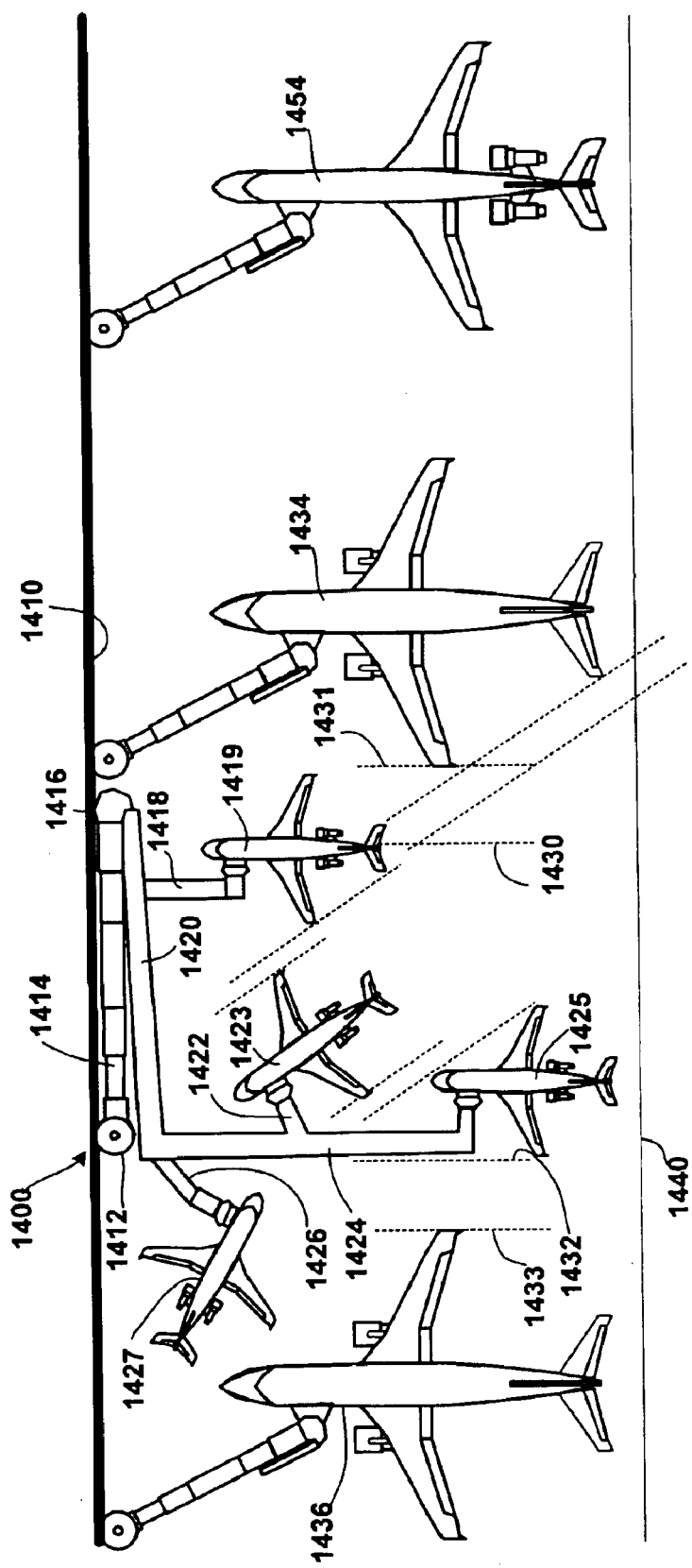
FIG. 14 is a plan of an interstitial regional aircraft boarding pier for docking about four regional aircraft or less according to an embodiment.

FIG. 14 is a plan of an interstitial regional aircraft boarding pier for docking about four regional aircraft or less according to an embodiment. The structures depicted in FIG. 14 can be mapped from the reference numbers in FIG. 13. The OFL 1440 in FIG. 14 is closer to the concourse 1410 than the OFL 1340 in FIG. 13 is to the concourse 1310. Consequently, the primary aircraft passenger bridge 1414 is extended to a greater length in the space allowed, to get the cab 1416 to the sill height of any given RA.

In an embodiment the secondary aircraft passenger bridge 1418 is configured to accommodate the RA 1419. Because the lateral profile for the docking bay area of the various interstitial RAs is broader, the RA 1419 is pivoted clockwise before it pushes back. In an embodiment, the docking bay area that is sufficient for about only a single large aircraft, includes any of the areas set forth in this disclosure including those larger, substantially about 1.0 times the existing docking bay area for a single large aircraft, and those smaller.

In FIG. 14, the presence of the RA 1427 is either a FILO or a FIFO aircraft as set forth in disclosure. In an embodiment, any two of the RAs 1419, 1423, 1425, and 1427 and their respective secondary aircraft passenger bridges are present as a duo in a configuration. In an embodiment, any three of the RAs 1419, 1423, 1425, and 1427 and their respective secondary aircraft passenger bridges are present as a trio in a configuration. In an embodiment, any configuration of secondary aircraft passenger bridges is provided to accommodate a given combination for the above-given RAs.

FIG. 14 also illustrates the presence of a third large aircraft 1454. In an embodiment, the third large aircraft 1454 is an engine-on-fuselage-rear configuration such as an MD 80 or the like. Other large aircraft, however, can be positioned as the large aircraft, if present.

Figure 15:
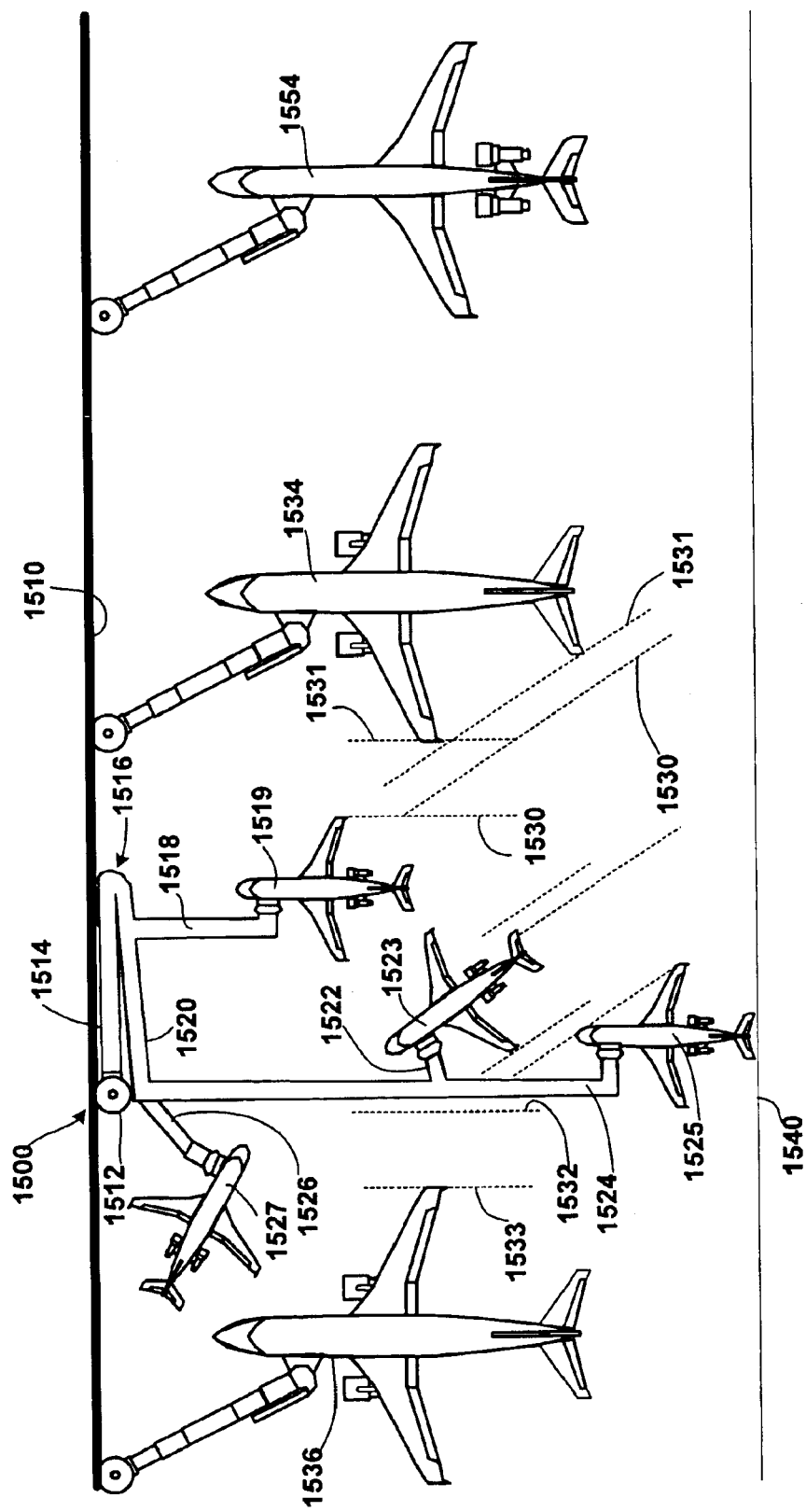
FIG. 15 is a plan of an interstitial regional aircraft boarding pier for docking about four regional aircraft or less according to an embodiment.

FIG. 15 is a plan of an interstitial regional aircraft boarding pier 1500 for docking about four regional aircraft or less according to an embodiment. The structures depicted in FIG. 15 can be mapped from the reference numbers in FIG. 13. The pier hub 1516 in FIG. 15 is a "knuckle" structure that is integral with the primary aircraft passenger bridge 1514 and the secondary passenger bridge 1520. Other embodiments that are disclosed for FIGS. 13 and 14 are incorporated into embodiments illustrated in FIG. 15.

Figure 16:
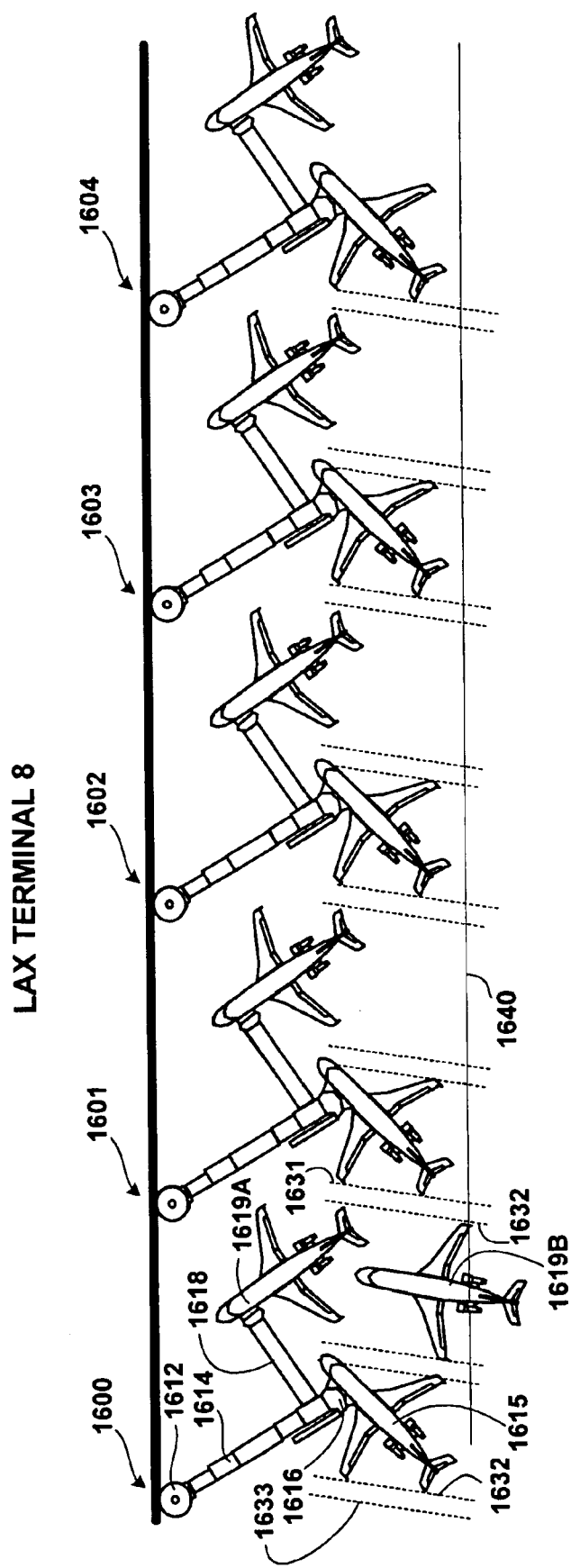
FIG. 16 is a plan of an interstitial regional aircraft boarding pier for docking about two regional aircraft according to an embodiment.

FIG. 16 is a plan of an interstitial regional aircraft boarding pier 1600 for docking about two regional aircraft or less according to an embodiment. In an embodiment, an interstitial regional aircraft boarding pier 1601 is also present. In an embodiment, an interstitial regional aircraft boarding pier 1602 is also present. In an embodiment, an interstitial regional aircraft boarding pier 1603 is also present. In an embodiment, an interstitial regional aircraft boarding pier 1604 is also present.

A concourse 1610 is depicted by its external boundary. The concourse 1610 provides an anchor location for the interstitial regional aircraft boarding pier 1600. In an embodiment, the concourse 1610 is a ground-level structure that allows passengers to walk up a ramp until the sill of a given aircraft is reached. In an embodiment, the concourse 1610 is a conventional elevated structure that allows passengers to walk down a ramp until the sill of a given aircraft is reached.

In an embodiment, the interstitial regional aircraft boarding pier 1600 anchors at a rotunda 1612, into which passengers first embark upon leaving the concourse 1610. In an embodiment, the rotunda 1612 includes a swiveling functionality that allows for positioning other portions of the boarding pier 1600. In an embodiment, the rotunda 1612 includes a fixed structure.

A primary aircraft passenger bridge 1614 is coupled to the rotunda 1612. The primary aircraft passenger bridge 1614 leads to a cab 1616. In an embodiment, the cab 1616 acts as a single docking port as a final link for an RA 1615. In an embodiment, the cab 1616 is at a level that mates to the sill height of any given RA depicted in FIG. 16.

In an embodiment, a secondary aircraft passenger bridges branches from the primary aircraft passenger bridge 1614 at any given location that allows a secondary aircraft passenger bridge to reach the sill height of a given RA.

In an embodiment a secondary aircraft passenger bridge 1618 is coupled to the cab 1616. In an embodiment, the secondary aircraft passenger bridge 1618 attaches along the primary aircraft passenger bridge 1614 (not pictured, but depicted as the junction 418 in FIG. 4), but not at the pier hub 1616. The secondary aircraft passenger bridge 1618 is configured to accommodate an RA 1619A. In an embodiment, a larger-size RA duo is configured in the docking bay area sufficient for about only a single large aircraft. FIG. 16 depicts, therefore a duo of RAs that qualitatively, appear to approach the size of large aircraft. In FIG. 16, the docking bay area sufficient for about only a single large aircraft is approximately delineated by the concourse 1610, a starboard wingtip-clearance boundary 1630, a port wingtip-clearance boundary 1632, and an OFL 1640 that is the boundary of the taxiway. The starboard and port wingtip-clearance boundaries 1630 and 1632, respectively are coupled with respective port 1631 and starboard 1633 wingtip-clearance boundaries for neighboring docking bays. In an embodiment, a neighboring docking bay includes the interstitial regional aircraft boarding pier 1601.

In a method embodiment, the RA 1619A waits for the secondary aircraft passenger bridge 1618 to retract and/or articulate to clear the RA 1619A. Next, the RA 1619A is pivoted clockwise to align with a pushback lane that is bounded on its starboard wing by the 1630. As the RA 1619A pushes back, it takes the position as the RA 1619B. The RA 1619B pushes back until it clears the RA 1615, and thereafter it can be further pivoted or allowed to taxi away from the interstitial regional aircraft boarding pier 1600. In an embodiment, the docking bay area that is sufficient for about only a single large aircraft, includes any of the areas set forth in this disclosure including those larger, substantially about 1.0 times the existing docking bay area for a single large aircraft, and those smaller. In an embodiment, the docking bay area that less than about only a single large aircraft, is about 0.9 times the docking bay area for only a single large aircraft. In an embodiment, the docking bay area that less than about only a single large aircraft, is about 0.8 times the docking bay area for only a single large aircraft. In an embodiment, the docking bay area that less than about only a single large aircraft, is about 0.7 times the docking bay area for only a single large aircraft. In an embodiment, the docking bay area that less than about only a single large aircraft, is about 0.6 times the docking bay area for only a single large aircraft. In an embodiment, the docking bay area that less than about only a single large aircraft, is about 0.5 times the docking bay area for only a single large aircraft. In an embodiment, the docking bay area that less than about only a single large aircraft, is about 0.4 times the docking bay area for only a single large aircraft.

In an embodiment, a conventional and/or existing aircraft passenger bridge 1614 and/or a conventional aircraft passenger bridge design is rebuilt and/or redesigned such that the original cab 1616 that was configured to accommodate a single aircraft, accommodates the RA 1619A. Accordingly, the secondary aircraft passenger bridge 1618 attaches daisy chain fashion along the primary aircraft passenger bridge 1614 structure according to accommodation needs of at least one RA besides the RA 1619A.

In an embodiment, the positioning of the various rotundas (the rotunda 1612 being an example) for any two or more of the interstitial regional aircraft boarding piers 1600, 1601, 1602, 1603, and 1604, is done by retrofitting an existing concourse and/or designing a new concourse. In an embodiment, retrofitting is done by repositioning portals along the exterior wall. In an embodiment, respositioning is done according to an embodiment, by removing a given window pane(s), sufficient to place the portal at a selected location to facilitate a layout of interstitial regional aircraft boarding piers, such as any in this disclosure, particularly those depicted in FIGS. 16, 17, and 18. In an embodiment, an external concourse wall with large-pane window panels is modulated to accommodate a interstitial regional aircraft boarding pier. In the case of an existing concourse using conventional technology, costly passenger elevator structures would need to be inserted. According to an embodiment, the need for passenger elevators to the tarmac is eliminated or reduced.

Figure 17:
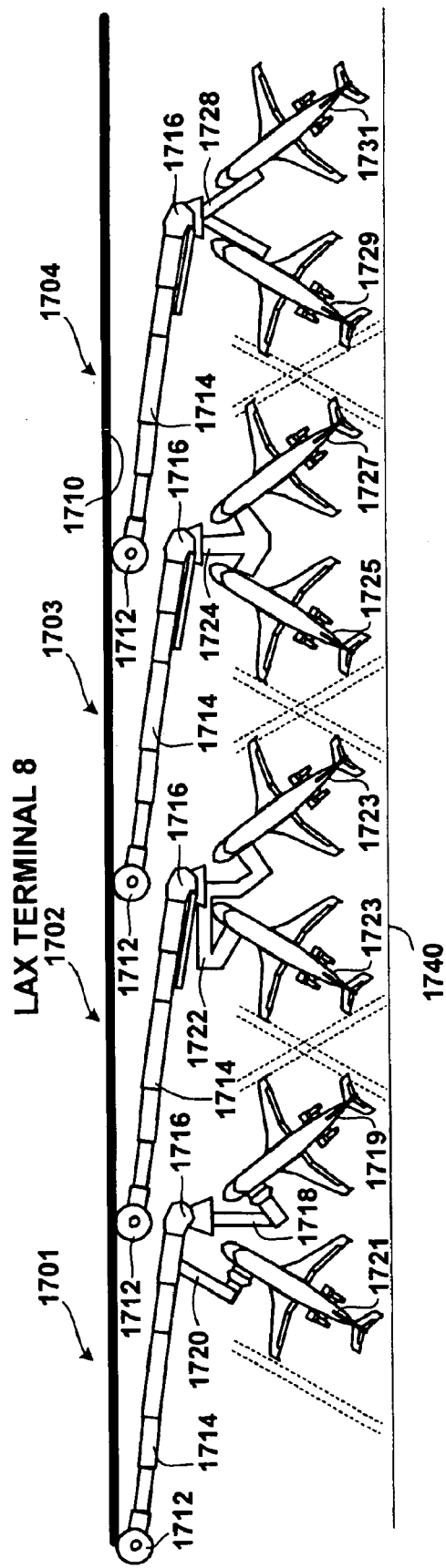
FIG. 17 is a plan of an interstitial regional aircraft boarding pier for docking about two regional aircraft by both port and starboard boarding according to an embodiment.

FIG. 17 is a plan of an interstitial regional aircraft boarding pier for docking about two regional aircraft by both port and starboard boarding according to an embodiment. In an embodiment, a concourse 1710 includes at least one rotunda 1712 and corresponding at least one primary aircraft passenger bridge 1714 and at least one cab 1716. The OFL 1740 in an embodiment is relatively close to the concourse. In an embodiment, an existing concourse, a portion of LAX Concourse 8 by way of non-limiting example, is reconfigured for an interstitial regional aircraft boarding pier. In an embodiment, a new concourse is designed for an interstitial regional aircraft boarding pier. The primary aircraft passenger bridge 1714 is extended until the rotunda 1716, if present, is at or near the sill height of an RA.

In an embodiment for a first interstitial regional aircraft boarding pier 1701, a secondary aircraft passenger bridge 1718 is coupled to the rotunda 1716. A secondary aircraft passenger bridge 1720 is coupled to the primary aircraft passenger bridge 1714. Optionally, the secondary aircraft passenger bridge 1720 is coupled directly (not pictured) to the rotunda 1716. An RA 1719 is docked at the secondary aircraft passenger bridge 1718, and an RA 1721 is docked at the secondary aircraft passenger bridge 1720.

In an embodiment for a second interstitial regional aircraft boarding pier 1702, a secondary aircraft passenger bridge 1722 is coupled to the rotunda 1716. The secondary aircraft passenger bridge 1722 facilitates docking of two occurrences of RAs 1723. The a secondary aircraft passenger bridge 1722 acts as a plenum passenger bridge for the two occurrences of the RAs 1723, when they are both simultaneously docked.

In an embodiment for a third interstitial regional aircraft boarding pier 1703, a secondary aircraft passenger bridge 1724 is coupled to the rotunda 1716. The secondary aircraft passenger bridge 1724 facilitates starboard boarding of an RA 1725, and port boarding of an RA 1727. The a secondary aircraft passenger bridge 1724 acts as a plenum passenger bridge for the two RAs 1725 and 1727, when they are both simultaneously docked.

In an embodiment for a fourth interstitial regional aircraft boarding pier 1704, a secondary aircraft passenger bridge 1728 is coupled to the rotunda 1716. A secondary aircraft passenger bridge 1730 is likewise coupled to the rotunda 1716. The secondary aircraft passenger bridge 1728 facilitates starboard boarding of an RA 1729. The secondary aircraft passenger bridge 1730 facilitates port boarding of an RA.

In an embodiment, any one of the interstitial regional aircraft boarding piers, 1701, 1702, 1703, and 1704 is coupled to a concourse. In an embodiment, a plurality of any one of the interstitial regional aircraft boarding piers, 1701, 1702, 1703, and 1704 is coupled to a concourse. In an embodiment, a plurality of at least any two of the interstitial regional aircraft boarding piers, 1701, 1702, 1703, and 1704 is coupled to a concourse. In an embodiment, a plurality of at least any three of the interstitial regional aircraft boarding piers, 1701, 1702, 1703, and 1704 is coupled to a concourse.

Figure 18:
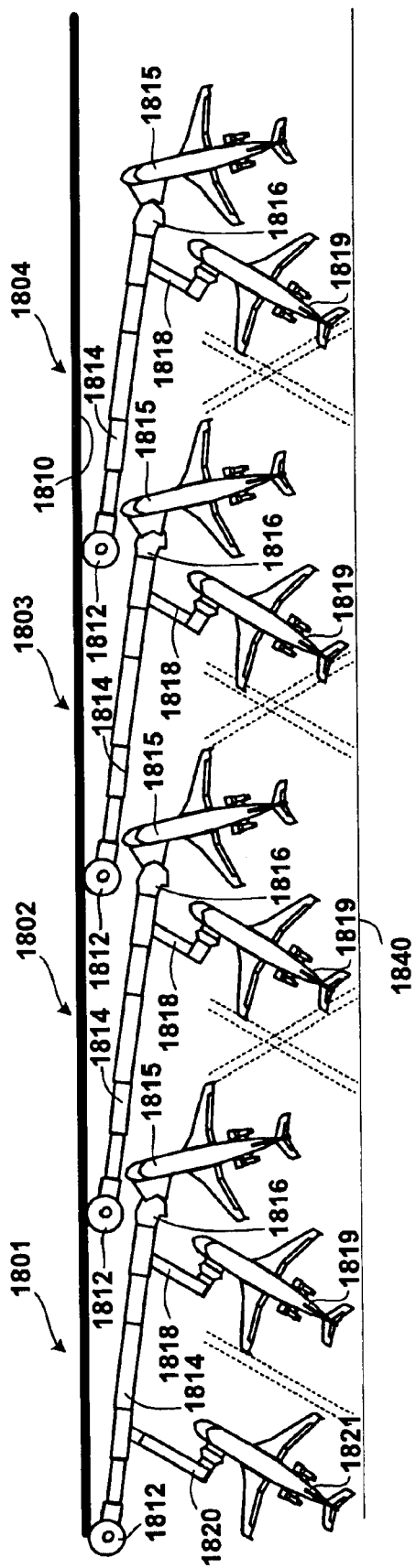
FIG. 18 is a plan of an interstitial regional aircraft boarding pier for docking about two regional aircraft according to an embodiment.

FIG. 18 is a plan of an interstitial regional aircraft boarding pier 1800 for docking about two regional aircraft or less according to an embodiment. In an embodiment, a concourse 1810 includes at least one rotunda 1812 and corresponding at least one primary aircraft passenger bridge 1814 and at least one cab 1816, if present. In an embodiment, the cab 1816 is the final link to an RA 1815. The OFL 1840 in an embodiment is relatively close to the concourse 1810. In an embodiment, an existing concourse, a portion of LAX Concourse 8 by way of non-limiting example, is reconfigured for an interstitial regional aircraft boarding pier. In an embodiment, a new concourse is designed for an interstitial regional aircraft boarding pier. The primary aircraft passenger bridge 1814 is extended until the rotunda 1816, if present, is at or near the sill height of an RA.

In an embodiment for a first interstitial regional aircraft boarding pier 1801, an RA 1815 is docked at the rotunda 1816. A secondary aircraft passenger bridge 1818 is coupled to the primary aircraft passenger bridge 1814. Similarly, a secondary aircraft passenger bridge 1820 is coupled to the primary aircraft passenger bridge 1814. Optionally, the secondary aircraft passenger bridge 1818 is coupled directly (not pictured) to the rotunda 1816. An RA 1819 is docked at the secondary aircraft passenger bridge 1818, and an RA 1821 is docked at the secondary aircraft passenger bridge 1820. In an embodiment, only one of the RA 1815, the RA 1819, and the RA 1821 is docked. In an embodiment, only two of the RA 1815, the RA 1819, and the RA 1821 are docked.

In an embodiment for a second interstitial regional aircraft boarding pier 1802, an RA 1815 is docked at the rotunda 1816. A secondary aircraft passenger bridge 1818 is coupled to the primary aircraft passenger bridge 1814. Optionally, the secondary aircraft passenger bridge 1818 is coupled directly (not pictured) to the rotunda 1816. An RA 1819 is docked at the secondary aircraft passenger bridge 1818. In an embodiment, only one of the RA 1815 and the RA 1819 is docked.

In an embodiment for a third interstitial regional aircraft boarding pier 1803, an RA 1815 is docked at the rotunda 1816. A secondary aircraft passenger bridge 1818 is coupled to the primary aircraft passenger bridge 1814. Optionally, the secondary aircraft passenger bridge 1818 is coupled directly (not pictured) to the rotunda 1816. An RA 1819 is docked at the secondary aircraft passenger bridge 1818. In an embodiment, only one of the RA 1815 and the RA 1819 is docked.

In an embodiment for a fourth interstitial regional aircraft boarding pier 1804, an RA 1815 is docked at the rotunda 1816. A secondary aircraft passenger bridge 1818 is coupled to the primary aircraft passenger bridge 1814. Optionally, the secondary aircraft passenger bridge 1818 is coupled directly (not pictured) to the rotunda 1816. An RA 1819 is docked at the secondary aircraft passenger bridge 1818. In an embodiment, only one of the RA 1815 and the RA 1819 is docked.

In an embodiment, any one of the interstitial regional aircraft boarding piers, 1801, 1802, 1803, and 1804 is coupled to a concourse. In an embodiment, a plurality of the interstitial regional aircraft boarding piers, 1801, 1802, 1803, and 1804 is coupled to a concourse. In an embodiment, a plurality of at least any two of the interstitial regional aircraft boarding piers, 1801, 1802, 1803, and 1804 is coupled to a concourse. In an embodiment, a plurality of at least any three of the interstitial regional aircraft boarding piers, 1801, 1802, 1803, and 1804 is coupled to a concourse.

In an embodiment, the cab 1816 is at a sill height for docking a large aircraft, and the secondary aircraft passenger bridge terminates at a sill height for an RA.

Figure 19:
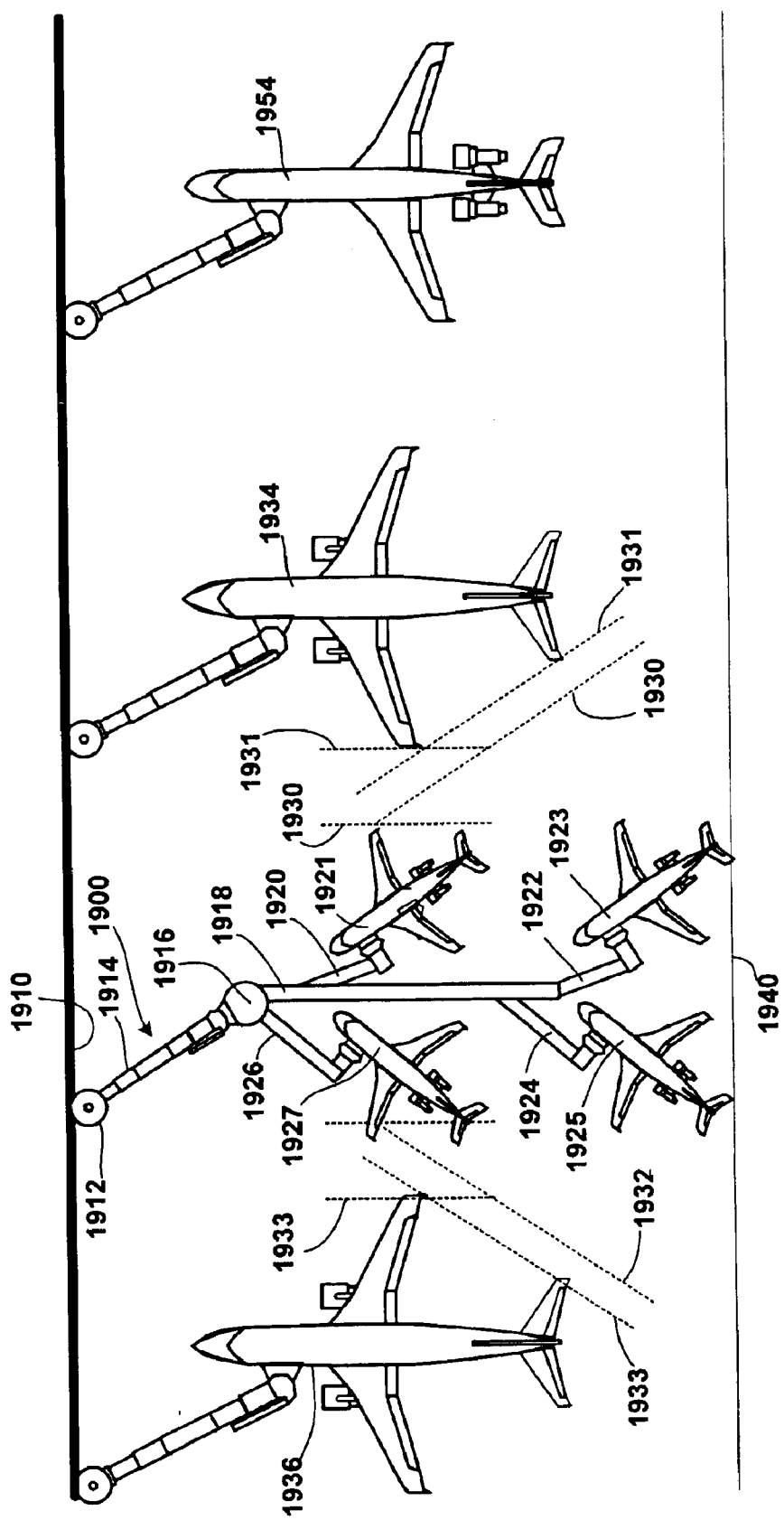
FIG. 19 is a plan of an interstitial regional aircraft boarding pier for docking about four regional aircraft or less according to an embodiment.

FIG. 19 is a plan of an interstitial regional aircraft boarding pier 1900 for docking about four regional aircraft or less according to an embodiment. A concourse 110 is depicted by its external boundary. The concourse provides an anchor location for the interstitial regional aircraft boarding pier 1900. In an embodiment, the concourse 1910 is a ground-level structure that allows passengers to walk up a ramp until the sill of a given aircraft is reached. In an embodiment, the concourse 1910 is a conventional elevated structure that allows passengers to walk down a ramp until the sill of a given aircraft is reached.

In an embodiment, the interstitial regional aircraft boarding pier 1900 anchors at a rotunda 1912, into which passengers first embark upon leaving the concourse 1910. In an embodiment, the rotunda 1912 includes a swiveling functionality that allows for positioning other portions of the boarding pier 1900. In an embodiment, the rotunda 1912 includes a fixed structure.

A primary aircraft passenger bridge 1914 is coupled to the rotunda 1912. The primary aircraft passenger bridge 1914 leads to a cab 1916. In an embodiment, the cab 1916 acts as a pier hub 1916 for at least one secondary aircraft passenger bridge. In an embodiment, the cab 1916 acts as a pier hub 1916 for a secondary aircraft passenger bridge 1918. In an embodiment, the secondary aircraft passenger bridge 1918 acts as a header structure for a secondary aircraft passenger bridge 1920. In an embodiment, the secondary aircraft passenger bridge 1918 acts as a header structure for a secondary aircraft passenger bridge 1922. In an embodiment, the secondary aircraft passenger bridge 1918 acts as a header structure for a secondary aircraft passenger bridge 1924. In an embodiment, the secondary aircraft passenger bridge 1918 acts as a header structure for a secondary aircraft passenger bridge 1926.

In an embodiment the secondary aircraft passenger bridge 1920 is configured to accommodate an RA 1921. Similarly, the secondary aircraft passenger bridge 1922 is configured to accommodate an RA 1923. Similarly, the secondary aircraft passenger bridge 1924 is configured to accommodate an RA 1925. And similarly, the secondary aircraft passenger bridge 1926 is configured to accommodate an RA 1927.

In an embodiment, the interstitial regional aircraft boarding pier 1900 is configured to allow at least one RA to dock within a docking bay area sufficient for about only a single large aircraft. In FIG. 19, the docking bay area sufficient for about only a single large aircraft is approximately delineated by the concourse 1910, a starboard wingtip-clearance boundary 1930, a port wingtip-clearance boundary 1932, and an OFL 1940 that is the boundary of the taxiway. The starboard and port wingtip-clearance boundaries 1930 and 1932, respectively are coupled with respective port 1931 and starboard 1933 wingtip-clearance boundaries for respective neighboring large aircraft 1934 and 1936. In an embodiment, the respective large neighboring aircraft 1934 and 1936 are two-engine-on-wing aircraft such as a version of the Boeing® 737 or a version of the Airbus® A320 or A319. Other large aircraft, however, can be docked according to an embodiment. Accordingly, in an embodiment, the RA 1923 is next to but not over the OFL 1940. In an embodiment, the docking bay area that sufficient for about only a single large aircraft, includes any of the areas set forth in this disclosure including those larger, substantially about 1.0 times the existing docking bay area for a single large aircraft, and those smaller.

In FIG. 19, the RAs depicted are all FIFOs. In an embodiment, a FILO aircraft as set forth in this disclosure, is docked (not pictured) with a secondary aircraft passenger bridge (not pictured) that is coupled at the pier hub 1916. Reference is made to other FIGs. for such FILO embodiments.

In an embodiment, a conventional and/or existing aircraft passenger bridge 1914 and/or a conventional aircraft passenger bridge design is rebuilt and/or redesigned such that the original cab 1916 that was configured to accommodate a single aircraft, is either replaced or reconfigured to act as a pier hub 1916. In an embodiment, the cab 1916 is configurable to have an aircraft, whether an RA or a large aircraft, able to dock directly at the cab 1916.

In an embodiment, any two of the RAs 1921, 1923, 1925, and 1925 and their respective secondary aircraft passenger bridges are present as a duo in a configuration. In an embodiment, any three of the RAs 1921, 1923, 1925, and 1925 and their respective secondary aircraft passenger bridges are present as a trio in a configuration. In an embodiment, any configuration of secondary aircraft passenger bridges is provided to accommodate a given combination for the above-given RAs.

In an embodiment, a narrow interstitial regional aircraft boarding pier 1900 includes the secondary aircraft passenger bridges 1920 and 1922 alone. Consequently, the port wingtip boundary 1932 and the secondary aircraft passenger bridge 1918 are substantially co-linear. In this embodiment, the total surface area of the tarmac used by the interstitial regional aircraft boarding pier 1900, is about less than the docking bay area sufficient for about only a single large aircraft, as defined in this disclosure. In this embodiment, the aspect ratio of the docking bay area, the lateral dimension between the bays for the large aircraft 1934 and 1936, divided by the depth measured from the concourse 1910 to the OFL 1940, is equal to or greater than about 1.

Similarly in an embodiment, a narrow interstitial regional aircraft boarding pier 1900 includes the secondary aircraft passenger bridges 1924 and 1926 alone. Consequently, the starboard wingtip-clearance boundary 1930 and the secondary aircraft passenger bridge 1918 are substantially co-linear. In this embodiment, the total surface area of the tarmac used by the interstitial regional aircraft boarding pier 1900, is about less than the docking bay area sufficient for about only a single large aircraft, as defined in this disclosure. In this embodiment, the aspect ratio of the docking bay area is equal to or greater than about 1.

FIG. 19 also illustrates the presence of a third large aircraft 1954. In an embodiment, the third large aircraft 1954 is an engine-on-fuselage-rear configuration such as an MD 80 or the like. Other large aircraft, however, can be positioned as the large aircraft, if present.

Figure 20:
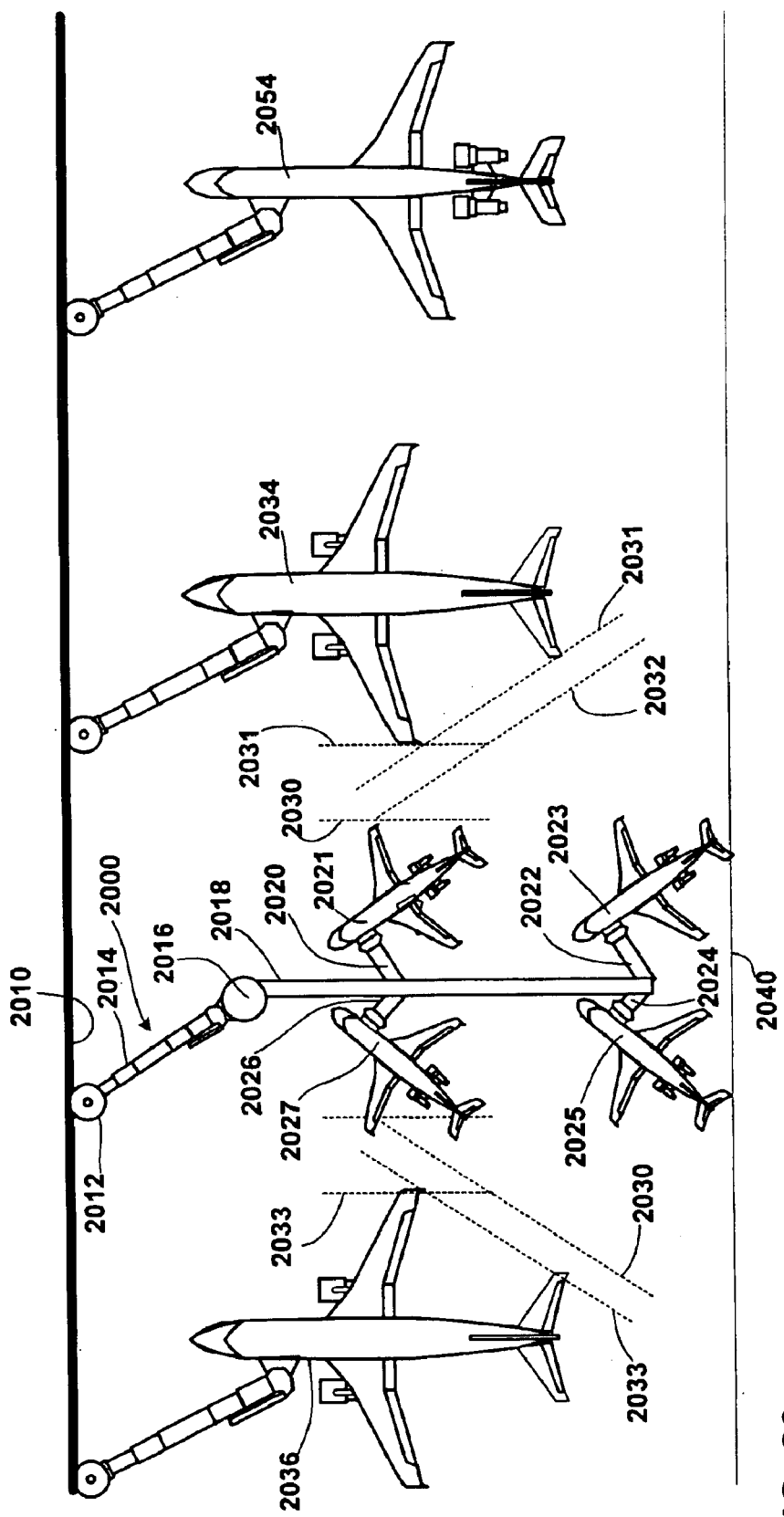
FIG. 20 is a plan of an interstitial regional aircraft boarding pier for docking about two regional aircraft each, by both port and starboard boarding, according to an embodiment.

FIG. 20 is a plan of an interstitial regional aircraft boarding pier 2000 for docking about for regional aircraft or less by both port and starboard boarding according to an embodiment. A concourse 2010 is depicted by its external boundary. The concourse provides an anchor location for the interstitial regional aircraft boarding pier 2000. In an embodiment, the concourse 2010 is a ground-level structure that allows passengers to walk up a ramp until the sill of a given aircraft is reached. In an embodiment, the concourse 2010 is a conventional elevated structure that allows passengers to walk down a ramp until the sill of a given aircraft is reached.

In an embodiment, the interstitial regional aircraft boarding pier 2000 anchors at a rotunda 2012, into which passengers first embark upon leaving the concourse 2010. In an embodiment, the rotunda 2012 includes a swiveling functionality that allows for positioning other portions of the boarding pier 2000. In an embodiment, the rotunda 2012 includes a fixed structure.

A primary aircraft passenger bridge 2014 is coupled to the rotunda 2012. The primary aircraft passenger bridge 2014 leads to a cab 2016. In an embodiment, the cab 2016 acts as a pier hub 2016 for at least one secondary aircraft passenger bridge. In an embodiment depicted in FIG. 20, the cab 2016 acts as a pier hub 2016 for a secondary aircraft passenger bridge 2018. In an embodiment, depicted in FIG. 20, the secondary aircraft passenger bridge 2018 acts as a header structure for a secondary aircraft passenger bridge 2020. In an embodiment, depicted in FIG. 20, the secondary aircraft passenger bridge 2018 acts as a header structure for a secondary aircraft passenger bridge 2022. In an embodiment, depicted in FIG. 20, the secondary aircraft passenger bridge 2018 acts as a header structure for a secondary aircraft passenger bridge 2024. In an embodiment, depicted in FIG. 20, the secondary aircraft passenger bridge 2018 acts as a header structure for a secondary aircraft passenger bridge 2026.

In an embodiment the secondary aircraft passenger bridge 2020 is configured to accommodate an RA 2021. Similarly, the secondary aircraft passenger bridge 2022 is configured to accommodate an RA 2023. The secondary aircraft passenger bridge 2024 is configured to accommodate an RA 2025 for starboard passenger boarding. And similarly, the secondary aircraft passenger bridge 2026 is configured to accommodate an RA 2027 for starboard passenger boarding.

In an embodiment, the interstitial regional aircraft boarding pier 2000 is configured to allow at least one RA to dock within a docking bay area sufficient for about only a single large aircraft. In FIG. 20, the docking bay area sufficient for about only a single large aircraft is approximately delineated by the concourse 2010, a starboard wingtip-clearance boundary 2030, a port wingtip-clearance boundary 2032, and an OFL 2040 that is the boundary of the taxiway. The starboard and port wingtip-clearance boundaries 2030 and 2032, respectively are coupled with respective port 2031 and starboard 2033 wingtip-clearance boundaries for respective neighboring large aircraft 2034 and 2036. In an embodiment, the respective large neighboring aircraft 2034 and 2036 are two-engine-on-wing aircraft such as a version of the Boeing® 737 or a version of the Airbus® A320 or A319. Other large aircraft, however, can be docked according to an embodiment. Accordingly, in an embodiment, the RA 2023 is next to but not over the OFL 2040. In an embodiment, the docking bay area that sufficient for about only a single large aircraft, includes any of the areas set forth in this disclosure including those larger, substantially about 1.0 times the existing docking bay area for a single large aircraft, and those smaller.

In FIG. 20, the RAs depicted are all FIFOs. In an embodiment, a FILO aircraft as set forth in this disclosure, is docked (not pictured) with a secondary aircraft passenger bridge (not pictured) that is coupled at the pier hub 1916.

In an embodiment, a conventional and/or existing aircraft passenger bridge 2014 and/or a conventional aircraft passenger bridge design is rebuilt and/or redesigned such that the original cab 2016 that was configured to accommodate a single aircraft, is either replaced or reconfigured to act as a pier hub 2016. In an embodiment, the cab 2016 is configurable to have an aircraft, whether an RA or a large aircraft, able to dock directly at the cab 2016.

In an embodiment, any two of the RAs 2021, 2023, 2025, and 2025 and their respective secondary aircraft passenger bridges are present as a duo in a configuration. In an embodiment, any three of the RAs 2021, 2023, 2025, and 2025 and their respective secondary aircraft passenger bridges are present as a trio in a configuration. In an embodiment, any configuration of secondary aircraft passenger bridges is provided to accommodate a given combination for the above-given RAs.

In an embodiment, a narrow interstitial regional aircraft boarding pier 2000 includes the secondary aircraft passenger bridges 2020 and 2022 alone. Consequently, the port wingtip-clearance boundary 2032 and the secondary aircraft passenger bridge 2018 are substantially co-linear. In this embodiment, the total surface area of the tarmac used by the interstitial regional aircraft boarding pier 2000, is about less than the docking bay area sufficient for about only a single large aircraft, as defined in this disclosure. In this embodiment, the aspect ratio of the docking bay area, the lateral dimension between the bays for the large aircraft 2034 and 2036, divided by the depth measured from the concourse 2010 to the OFL 2040, is equal to or greater than about 1.

Similarly in an embodiment, a narrow interstitial regional aircraft boarding pier 2000 includes the secondary aircraft passenger bridges 2024 and 2026 alone. Consequently, the starboard wingtip-clearance 2030 and the secondary aircraft passenger bridge 2018 are substantially co-linear. In this embodiment, the total surface area of the tarmac used by the interstitial regional aircraft boarding pier 2000, is about less than the docking bay area sufficient for about only a single large aircraft, as defined in this disclosure. In this embodiment, the aspect ratio of the docking bay area is equal to or greater than about 1.

FIG. 20 also illustrates the presence of a third large aircraft 2054. In an embodiment, the third large aircraft 1954 is an engine-on-fuselage-rear configuration such as an MD 80 or the like. Other large aircraft, however, can be positioned as the large aircraft, if present.

Figure 21:
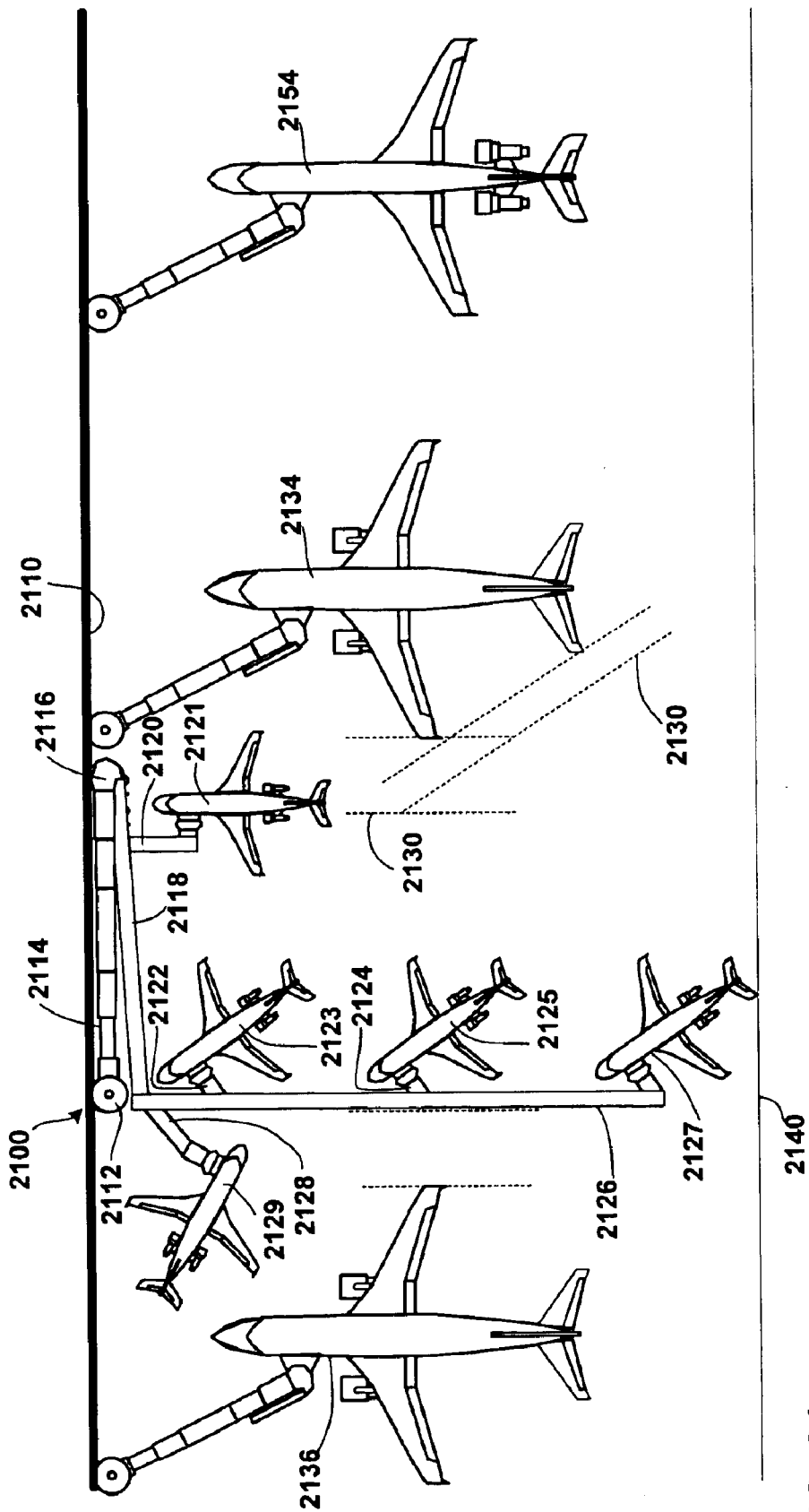
FIG. 21 is a plan of an interstitial regional aircraft boarding pier for docking about five regional aircraft or less according to an embodiment.

FIG. 21 is a plan of an interstitial regional aircraft boarding pier for docking about five regional aircraft or less according to an embodiment. A concourse 2110 is depicted by its external boundary. The concourse 2110 provides an anchor location for the interstitial regional aircraft boarding pier 2100. In an embodiment, the concourse 2110 is a ground-level structure that allows passengers to walk up a ramp until the sill of a given aircraft is reached. In an embodiment, the concourse 2110 is a conventional elevated structure that allows passengers to walk down a ramp until the sill of a given aircraft is reached.

In an embodiment, the interstitial regional aircraft boarding pier 2100 anchors at a rotunda 2112, into which passengers first embark upon leaving the concourse 2110. In an embodiment, the rotunda 2112 includes a swiveling functionality that allows for positioning other portions of the boarding pier 2100. In an embodiment, the rotunda 2112 includes a fixed structure.

A primary aircraft passenger bridge 2114 is coupled to the rotunda 2112. The primary aircraft passenger bridge 2114 leads to a cab 2116. In an embodiment, the cab 2116 is located with the primary aircraft passenger bridge 2114 extended substantially parallel to the concourse boundary 2110, sufficient for the cab 2116 to be at or near the sill height for an RA.

In an embodiment, the cab 2116 acts as a pier hub 2116 for at least one secondary aircraft passenger bridge. In an embodiment, the cab 2116 acts as a pier hub 2116 for a secondary aircraft passenger bridge 2118. In an embodiment, the cab 2116 acts as the final link to an RA, similar to the cab 1816 in FIG. 18 acts as a final link to the RA 1815.

In an embodiment, the cab 2116 acts as a pier hub 2116 for a secondary aircraft passenger bridge 2120. In an embodiment, depicted in FIG. 21, the secondary aircraft passenger bridge 2120 acts as a coupling for a secondary aircraft passenger bridge 2122. In an embodiment, depicted in FIG. 21, the secondary aircraft passenger bridge 2122 acts as a coupling for a secondary aircraft passenger bridge 2124. In an embodiment, depicted in FIG. 21, the secondary aircraft passenger bridge 2124 acts as a coupling for a secondary aircraft passenger bridge 2126. In an embodiment, depicted in FIG. 21, the secondary aircraft passenger bridge 2118 acts as a coupling for a secondary aircraft passenger bridge 2128.

In an embodiment the secondary aircraft passenger bridge 2120 is configured to accommodate an RA 2121. Similarly, the secondary aircraft passenger bridge 2122 is configured to accommodate an RA 2123. The secondary aircraft passenger bridge 2124 is configured to accommodate an RA 2125. The secondary aircraft passenger bridge 2126 is configured to accommodate an RA 2127. And similarly, the secondary aircraft passenger bridge 2128 is configured to accommodate an RA 2129.

In an embodiment, the interstitial regional aircraft boarding pier 2100 is configured to allow at least one RA to dock within a docking bay area sufficient for about only a single large aircraft. In FIG. 21, the docking bay area sufficient for about only a single large aircraft is approximately delineated by the concourse 2110, a starboard wingtip-clearance boundary 2130, the secondary aircraft passenger boarding bridge 2122, 2124, 2126, and an OFL 2140 that is the boundary of the taxiway. In an embodiment, the respective large neighboring aircraft 2134 and 2136 are two-engine-on-wing aircraft such as a version of the Boeing® 737 or a version of the Airbus® A320 or A319. Accordingly, in an embodiment, the RA 2127 is next to but not over the OFL 2140. In an embodiment, the docking bay area that is sufficient for about only a single large aircraft, includes any of the docking bay areas set forth in this disclosure including those larger, substantially about 1.0 times the existing docking bay area for a single large aircraft, and those smaller. The interstitial regional aircraft boarding pier 2100 accomplishes one more RA within its boundaries than the interstitial regional aircraft boarding pier 1300.

In an embodiment, a conventional and/or existing aircraft passenger bridge 2114 and/or a conventional aircraft passenger bridge design is rebuilt and/or redesigned according to the various embodiments set forth in this disclosure.

In an embodiment, any two of the RAs 2121, 2123, 2125, 2127, and 2129 and their respective secondary aircraft passenger bridges are present as a duo in a configuration. In an embodiment, any three of the RAs 2121, 2123, 2125, 2127, and 2129 and their respective secondary aircraft passenger bridges are present as a trio in a configuration. In an embodiment, any four of the RAs 2121, 2123, 2125, 2127, and 2129 and their respective secondary aircraft passenger bridges are present as a quartet in a configuration. In an embodiment, any configuration of secondary aircraft passenger bridges is provided to accommodate a given combination for the above-given RAs. As in other embodiment set forth in this disclosure, the RA 2129 is configured within the docking bay area for the large aircraft 2136. Accordingly, the docking bay area is approximately 1.0 time the required docking bay area for a single large aircraft 2136.

FIG. 21 also illustrates the presence of a third large aircraft 2154. In an embodiment, the third large aircraft 1354 is an engine-on-fuselage-rear configuration such as an MD 80 or the like. Other large aircraft, however, can be positioned as the large aircraft, if present.

Figure 22:
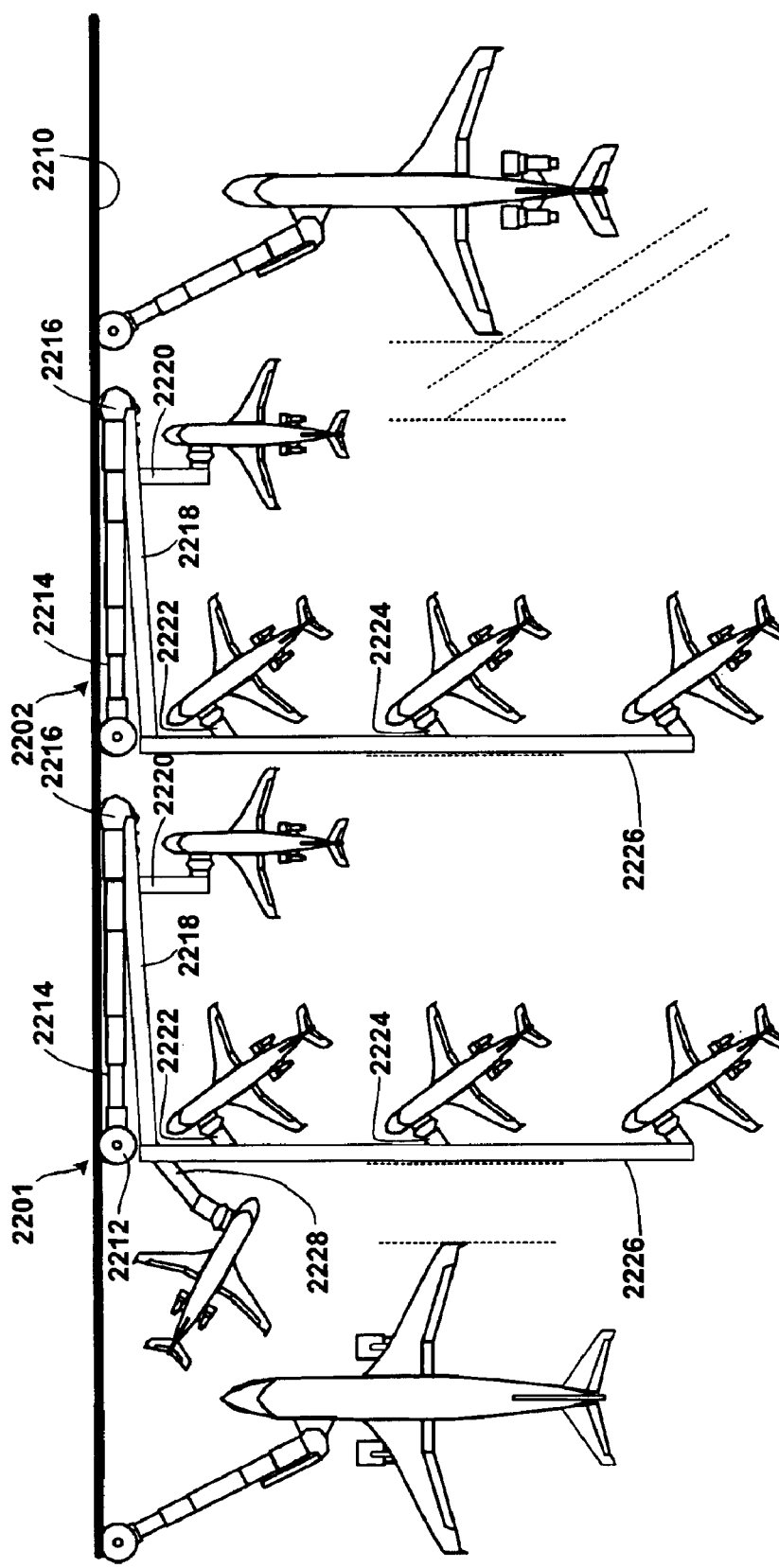
FIG. 22 is a plan of two contiguous interstitial regional aircraft boarding piers for docking about five and four regional aircraft, respectively, according to an embodiment.

FIG. 22 is a plan of two contiguous interstitial regional aircraft boarding piers 2201 and 2202 for docking about five and four regional aircraft or less, respectively, according to an embodiment. In an embodiment, the interstitial regional aircraft boarding pier 2201 is similar in structure and layout to the interstitial regional aircraft boarding pier 2100 depicted in FIG. 21. In an embodiment, the interstitial regional aircraft boarding pier 2202 is also similar, except it is configured for no FILO aircraft. In an embodiment, the docking bay areas for either of contiguous interstitial regional aircraft boarding piers 2201 and 2202 is sufficient for about only a single large aircraft. This docking bay area includes any of the areas set forth in this disclosure including those larger, substantially about 1.0 times the existing docking bay area for a single large aircraft, and those smaller. In an embodiment depicted in FIG. 22, the docking bay area that is sufficient for about only a single large aircraft includes a docking bay area sufficient for less than two large aircraft.

In an embodiment similar to other embodiments set forth in this disclosure, a lesser number of RAs than is illustrated, is a capacity accommodation for the interstitial regional aircraft boarding pier 2201. In an embodiment similar to other embodiments set forth in this disclosure, a lesser number of RAs than is illustrated, is a capacity accommodation for the interstitial regional aircraft boarding pier 2202.

In an embodiment, the rotunda 2212 is absent from the interstitial regional aircraft boarding pier 2202, and the two primary aircraft passenger bridges 2214 are an integral unit. The secondary aircraft passenger bridge 2218 for the interstitial regional aircraft boarding pier 2202 is not present, and a virtual pier hub exists at approximately where the rotunda 2212 appears for the interstitial regional aircraft boarding pier 2202. As in other embodiments, the interstitial regional aircraft boarding pier is contiguous with at least one large aircraft passenger bridge.

Figure 23:
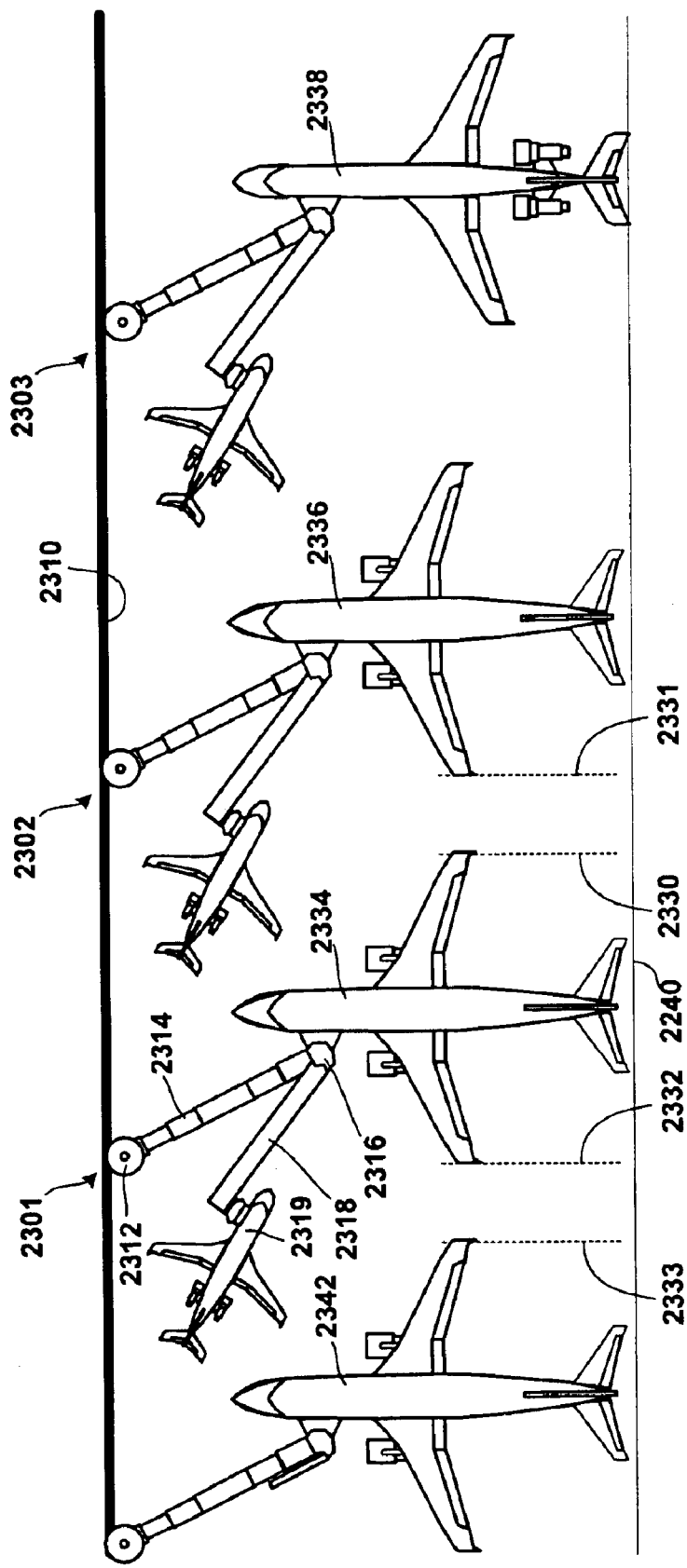
FIG. 23 is a plan of an interstitial regional aircraft boarding pier for docking a regional aircraft and one large aircraft according to an embodiment.

FIG. 23 is a plan of an interstitial regional aircraft boarding pier 2301 for docking a regional aircraft and one large aircraft according to an embodiment. A concourse 2310 is depicted by its external boundary. The concourse provides an anchor location for the interstitial regional aircraft boarding pier 2301. Other interstitial regional aircraft boarding piers 2302 and 2303 are also depicted, as well as large aircraft 2336 and 2338. In an embodiment, the concourse 2310 is a ground-level structure that allows passengers to walk up a ramp until the sill of a given aircraft is reached. In an embodiment, the concourse 2310 is a conventional elevated structure that allows passengers to walk down a ramp until the sill of a given aircraft is reached.

In an embodiment, the interstitial regional aircraft boarding pier 2301 anchors at a rotunda 2312, into which passengers first embark upon leaving the concourse 2310. In an embodiment, the rotunda 2312 includes a swiveling functionality that allows for positioning other portions of the boarding pier 2301. In an embodiment, the rotunda 2312 includes a fixed structure.

A primary aircraft passenger bridge 2414 is coupled to the rotunda 2312. The primary aircraft passenger bridge 2314 leads to a cab 2316. In an embodiment, the cab 2316 acts as a pier hub 2316 for at least one secondary aircraft passenger bridge 2318. In an embodiment, the cab 2316 is at a level that allows for the sill height of any given large aircraft 2334 as depicted in FIG. 23. In an embodiment, the cab 2316 is large enough to allow for more passenger grouping during boarding and deplaning. In an embodiment, the cab 2316 is large enough to allow passengers to be seated and wait for boarding a given RA. In an embodiment depicted in FIG. 23, the cab 2316 acts as a pier hub 2316 for a secondary aircraft passenger bridge 2318.

In an embodiment, the secondary aircraft passenger bridge 2318 is configured to accommodate an RA 2319. In an embodiment, the interstitial regional aircraft boarding pier 2301 is configured to allow at least one RA to dock within a docking bay area sufficient for about only a single large aircraft. In other words, no relocation is needed of the docking bays for adjacent large aircraft in order to accomplish an embodiment of an interstitial regional aircraft boarding pier. In FIG. 23, the docking bay area sufficient for about only a single large aircraft is approximately delineated by the concourse 2310, a starboard wingtip-clearance boundary 2330, a port wingtip-clearance boundary 2332, and an OFL 2340 that is the boundary of the taxiway. The starboard and port wingtip-clearance boundaries 2330 and 2332, respectively are coupled with respective port 2331 and starboard 2333 wingtip-clearance boundaries for respective neighboring large aircraft 2336 and 2342. In an embodiment, the respective large neighboring aircraft 2336 and 2342 two-engine-on-wing aircraft such as a version of the Boeing® 737 or a version of the Airbus® A320 or A319. Other large aircraft, however, can be docked according to an embodiment. In an embodiment, the docking bay area that is sufficient for about only a single large aircraft, includes any of the areas set forth in this disclosure including those larger, substantially about 1.0 times the existing docking bay area for a single large aircraft, and those smaller. The RA 2319 is a FILO aircraft according to an embodiment. In other words, if the large aircraft 2334 is not present, the RA 2319 can taxi away from the concourse 2310. Similarly, if the large aircraft 2342 is not present, the RA 2319 can taxi away from the concourse 2310.

In an embodiment, a conventional and/or existing aircraft passenger bridge 2314 and/or a conventional aircraft passenger bridge design is rebuilt and/or redesigned such that the original cab 2316 that was configured to accommodate a single aircraft, is either replaced or reconfigured to act as a pier hub 2316.

Figure 24:
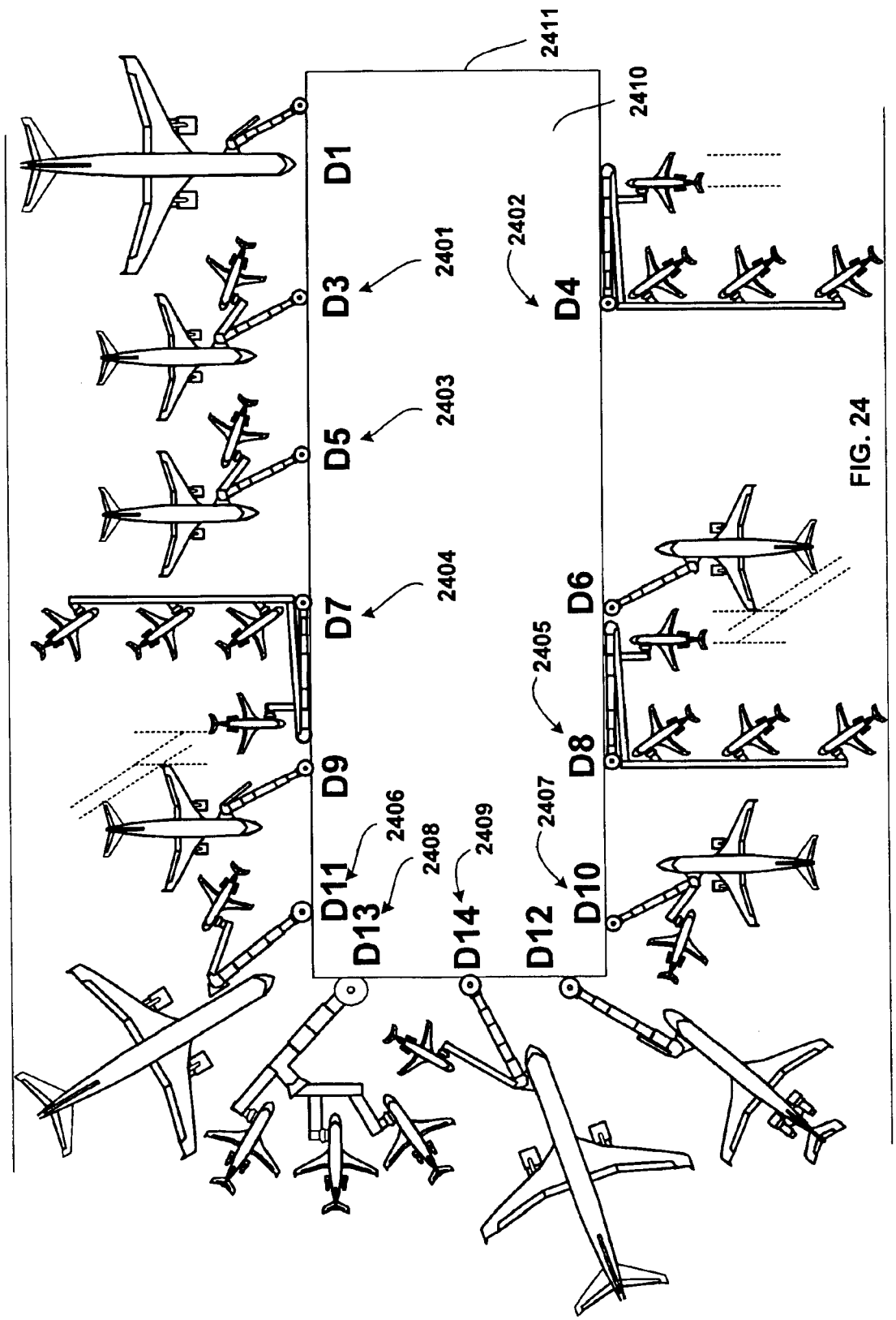
FIG. 24 is a plan of a concourse that has been retrofitted or designed to accommodate an embodiment.

FIG. 24 is a plan of a concourse that has been retrofitted or designed to accommodate an embodiment. In an embodiment, the concourse 2410 is attached to other structures at a surface 2411. In an embodiment, the concourse 2410 is the redesigned "Concourse D" at the U.S. airport SLC.

In an embodiment, an interstitial regional aircraft boarding pier 2401 is deployed at Gate D3. Gate D3 is next to Gate D1, which accommodates a large aircraft or a jumbo aircraft. The interstitial regional aircraft boarding pier 2401 is configured to accommodate one FILO RA along with a large aircraft, similar to the interstitial regional aircraft boarding pier 2301 depicted in FIG. 23. Also similar to the interstitial regional aircraft boarding pier 2401, an interstitial regional aircraft boarding pier 2404 is deployed at Gate D5.

In an embodiment, an interstitial regional aircraft boarding pier 2402 is deployed at Gate D4. The interstitial regional aircraft boarding pier 2402 is configured similar to the interstitial regional aircraft boarding pier 2100 as depicted in FIG. 21. Accordingly, the interstitial regional aircraft boarding pier 2402 can include a number of RAs lesser than four, lesser than three, and lesser than two according to the several embodiments.

In an embodiment, an interstitial regional aircraft boarding pier 2404 is deployed at Gate D7. The interstitial regional aircraft boarding pier 2404 is configured similar to the interstitial regional aircraft boarding pier 2402. Accordingly, the interstitial regional aircraft boarding pier 2402 can include a number of RAs lesser than four, lesser than three, and lesser than two according to the several embodiments.

In an embodiment, an interstitial regional aircraft boarding pier 2405 is deployed at Gate D8. The interstitial regional aircraft boarding pier 2405 is configured similar to the interstitial regional aircraft boarding pier 2404. Accordingly, the interstitial regional aircraft boarding pier 2405 can include a number of RAs lesser than four, lesser than three, and lesser than two according to the several embodiments.

In an embodiment, an interstitial regional aircraft boarding pier 2406 is deployed at Gate D11. Gate D11 accommodates a large aircraft or a jumbo aircraft. The interstitial regional aircraft boarding pier 2406 is configured to accommodate one FILO RA along with a large aircraft, similar to the interstitial regional aircraft boarding pier 2301 depicted in FIG. 23. Also similar to the interstitial regional aircraft boarding pier 2406, an interstitial regional aircraft boarding pier 2409 deployed at Gate D14.

In an embodiment, an interstitial regional aircraft boarding pier 2409 is deployed at Gate D13. The interstitial regional aircraft boarding pier 2409 is configured similar to the interstitial regional aircraft boarding pier 1100 depicted in FIG. 11. Accordingly, the interstitial regional aircraft boarding pier 2409 can include a number of RAs lesser than four, lesser than three, and lesser than two according to the several embodiments.

In an embodiment, an interstitial regional aircraft boarding pier 2407 is deployed at Gate D10. Gate D10 accommodates a large aircraft. The interstitial regional aircraft boarding pier 2407 is configured to accommodate one FILO RA along with a large aircraft, similar to the interstitial regional aircraft boarding pier 2403.

FIG. 25 is a method flow diagram according to an embodiment. At 2510, a method embodiment includes retrofitting or designing an interstitial regional aircraft boarding pier for a concourse.

At 2520, a method embodiment includes replacing an existing regional aircraft concourse with a concourse that includes at least one interstitial regional aircraft boarding pier. In another embodiment at 2520, an existing regional aircraft concourse is retrofitted with an interstitial regional aircraft boarding pier.

At 2530, a method embodiment includes docking an aircraft at an interstitial regional aircraft boarding pier.

At 2540, a method embodiment includes boarding or deplaning at an interstitial regional aircraft boarding pier.

At 2550, a method embodiment includes transferring between two aircraft, using at least one interstitial regional aircraft boarding pier.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

The preceding description has been presented only to illustrate and describe disclosed embodiments. It is not intended to be exhaustive or to limit the embodiments to any precise form disclosed. Many modifications and variations are possible in light of the above teaching.

Several embodiments were chosen and described in order to best explain the principles of the embodiments and their practical application. The preceding description is intended to enable others skilled in the art to best utilize the embodiments in various embodiments and with various modifications as are suited to the particular use contemplated. It is intended that the scope of the disclosed embodiments be defined by the following claims.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A regional aircraft boarding pier, comprising:
    a primary passenger bridge;
    a first pier hub connected to the primary passenger bridge; and
    at least one secondary passenger bridge coupled to the primary passenger bridge, wherein at least one of the first pier hub and the at least one secondary passenger bridge include a cab for docking with a regional aircraft, and wherein the pier is capable of docking a plurality of aircraft including at least one regional aircraft within a docking bay area sufficient for about only a single large aircraft.

2. The regional aircraft boarding pier according to claim 1, wherein the least one secondary passenger bridge is coupled by an attachment to one of the first pier hub and the primary passenger bridge.

3. The regional aircraft boarding pier according to claim 1, wherein the regional aircraft boarding pier is configured to accommodate nine or fewer regional aircraft.

4. The regional aircraft boarding pier according to claim 1, wherein the regional aircraft boarding pier is configured to accommodate four or fewer regional aircraft.

5. The regional aircraft boarding pier according to claim 1, wherein the regional aircraft boarding pier is configured to accommodate a large aircraft and at least one regional aircraft.

6. The regional aircraft boarding pier according to claim 1, wherein the regional aircraft boarding pier is deployed at a location selected from at a concourse terminus, between two large aircraft boarding bridges, adjacent a large aircraft boarding bridge, adjacent two regional aircraft boarding piers, adjacent a single regional aircraft boarding pier, and combinations thereof.

7. The regional aircraft boarding pier of claim 1, further including: at least one tertiary passenger bridge connected to one of the least one secondary passenger bridge.

8. The regional aircraft boarding pier according to claim 1, wherein the pier hub includes at least one passenger amenities facility.

9. The regional aircraft boarding pier according to claim 1, wherein the first secondary regional aircraft passenger bridge is configured for first-in-last-out docking of a regional aircraft.

10. The regional aircraft boarding pier according to claim 1, wherein the docking bay area sufficient for about only a single large aircraft is in a range from about 0.4 times the area, and about less than two large aircraft.

11. A regional aircraft boarding pier, comprising:
    a primary passenger bridge;
    a first pier hub connected to the first primary passenger bridge;
    a first secondary regional aircraft passenger bridge extending from the first pier hub; and
    wherein the first secondary regional aircraft passenger bridge is part of two to five coupled secondary aircraft passenger bridges.

12. The regional aircraft boarding pier of claim 11, wherein the regional aircraft boarding pier extends from an airport concourse, and wherein the regional aircraft boarding pier is a first regional aircraft boarding pier that deployed at a location, selected from at a concourse terminus, between two large aircraft passenger boarding bridges, adjacent a large aircraft passenger boarding bridge, adjacent two regional aircraft passenger boarding piers, adjacent a single regional aircraft passenger boarding pier, and combinations thereof.

13. The regional aircraft boarding pier according to claim 11, wherein the pier hub includes at least one passenger amenities facility.

14. The regional aircraft boarding pier according to claim 11, wherein the regional aircraft boarding pier is configured to accommodate a large aircraft and at least one regional aircraft.

15. The regional aircraft boarding pier according to claim 11, wherein the docking bay area sufficient for about only a single large aircraft is in a range from about 0.4 times the area, and about less than two large aircraft.

16. A regional aircraft boarding structure, comprising:

a first hub;

a first secondary regional aircraft passenger bridge extending from the first hub;

wherein the first secondary regional aircraft passenger bridge is part of two to five coupled secondary aircraft passenger bridges, and wherein the structure is capable of docking a plurality of aircraft including at least one regional aircraft within a docking bay area sufficient for about only a single large aircraft.

17. The regional aircraft boarding structure of claim 16, wherein the regional aircraft boarding structure is coupleable to an airport concourse, and wherein the regional aircraft boarding structure is a first regional aircraft boarding structure that is deployable at a location, selected from at a concourse terminus, between two large aircraft passenger boarding bridges, adjacent a large aircraft passenger boarding bridge, adjacent two regional aircraft passenger boarding structures, adjacent a single regional aircraft passenger boarding structure, and combinations thereof.

18. The regional aircraft boarding structure of claim 16, wherein the regional aircraft boarding structure is configured to accommodate a large aircraft and at least one regional aircraft.

19. The regional aircraft boarding structure of claim 16, wherein the docking bay area sufficient for about only a single large aircraft is in a range from about 0.4 times the area, and about less than about two times the area.

20. The regional aircraft boarding structure of claim 16, wherein the first hub is coupleable to an existing large aircraft passenger bridge.

21. The regional aircraft boarding structure of claim 16, wherein the structure can occupy a docking bay area having a aspect ratio of about 1.18, and wherein the docking bay area occupy able by the structure includes a buffer multiplier factor selected from about 1, about 1.05, about 1.1, about 1.15, about 1.2, and greater than about 1.2.

22. The regional aircraft boarding pier according to claim 1, wherein the pier can occupy a docking bay area having a aspect ratio of about 1.18, and wherein the docking bay area occupy able by the pier includes a buffer multiplier factor selected from about 1, about 1.05, about 1.1, about 1.15, about 1.2, and greater than about 1.2.

23. The regional aircraft boarding pier according to claim 11, wherein the pier can occupy a docking bay area having a aspect ratio of about 1.18, and wherein the docking bay area occupy able by the pier includes a buffer multiplier factor selected from about 1, about 1.05, about 1.1, about 1.15, about 1.2, and greater than about 1.2.

* * * * *